(12) United States Patent
 Molés Cases et al.

(10) Patent No.: US 12,368,559 B2
(45) Date of Patent: *Jul. 22, 2025

(54) TECHNIQUE FOR CONFIGURING A PHASE TRACKING REFERENCE SIGNAL

(71) Applicant: Telefonaktiebolaget LM Ericsson (publ), Stockholm (SE)

(72) Inventors: Vicent Molés Cases, Nules (ES); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,683

(22) Filed: Dec. 5, 2023

(65) Prior Publication Data

US 2024/0121057 A1  Apr. 11, 2024

Related U.S. Application Data

(63) Continuation of application No. 17/986,486, filed on Nov. 14, 2022, now Pat. No. 11,902,205, which is a
(Continued)

(51) Int. Cl.
*H04L 5/00* (2006.01)
*H04L 41/0803* (2022.01)
*H04W 72/0453* (2023.01)

(52) U.S. Cl.
CPC .......... *H04L 5/0051* (2013.01); *H04L 5/0048* (2013.01); *H04L 5/0094* (2013.01); *H04L 41/0803* (2013.01); *H04W 72/0453* (2013.01)

(58) Field of Classification Search
CPC .... H04W 72/04; H04L 41/0803; H04L 5/005; H04L 5/004
See application file for complete search history.

(56) References Cited

U.S. PATENT DOCUMENTS

2017/0294926 A1  10/2017  Islam et al.
2018/0220448 A1   8/2018  Akkarakaran et al.
(Continued)

FOREIGN PATENT DOCUMENTS

CO  09-90142    1/2010
GB  2566306 A   3/2019
(Continued)

OTHER PUBLICATIONS

3GPP, "3GPP TS 38.211 V1.0.0", 3rd Generation Partnership Project; Technical Specification Group Radio Access Network; NR; Physical channels and modulation (Release 15), Sep. 2017, 1-37.
(Continued)

*Primary Examiner* — Kent Krueger
(74) *Attorney, Agent, or Firm* — Murphy, Bilak & Homiller, PLLC

(57) ABSTRACT

A technique for transmitting and receiving a configuration message for a phase tracking reference signal, PT-RS, on a radio channel between a radio access node and a radio device is described. The radio channel comprises a plurality of subcarriers in a physical resource block, PRB. A subset of the subcarriers in the PRB is allocated to a demodulation reference signal, DM-RS. As to a method aspect of the technique, the configuration message is transmitted to the radio device. The configuration message comprises a bit field that is indicative of at least one subcarrier allocated to the PT-RS among the subset of subcarriers allocated to the DM-RS.

16 Claims, 20 Drawing Sheets

Related U.S. Application Data continuation of application No. 16/983,368, filed on Aug. 3, 2020, now Pat. No. 11,528,111, which is a continuation of application No. 16/281,911, filed on Feb. 21, 2019, now Pat. No. 10,805,052, which is a continuation of application No. PCT/EP2018/081400, filed on Nov. 15, 2018.

(60) Provisional application No. 62/587,967, filed on Nov. 17, 2017.

(56) References Cited

U.S. PATENT DOCUMENTS

| | | | |
|---|---|---|---|
| 2019/0052433 | A1 | 2/2019 | Yoo et al. |
| 2019/0081844 | A1 | 3/2019 | Lee et al. |
| 2020/0162303 | A1 | 5/2020 | Kim et al. |
| 2021/0092558 | A1 | 3/2021 | Duan et al. |

FOREIGN PATENT DOCUMENTS

| | | |
|---|---|---|
| RU | 2635545 C2 | 11/2017 |
| WO | 2008115110 A1 | 9/2008 |
| WO | 2016000915 A1 | 1/2016 |
| WO | 2017171481 A1 | 10/2017 |
| WO | 2017188591 A1 | 11/2017 |
| WO | 2018182248 A1 | 10/2018 |

OTHER PUBLICATIONS

3GPP, "3GPP TS 38.211 V1.1.2", 3rd Generation Partnership Project; Technical Specification Group Radio Access Network; NR; Physical channels and modulation (Release 15), Nov. 2017, 1-60.

3GPP, "3GPP TS 38.214 V1.0.0", 3rd Generation Partnership Project; Technical Specification Group Radio Access Network; NR; Physical layer procedures for data (Release 15), Sep. 2017, 1-32.

3GPP, "3GPP TS 38.331 V0.1.0", 3rd Generation Partnership Project; Technical Specification Group Radio Access Network; NR; Radio Resource Control (RRC); Protocol specification (Release 15), Oct. 2017, 1-42.

3GPP, "3rd Generation Partnership Project; Technical Specification Group Radio Access Network; NR; Physical layer procedures for data (Release 15)", TS 38.214 V1.1.0, Oct. 2017, 1-36.

3GPP, "3rd Generation Partnership Project; Technical Specification Group Radio Access Network; NR; Physical layer procedures for data (Release 15)", TS 38.214 V1.1.0, R1-1718819, Oct. 2017, 1-36.

Samsung, "DL PT-RS design", 3GPP TSG RAN WG1 #90, R1-1703605, Prague, Czech, Aug. 21-25, 2017, 1-5.

Unknown, Author, "Details on PTRS design", 3GPP TSG-RAN WG1 NR Ad Hoc #3 R1-1716373, Nagoya, Japan, Sep. 18-21, 2017, 1-22.

Unknown, Author, "Further evaluations on DMRS", 3GPP TSG RAN WG1 Meeting 90bis R1-1718749, Prague, CZ, Oct. 9-13, 2017, 1-15.

Unknown, Author, "Further evaluations on PTRS for CP-OFDM", 3GPP TSG RAN WG1 Meeting 90bis R1-1718750, Prague, CZ, Oct. 9-13, 2017, 1-9.

Unknown, Author, "Further evaluations on PTRS for DFT-S-OFDM", 3GPP TSG RAN WG1 Meeting 90bis R1-1718751, Prague, CZ, Oct. 9-13, 2017, 1-4.

Unknown, "IEEE Standard for Low-Rate Wireless Networks", IEEE Std 802.15.4™—2015; IEEE Computer Society; New York, New York, Dec. 5, 2015, 1-708.

Unknown, Author, "Joint WF on PTRS", Intel, Samsung, Huawei, HiSilicon, ZTE, Sanechips, IITH, CEWiT, IITM, Tejas Networks, Reliance Jio, Panasonic, InterDigital, Mitsubishi, Ericsson, R1-1718998, Oct. 12, 2017, 1-7.

Unknown, Author, "On DL PTRS design", 3GPP TSG-RAN WG1 #90 R1-1714314, Prague, Czechia, Aug. 21-25, 2017, 1-20.

Unknown, Author, "RAN1 Chairman's Notes", 3GPP TSG RAN WG1 Meeting #95, Nov. 12-16, 2018, 1-71.

Unknown, "Remaining details 5 on PTRS design", 3GPP TSG RAN WG1 Meeting 91; R1-1720741; Reno, USA, Nov. 27-Dec. 1, 2017, 1-17.

Unknown, Author, "Remaining details on PTRS design", 3GPP TSG RAN WG1 Meeting 90bis R1-1718449, Prague, CZ, Oct. 9-13, 2017, 1-11.

Unknown, Author, "RRC parameters for PTRS", 3GPP TSG RAN WG1 Meeting 90bis, R1-1719071, Prague, CZ, Oct. 9-13, 2017, 1-2.

Unknown, Author, "Summary for remaining issues of RS multiplexing", 3GPP TSG RAN WG1 Meeting #90bis, R1-1718851, Prague, Czech Republic, Oct. 9-13, 2017, 1-7.

Unknown, Author, "Summary of PTRS open issues", 3GPP TSG-RAN WG1 #90bis, R1-1718845, Prague, Czech Republic, Oct. 9-13, 2017, 1-9.

ZTE, et al., "Discussion on beam management", 3GPP TSG RAN WG1 Meeting #90-bis, R1-1717424, Prague, Czechia, Oct. 9-13, 2017, 1-12.

RE-level offset associated with DM-RS port index

Fig. 14a

RE-level offset associated with SCID/Cell ID

Fig. 14b

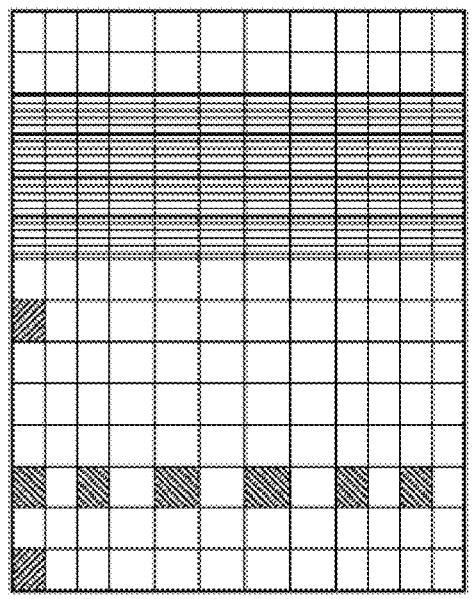
Fig. 16a (Puncturing)
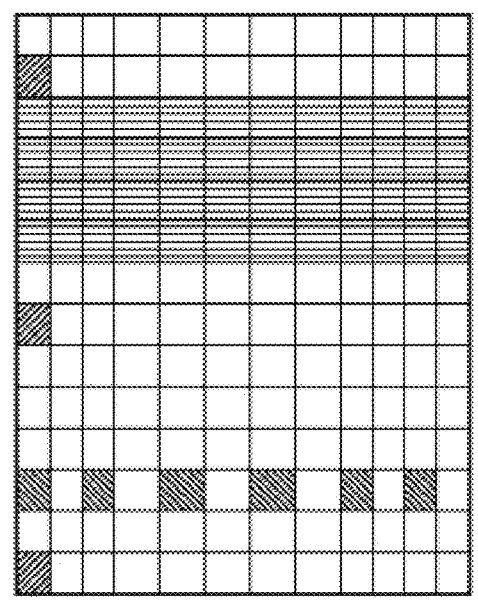
Fig. 16b (Shifting)

Legend: ■ Not used due to reduced flexibility  ▨ Not used due to rank restriction

TECHNIQUE FOR CONFIGURING A PHASE TRACKING REFERENCE SIGNAL

RELATED APPLICATIONS

The present application is a continuation of U.S. patent application Ser. No. 17/986,486, filed 14 Nov. 2022, which is a continuation of U.S. patent application Ser. No. 16,983,368, filed 3 Aug. 2020, now issued U.S. Pat. No. 11,528,111, which is a continuation of U.S. patent application Ser. No. 16,281,911, filed 21 Feb. 2019, now issued U.S. Pat. No. 10,805,052, which is a continuation of international patent application serial no. PCT/EP2018/081400, filed 15 Nov. 2018, which claims the benefit of U.S. provisional application Ser. No. 62/587,967, filed 17 Nov. 2017. The entire contents of each of the foregoing applications is incorporated herein by reference.

TECHNICAL FIELD

The present disclosure generally relates to a technique for configuring a Phase Tracking Reference Signal (PT-RS). More specifically, methods and devices are provided for transmitting and receiving a configuration message for a PT-RS, as well as a radio signal structure representative of such a configuration message.

BACKGROUND

The physical signal structure for the next generation of radio access technology is specified by the 3rd Generation Partnership Project (3GPP) as New Radio (NR). NR has a lean design that minimizes always-on transmissions to enhance network energy efficiency and ensure forward compatibility. In contrast to existing 3GPP Long Term Evolution (LTE), reference signals in NR are transmitted only when necessary. Four main reference signals include a demodulation reference signal (DM-RS), a phase-tracking reference signal (PT-RS), a sounding reference signal (SRS) and channel-state information reference signal (CSI-RS).

The PT-RS is introduced in NR to enable compensation of oscillator phase noise. Typically, phase noise increases as a function of an oscillator carrier frequency. Therefore, the PT-RS can be utilized at high carrier frequencies such as mm-waves to mitigate phase noise. One of the main degradations caused by phase noise in an Orthogonal Frequency-Division Multiplexing (OFDM) signal is an identical phase rotation of all the subcarriers, known as common phase error (CPE). The PT-RS has a low density in the frequency domain and high density in the time domain, since the phase rotation produced by CPE is identical for all subcarriers within an OFDM symbol, but there is low correlation of phase noise across OFDM symbols. The PT-RS is specific for the user equipment (UE) and confined in a scheduled resource. The number of DM-RS ports used for transmitting the PT-RS can be lower than the total number of DM-RS ports.

The exact PT-RS subcarrier may be implicitly defined, e.g., as a function of one or more of the following parameters: DM-RS port index, DM-RS scrambling ID (SCID) and Cell ID. Furthermore, an explicit (e.g., radio resource control, RRC) signaling of a conventional parameter "PTRS-RE-offset" could override the afore-mentioned implicit association rule, which is important, e.g., in order to be able to force an avoidance of a collision of PT-RS with a direct current (DC) subcarrier for which performance is bad. Hence, a straightforward or existing solution would signal an explicit offset or position "PTRS-RE-offset", which can take any value from 0 to 11. In other word, the PT-RS can be mapped to any subcarrier in the PRB using this existing explicit signaling.

In the existing signaling, the signaled parameter "PTRS-RE-offset" can be set to any value from 0 to 11. It is then a problem that the signaled "PTRS-RE-offset" using RRC signaling implies a gNB scheduling restriction, since the DM-RS used for PDSCH or PUSCH transmission must use the subcarrier indicated by "PTRS-RE-offset", which is undesirable.

For example, if "PTRS-RE-offset=0", if DM-RS configuration type 1 is configured, the DM-RS subcarrier comb, i.e., the subset {1,3,5,7,9,11} of subcarriers allocated to the DM-RS, cannot be used when scheduling the UE, since the PT-RS must be mapped to a subcarrier used by the DM-RS, i.e., within said subset.

Another problem is the high overhead in the existing signaling. If "PTRS-RE-offset" can be set to a value from 0 to 11, 4 bits are required per "PTRS-RE-offset" indication. Moreover, as PT-RS ports for downlink (DL) and uplink (UL) may be associated with different DM-RS ports, independent indication of "PTRS-RE-offset" for UL and DL is needed, thus increasing the overhead. Similarly, the existing signaling has to independently indicate the parameter "PTRS-RE-offset" for each PT-RS port in SU-MIMO, thus further increasing the signaling overhead.

SUMMARY

Accordingly, there is a need for a technique that allows configuring a PT-RS more efficiently and/or more flexibly. More specifically, there is a need for a technique that reduces a signaling overhead caused by the configuration. Alternatively or in addition, there is a need for a technique that avoids scheduling restrictions.

As to one aspect, a method of transmitting a configuration message for a phase tracking reference signal (PT-RS) on a radio channel between a radio access node and a radio device is provided. The radio channel comprises a plurality of subcarriers in a physical resource block (PRB). A subset of the subcarriers in the PRB is allocated to a demodulation reference signal (DM-RS). The method comprises or triggers a step of transmitting the configuration message to the radio device. The configuration message comprises a bit field that is indicative of at least one subcarrier allocated to the PT-RS among the subset of subcarriers allocated to the DM-RS.

The one subcarrier allocated to the PT-RS may also be referred to as the PT-RS subcarrier of the PT-RS. The subcarriers allocated to the DM-RS may also be referred to as the DM-RS subcarriers. The subset of subcarriers allocated to the DM-RS (i.e., the subset comprising the DM-RS subcarriers) may also be referred to as DM-RS subset. The DM-RS subset may be a proper subset of the plurality of subcarriers in the PRB. In other words, the subset may include less subcarriers than a PRB.

By means of the bit field, the configuration message may signal a relative offset, e.g., relative to the pertinent subset of subcarriers allocated for the DM-RS. The parameter or function represented by the bit field may be referred to as subcarrier-offset or resource element offset (RE-offset) for the PT-RS, or briefly: "PTRS-RE-offset". The method may be implemented as a RE offset signaling for PT-RS.

The actual subcarrier used for PT-RS may depend on both the parameter "PTRS-RE-offset" and the subset of subcarriers allocated for the DM-RS. For example, if a DM-RS port is identified by a DM-RS port number, the actual subcarrier used for PT-RS may depend on both the parameter "PTRS-RE-offset" and the DM-RS port number.

Furthermore, a plurality of different DM-RSs may be transmitted on corresponding DM-RS ports. The DM-RS port number p may be among a set of DM-RS ports used for the radio channel, e.g., for performing a channel estimate of the radio channel and/or demodulating the radio channel as a data channel at a receiving side of the radio channel.

In order to avoid scheduling restriction and reduce the signaling overhead, the value of the bit field, i.e., the parameter "PTRS-RE-offset", represents a relative subcarrier index in the subset of subcarriers assigned for the DM-RS port in the particular transmission.

By transmitting the parameter "PTRS-RE-offset" as the configuration parameter in the bit field of the configuration message, scheduling restrictions may be avoided at least in some embodiments, because the group of possible PT-RS subcarriers is restricted to the subset of subcarriers used by, allocated to or scheduled for the DM-RS port associated with the PT-RS port.

Same embodiments (e.g., the embodiments in the aforementioned paragraph) or further embodiments may requires significantly less signaling overhead than the existing offset signaling, because a common indication of "PTRS-RE-offset" can be used for DL and UL. Alternatively or in addition, a common indication can be used for different PT-RS ports in SU-MIMO.

The bit field may comprise n bits that are indicative of the at least one subcarrier allocated to the PT-RS among the subset of subcarriers allocated to the DM-RS. A number of the plurality of subcarriers in the PRB may be greater than $2^n$.

The subset of subcarriers allocated to the DM-RS may be dynamically signaled.

The bit field may comprise 2 or 3 bits that are indicative of the at least one subcarrier allocated to the PT-RS among the subset of subcarriers allocated to the DM-RS. The number of the plurality of subcarriers in the PRB may be 12.

The bit field may be sized for representing any one of the subcarriers in the subset of subcarriers allocated to the DM-RS as the subcarrier allocated to the PT-RS.

The bit field may comprise n bits. A number of the subcarriers in the subset of subcarriers allocated to the DM-RS may be equal to or less than $2^n$.

Each subcarrier in the subset of subcarriers allocated to the DM-RS may be uniquely identified by an index. The bit field may be indicative of the index corresponding to the subcarrier allocated to the PT-RS.

The radio channel may be accessed through one or more DM-RS ports. Each transmission of the DM-RS may be associated with one of the one or more DM-RS ports.

Each of the one or more DM-RS ports may be uniquely identified by a DM-RS port index. Each transmission of the DM-RS (briefly: DM-RS transmission) may be defined with, or associated with, a DM-RS port index.

The one or more DM-RS ports may be located at (or may define) a transmitting side of the radio channel. The one or more DM-RS ports may be used by (e.g., located at) the radio access node for a downlink transmission. Alternatively or in addition, the one or more DM-RS ports may be used by (e.g., located at) the radio device for an uplink transmission.

Alternatively or in addition, the one or more DM-RS ports may be located at (or may define) a receiving side of the radio channel. For example, the transmitting side may initially define the DM-RS ports by transmitting a DM-RS, and the receiving side may define combining weights for a beamforming reception based on the received DM-RS. The one or more DM-RS ports may be used by (e.g., located at) the radio access node for an uplink reception. Alternatively or in addition, the one or more DM-RS ports may be used by (e.g., located at) the radio device for an downlink transmission.

The transmission over the radio channel may comprise one or more layers (also referred to as spatial streams). The number of layers may be equal to the number of DM-RS ports used for the transmission over the radio channel. The radio channel may be a multiple-input multiple-output (MIMO) channel being accessed through the DM-RS ports at the transmitting side (i.e., the input of the MIMO channel), optionally mapped to a plurality of transmitter antennas, and being received through a plurality of receiver-ports formed by antennas at a receiver side (i.e., the output of the MIMO channel).

The multiple transmitted layers may be separated in the spatial and/or polarization domain by a transmit precoder and separated in the receiver by performing a channel estimation and, optionally, suppression of interfering layers for the radio channel based on the DM-RS and/or the PT-RS received at the receiving side. For example, the transmission may be a multi-layer single user MIMO (SU-MIMO) transmission, wherein two or more layers may be accessed through two or more DM-RS ports.

The DM-RS may be used for at least one of precoding at the transmitting side and demodulating the radio channel at the receiving side.

The subset of subcarriers allocated to the DM-RS may depend on the corresponding DM-RS port. For each of the DM-RS ports, a subset of subcarriers in the PRB may be allocated to the DM-RS transmitted (or to be transmitted) through the corresponding DM-RS port. That is, a subset of subcarriers allocated to the DM-RS is associated with each DM-RS port. At least some of the subsets of subcarriers used for transmitting the DM-RSs through different DM-RS ports may be different. For example, the different subsets may be mutually disjoint.

The PRB may comprise 12 subcarriers given by an index $k \in \{0, \ldots, 11\}$. The subset of subcarriers allocated to the DM-RS being transmitted through the DM-RS port p may be given by $$\{2 \cdot R \cdot m + S \cdot k' + \Delta(p) \in \{0, \ldots, 11\} | k' \in \{0, 1\}, 0 \le m < 6/R\},$$

wherein R=1, 2 or 3; S=1 or 2; and an offset $\Delta(p)$ depends on the DM-RS port p.

For a DM-RS configuration type 1, the parameters may be R=2, S=2 and $\Delta(p) \in \{0, 1\}$. For a DM-RS configuration type 2, the parameters may be R=3, S=1 and $\Delta(p) \in \{0, 2, 4\}$. In the above expression for the sets, the upper limit "11" may be replaced by $N_{sc}^{RB} - 1$ upper limit 6/R may be replaced by $N_{sc}^{RB}/(2R)$.

The DM-RS may be derived from a sequence $r(2 \cdot m + k' + n_0)$, wherein $n_0 = N_{BWPi}^{start} N_{sc}^{RB}/R$, $N_{BWPi}^{start}$ is the start of the carrier bandwidth part in units of PRBs and $N_{sc}^{RB} = 12$ is the number of subcarriers per PRB.

A different DM-RS may be transmitted through each of the DM-RS ports. Since different DM-RSs (e.g., orthogonal signals) are transmitted on different DM-RS ports, any dependency on the "DM-RS" may equally be expressed as a dependency on the corresponding "DM-RS port".

The DM-RSs transmitted through different DM-RS ports may be differentiated by at least one of an orthogonal cover code in the frequency domain, an orthogonal cover code in the time domain and the subset of subcarriers allocated to the DM-RS.

For example, each of the DM-RSs transmitted through different DM-RS ports may either use disjoint subsets of subcarriers or be orthogonally coded in the frequency domain.

One of the DM-RS ports may be associated with the PT-RS. The PT-RS may be transmitted through the DM-RS port associated with the PT-RS. The PT-RS may be transmitted on the subcarrier that is allocated to the PT-RS according to the bit field among the subset of subcarriers allocated to the DM-RS transmitted though the one DM-RS port.

The PT-RS and the DM-RS may be transmitted simultaneously or separately (e.g., in OFDM symbols or different PRBs, i.e., different slots or transmission time intervals, TTIs). Furthermore, the transmission of the PT-RS and the transmission of the DM-RS may overlap. A transmission duration of the PT-RS may be longer (e.g., multiple times longer) than a transmission duration of the DM-RS. For example, the PT-RS may be transmitted during one PRB comprising 14 OFDM symbols. The DM-RS may be transmitted during one or two OFDM symbols.

The subcarrier allocated to the PT-RS may be derived or derivable from the bit field for at least one of an uplink transmission of the PT-RS and a downlink transmission of the PT-RS.

The radio access node may be configured to access the radio channel through the DM-RS ports for a downlink transmission to the radio device. The method may further comprise or trigger a step of transmitting the PT-RS through at least one of the DM-RS ports on the subcarrier that is allocated to the PT-RS according to the bit field among the subset of subcarriers allocated to the DM-RS for the corresponding DM-RS port.

Alternatively or in addition, the radio device may be configured to access the radio channel through the DM-RS ports for an uplink transmission to the radio access node. The method may further comprise or trigger a step of receiving the PT-RS transmitted through at least one of the DM-RS ports on the subcarrier that is allocated to the PT-RS according to the bit field among the subset of subcarriers allocated to the DM-RS for the corresponding DM-RS port.

A DM-RS port through which the PT-RS is transmitted may also be referred to as PT-RS port. The expression "PT-RS" may collectively refer to the different PT-RSs transmitted on different DM-RS ports (port-specific PT-RS). Alternatively or in addition, the expression "PT-RS" may refer to the port-specific PT-RS, e.g., in the context of a certain PT-RS port.

The radio access node may provide radio access to at least one radio device on the radio channel. For each radio device, the PT-RS may be transmitted through each of one or two DM-RS ports.

The radio channel may comprise a single-user multiple-input multiple-output (SU-MIMO) channel that is accessed through two or more DM-RS ports. The PT-RS may be transmitted or received on each of at least two of the two or more DM-RS ports. The radio channel may comprise two or more layers and/or two or more DM-RS ports. The PT-RS may be transmitted or received for each of the two or more layers or through each of the two or more DM-RS ports.

The radio channel may comprise a multi-user multiple-input multiple-output (MU-MIMO) channel. Different DM-RS groups of the DM-RS ports may provide access to different radio devices. The PT-RS may be transmitted or received through at least one DM-RS port in each DM-RS group.

The MU-MIMO channel may comprise, for each of the multiple radio devices, at least one layer or at least one DM-RS port. For each of the multiple radio devices, the PT-RS may be transmitted or received on at least one layer or through at least one DM-RS port.

The subcarrier allocated to the PT-RS may be uniquely determined among the subset of subcarriers allocated to the DM-RS based on a combination of the bit field in the configuration message and the DM-RS port through which the PT-RS is transmitted or received.

The same value of the bit field may be indicative of different subcarriers allocated to the PT-RS transmitted or received through different DM-RS ports.

The bit field may be indicative of two candidate subcarriers for the PT-RS among the subset of subcarriers allocated to the DM-RS. The subcarrier allocated to the PT-RS may be determined among the two candidate subcarriers based on the DM-RS port through which the PT-RS is transmitted or received.

The subcarrier allocated to the PT-RS transmitted or received through the DM-RS port p may be given by $2 \cdot R \cdot m + S \cdot k' + \Delta(p)$. The bit field may be indicative of m. The value for k' may be determined by the DM-RS port p to be p mod 2.

The PT-RS may be transmitted or received through each of at least two different DM-RS ports. Alternatively or in combination, The PT-RS may be transmitted or received in each of an uplink transmission and a downlink transmission.

The DM-RS transmitted through the DM-RS port p may be subjected to an orthogonal cover code, OCC, in the time-domain, TD-OCC. Alternatively or in addition, the DM-RS transmitted through the DM-RS port p may be subjected to an OCC in the frequency domain, FD-OCC. The subcarrier allocated to the PT-RS may be determined among the subset of subcarriers allocated to the DM-RS based on a combination of the bit field, a DM-RS port dependency of the TD-OCC and a DM-RS port dependency of the FD-OCC. The combination may include the summation.

For example, the DM-RS port dependency of the TD-OCC may comprise $$TD\_offsetp = (p-1000 \text{ div } 2) \text{ div } R, \text{ or}$$

$$TD\_offsetp = floor((p-1000)/(2R))$$

for the DM-RS port p. Alternatively or in combination, the DM-RS port dependency of the FD-OCC may comprise $$FD\_offsetp = p \bmod 2$$

for the DM-RS port p.

Herein, R may be equal to 2 for the DM-RS configuration type 1 or equal to 3 for the DM-RS configuration type 2.

The TD-OCC may comprise a factor (e.g., a sign) according to $$wt(l') = [1-2 \cdot (TD\_offsetp)]l'.$$

Alternatively or in addition, the FD-OCC may comprises a factor (e.g., a sign) according to $$wt(l') = [1-2 \cdot (FD\_offsetp)]k'.$$

The configuration message may comprise, for each DM-RS port through which the PT-RS is transmitted or received, an instance of the bit field that is indicative of the subcarrier allocated to the PT-RS among the subset of subcarriers allocated to the DM-RS transmitted through the corresponding DM-RS port.

The PT-RS may be transmitted or received through one of the DM-RS ports. The one DM-RS port may be determined according to a predefined rule. For example, the DM-RS ports may be grouped in two or more disjoint DM-RS groups and the PT-RS may be transmitted or received through one of the DM-RS ports in each of the DM-RS groups. The one DM-RS port may be determined according to the predefined rule applied to each of the DM-RS groups.

The one DM-RS port through which the PT-RS is transmitted or received may be unspecified in the configuration message. Each of the radio access node and the radio device may determine the one DM-RS port through which the PT-RS is transmitted or received by applying the predefined rule independently.

Each of the DM-RS ports may be uniquely identified by a port index. The one of the DM-RS ports that is determined according to the predefined rule may be the DM-RS port with the lowest port index.

The PT-RS may comprise a tone on the subcarrier allocated to the PT-RS. The tone may correspond to a tone of the DM-RS transmitted through the corresponding DM-RS port on the same subcarrier. Herein, a tone may comprise a complex (e.g., Fourier) coefficient carried by one subcarrier or one resource elements (e.g., for the duration of one OFDM symbol). Each OFDM symbol may comprise a plurality of tones, each transmitted simultaneously on respective subcarriers. The tone may correspond to a harmonic Fourier component in the time-domain for the duration of the symbol length. Alternatively or in addition, the tone may refer to the modulation on one RE.

The PT-RS may be transmitted or received in multiple PRBs. The same subcarrier relative to the corresponding PRB may be allocated to the PT-RS in each of the PRBs. Furthermore, the same the subset of subcarriers may be allocated to the DM-RS in each of the PRBs.

A waveform of the transmission may include orthogonal frequency-division multiplexing (OFDM), particularly cyclic prefix (CP) OFDM (CP-OFDM). The tone may be an OFDM tone. The transmission may include a plurality of OFDM symbols per PRB, e.g., one slot Each DM-RS port may be mapped to a plurality of antenna ports according to a precoder. Different DM-RS ports may be mapped according to different precoders.

Some or each of the DM-RS ports may be beamformed according to the precoder. For example, for single-layer (Tx) beamforming on the radio channel, one DM-RS port may be used for accessing the radio channel. Alternatively, the DM-RS ports may be mapped to the antenna ports (e.g., in a one-to-one correspondence or a one-to-many correspondence).

The number of the subcarriers in the subset of subcarriers allocated to the DM-RS according to a DM-RS configuration type 1 may be twice the number of the subcarriers in the subset of subcarriers allocated to the DM-RS according to a DM-RS configuration type 2. The same size for the bit field may be used for each of the DM-RS configuration type 1 and the DM-RS configuration type 2. A most significant bit of the bit field may be ignored or set to zero for determining the subcarrier allocated to the PT-RS in the DM-RS configuration type 2.

The one aspect may be implemented at the RAN and/or by the radio access node, e.g., of the RAN. Herein, the expression radio access node may be used interchangeably with a base station or a cell of the RAN. The radio access node may encompass any station that is configured to provide radio access to one or more of the radio devices.

According to another aspect, a method of receiving a configuration message for a phase tracking reference signal, PT-RS, on a radio channel between a radio access node and a radio device is provided. The radio channel comprises a plurality of subcarriers in a physical resource block, PRB. A subset of the subcarriers in the PRB is allocated to a demodulation reference signal, DM-RS. The method comprises or triggers a step of receiving the configuration message from the radio access node. The configuration message comprises a bit field that is indicative of at least one subcarrier allocated to the PT-RS among the subset of subcarriers allocated to the DM-RS.

The one subcarrier allocated to the PT-RS may also be referred to as the PT-RS subcarrier of the PT-RS. The subcarriers allocated to the DM-RS may also be referred to as the DM-RS subcarriers. The subset of subcarriers allocated to the DM-RS (i.e., the subset comprising the DM-RS subcarriers) may also be referred to as DM-RS subset. The DM-RS subset may be a proper subset of the plurality of subcarriers in the PRB. In other words, the subset may include less subcarriers than a PRB.

By means of the bit field, the configuration message may signal a relative offset, e.g., relative to the pertinent subset of subcarriers allocated for the DM-RS. The parameter or function represented by the bit field may be referred to as subcarrier-offset or resource element offset (RE-offset) for the PT-RS, or briefly: "PTRS-RE-offset". The method may be implemented as a RE offset signaling for PT-RS.

The actual subcarrier used for PT-RS may depend on both the parameter "PTRS-RE-offset" and the subset of subcarriers allocated for the DM-RS. For example, if a DM-RS port is identified by a DM-RS port number, the actual subcarrier used for PT-RS may depend on both the parameter "PTRS-RE-offset" and the DM-RS port number.

Furthermore, a plurality of different DM-RSs may be transmitted on corresponding DM-RS ports. The DM-RS port number p may be among a set of DM-RS ports used for the radio channel, e.g., for performing a channel estimate of the radio channel and/or demodulating the radio channel as a data channel at a receiving side of the radio channel.

In order to avoid scheduling restriction and reduce the signaling overhead, the value of the bit field, i.e., the parameter "PTRS-RE-offset", represents a relative subcarrier index in the subset of subcarriers assigned for the DM-RS port in the particular transmission.

By transmitting the parameter "PTRS-RE-offset" as the configuration parameter in the bit field of the configuration message, scheduling restrictions may be avoided at least in some embodiments, because the group of possible PT-RS subcarriers is restricted to the subset of subcarriers used by, allocated to or scheduled for the DM-RS port associated with the PT-RS port.

Same embodiments (e.g., the embodiments in the aforementioned paragraph) or further embodiments may requires significantly less signaling overhead than the existing offset signaling, because a common indication of "PTRS-RE-offset" can be used for DL and UL. Alternatively or in addition, a common indication can be used for different PT-RS ports in SU-MIMO.

The bit field may comprise n bits that are indicative of the at least one subcarrier allocated to the PT-RS among the subset of subcarriers allocated to the DM-RS. A number of the plurality of subcarriers in the PRB may be greater than $2^n$.

The subset of subcarriers allocated to the DM-RS may be dynamically signaled.

The bit field may comprise 2 or 3 bits that are indicative of the at least one subcarrier allocated to the PT-RS among the subset of subcarriers allocated to the DM-RS. The number of the plurality of subcarriers in the PRB may be 12.

The bit field may be sized for representing any one of the subcarriers in the subset of subcarriers allocated to the DM-RS as the subcarrier allocated to the PT-RS.

The bit field may comprise n bits. A number of the subcarriers in the subset of subcarriers allocated to the DM-RS may be equal to or less than $2^n$.

Each subcarrier in the subset of subcarriers allocated to the DM-RS may be uniquely identified by an index. The bit field may be indicative of the index corresponding to the subcarrier allocated to the PT-RS.

The radio channel may be accessed through one or more DM-RS ports. A DM-RS may be transmitted or received through each DM-RS port. The subset of subcarriers allocated to the DM-RS may depend on the corresponding DM-RS port.

The subcarrier allocated to the PT-RS may be derived from the bit field for at least one of an uplink transmission of the PT-RS and a downlink transmission of the PT-RS.

Each of the one or more DM-RS ports may be uniquely identified by a DM-RS port index. Each transmission of the DM-RS (briefly: DM-RS transmission) may be defined with, or associated with, a DM-RS port index.

The one or more DM-RS ports may be located at (or may define) a transmitting side of the radio channel. The one or more DM-RS ports may be used by (e.g., located at) the radio access node for a downlink transmission. Alternatively or in addition, the one or more DM-RS ports may be used by (e.g., located at) the radio device for an uplink transmission.

Alternatively or in addition, the one or more DM-RS ports may be located at (or may define) a receiving side of the radio channel. For example, the transmitting side may initially define the DM-RS ports by transmitting a DM-RS, and the receiving side may define combining weights for a beamforming reception based on the received DM-RS. The one or more DM-RS ports may be used by (e.g., located at) the radio access node for an uplink reception. Alternatively or in addition, the one or more DM-RS ports may be used by (e.g., located at) the radio device for a downlink transmission.

The transmission over the radio channel may comprise one or more layers (also referred to as spatial streams). The number of layers may be equal to the number of DM-RS ports used for the transmission over the radio channel. The radio channel may be a multiple-input multiple-output (MIMO) channel being accessed through the DM-RS ports at the transmitting side (i.e., the input of the MIMO channel), optionally mapped to a plurality of transmitter antennas, and being received through a plurality of receiver-ports formed by antennas at a receiver side (i.e., the output of the MIMO channel).

The multiple transmitted layers may be separated in the spatial and/or polarization domain by a transmit precoder and separated in the receiver by performing a channel estimation and, optionally, suppression of interfering layers for the radio channel based on the DM-RS and/or the PT-RS received at the receiving side. For example, the transmission may be a multi-layer single user MIMO (SU-MIMO) transmission, wherein two or more layers may be accessed through two or more DM-RS ports.

The DM-RS may be used for at least one of precoding at the transmitting side and demodulating the radio channel at the receiving side.

The subset of subcarriers allocated to the DM-RS may depend on the corresponding DM-RS port. For each of the DM-RS ports, a subset of subcarriers in the PRB may be allocated to the DM-RS transmitted (or to be transmitted) through the corresponding DM-RS port. That is, a subset of subcarriers allocated to the DM-RS is associated with each DM-RS port. At least some of the subsets of subcarriers used for transmitting the DM-RSs through different DM-RS ports may be different. For example, the different subsets may be mutually disjoint.

The PRB may comprise 12 subcarriers given by an index $k \in \{0, \ldots, 11\}$. The subset of subcarriers allocated to the DM-RS being transmitted through the DM-RS port p may be given by $$\{2 \cdot R \cdot m + S \cdot k' + \Delta(p) \in \{0, \ldots, 11\} | k' \in \{0, 1\}, 0 \leq m < 6/R\},$$

wherein R=1, 2 or 3; S=1 or 2; and an offset $\Delta(p)$ depends on the DM-RS port p.

For a DM-RS configuration type 1, the parameters may be R=2, S=2 and $\Delta(p) \in \{0, 1\}$. For a DM-RS configuration type 2, the parameters may be R=3, S=1 and $\Delta(p) \in \{0, 2, 4\}$. In the above expression for the sets, the upper limit "11" may be replaced by $N_{sc}^{RB}-1$ upper limit 6/R may be replaced by $N_{sc}^{RB}/(2R)$.

The DM-RS may be derived from a sequence $r(2 \cdot m + k' + n_0)$, wherein $n_0 = N_{BWPi}^{start} N_{sc}^{RB}/R$, $N_{BWPi}^{start}$ is the start of the carrier bandwidth part in units of PRBs and $N_{sc}^{RB}=12$ is the number of subcarriers per PRB.

A different DM-RS may be transmitted through each of the DM-RS ports. Since different DM-RSs (e.g., orthogonal signals) are transmitted on different DM-RS ports, any dependency on the "DM-RS" may equally be expressed as a dependency on the corresponding "DM-RS port".

The DM-RSs transmitted through different DM-RS ports may be differentiated by at least one of an orthogonal cover code in the frequency domain, an orthogonal cover code in the time domain and the subset of subcarriers allocated to the DM-RS.

For example, each of the DM-RSs transmitted through different DM-RS ports may either use disjoint subsets of subcarriers or be orthogonally coded in the frequency domain.

One of the DM-RS ports may be associated with the PT-RS. The PT-RS may be transmitted or received through the DM-RS port associated with the PT-RS. The PT-RS may be transmitted or received on the subcarrier that is allocated to the PT-RS according to the bit field among the subset of subcarriers allocated to the DM-RS transmitted though the one DM-RS port.

The PT-RS and the DM-RS may be transmitted simultaneously or separately (e.g., in OFDM symbols or different PRBs, i.e., different slots or transmission time intervals, TTIs). Furthermore, the transmission of the PT-RS and the transmission of the DM-RS may overlap. A transmission duration of the PT-RS may be longer (e.g., multiple times longer) than a transmission duration of the DM-RS. For example, the PT-RS may be transmitted or received during one PRB comprising 14 OFDM symbols. The DM-RS may be transmitted during one or two OFDM symbols.

The subcarrier allocated to the PT-RS may be derived or derivable from the bit field for at least one of an uplink transmission of the PT-RS and a downlink transmission of the PT-RS.

The radio access node may be configured to access the radio channel through the DM-RS ports for a downlink transmission to the radio device. The method may further comprise or trigger a step of receiving the PT-RS transmitted or received through at least one of the DM-RS ports on the subcarrier that is allocated to the PT-RS according to the bit field among the subset of subcarriers allocated to the DM-RS for the corresponding DM-RS port.

Alternatively or in addition, the radio device may be configured to access the radio channel through the DM-RS ports for an uplink transmission to the radio access node. The method may further comprise or trigger a step of transmitting or receiving the PT-RS through at least one of the DM-RS ports on the subcarrier that is allocated to the PT-RS according to the bit field among the subset of subcarriers allocated to the DM-RS for the corresponding DM-RS port.

A DM-RS port through which the PT-RS is transmitted or received may also be referred to as PT-RS port. The expression "PT-RS" may collectively refer to the different PT-RSs transmitted or received on different DM-RS ports (port-specific PT-RS). Alternatively or in addition, the expression "PT-RS" may refer to the port-specific PT-RS, e.g., in the context of a certain PT-RS port.

The radio access node may provide radio access to at least one radio device on the radio channel. For each radio device, the PT-RS may be transmitted or received through each of one or two DM-RS ports.

The radio channel may comprise a single-user multiple-input multiple-output (SU-MIMO) channel that is accessed through two or more DM-RS ports. The PT-RS may be transmitted or received on each of at least two of the two or more DM-RS ports. The radio channel may comprise two or more layers and/or two or more DM-RS ports. The PT-RS may be transmitted or received for each of the two or more layers or through each of the two or more DM-RS ports.

The radio channel may comprise a multi-user multiple-input multiple-output (MU-MIMO) channel. Different DM-RS groups of the DM-RS ports may provide access to different radio devices. The PT-RS may be transmitted or received through at least one DM-RS port in each DM-RS group.

The MU-MIMO channel may comprise, for each of the multiple radio devices, at least one layer or at least one DM-RS port. For each of the multiple radio devices, the PT-RS may be transmitted or received on at least one layer or through at least one DM-RS port.

The subcarrier allocated to the PT-RS may be uniquely determined among the subset of subcarriers allocated to the DM-RS based on a combination of the bit field in the configuration message and the DM-RS port through which the PT-RS is transmitted or received.

The same value of the bit field may be indicative of different subcarriers allocated to the PT-RS transmitted or received through different DM-RS ports.

The bit field may be indicative of two or more candidate subcarriers for the PT-RS among the subset of subcarriers allocated to the DM-RS. The subcarrier allocated to the PT-RS may be determined among the candidate subcarriers based on the DM-RS port through which the PT-RS is transmitted or received, e.g., as a function of the DM-RS port index p or based on the DM-RS port through which the PT-RS is transmitted or received.

The subcarrier allocated to the PT-RS transmitted or received through the DM-RS port p may be given by $2 \cdot R \cdot m + S \cdot k' + \Delta(p)$. The bit field may be indicative of m. The value for k' may be determined by the DM-RS port p to be p mod 2.

The PT-RS may be transmitted or received through each of at least two different DM-RS ports. Alternatively or in combination, The PT-RS may be transmitted in each of an uplink transmission and a downlink transmission.

The DM-RS transmitted through the DM-RS port p may be subjected to an orthogonal cover code, OCC, in the time-domain, TD-OCC. Alternatively or in addition, the DM-RS transmitted through the DM-RS port p may be subjected to an OCC in the frequency domain, FD-OCC. The subcarrier allocated to the PT-RS may be determined among the subset of subcarriers allocated to the DM-RS based on a combination of the bit field, a DM-RS port dependency of the TD-OCC and a DM-RS port dependency of the FD-OCC. The combination may include the summation.

For example, the DM-RS port dependency of the TD-OCC may comprise $$TD\_offset_p = (p-1000 \text{ div } 2) \text{ div } R, \text{ or}$$

$$TD\_offset_p = \text{floor}((p-1000)/(2 \cdot R))$$

for the DM-RS port p. Alternatively or in combination, the DM-RS port dependency of the FD-OCC may comprise $$FD\_offset_p = p \text{ mod } 2$$

for the DM-RS port p.

Herein, R may be equal to 2 for the DM-RS configuration type 1 or equal to 3 for the DM-RS configuration type 2.

The TD-OCC may comprise a factor (e.g., a sign) according to $$w_t(l') - [1 - 2 \cdot (TD\_offset_p)]^{l'}.$$

Alternatively or in addition, the FD-OCC may comprises a factor (e.g., a sign) according to $$w_f(k') - [1 - 2 \cdot (FD\_offset_p)]^{k'}.$$

The configuration message may comprise, for each DM-RS port through which the PT-RS is transmitted or received, an instance of the bit field that is indicative of the subcarrier allocated to the PT-RS among the subset of subcarriers allocated to the DM-RS transmitted through the corresponding DM-RS port.

The PT-RS may be transmitted or received through one of the DM-RS ports. The one DM-RS port may be determined according to a predefined rule. For example, the DM-RS ports may be grouped in two or more disjoint DM-RS groups and the PT-RS may be transmitted or received through one of the DM-RS ports in each of the DM-RS groups. The one DM-RS port may be determined according to the predefined rule applied to each of the DM-RS groups.

The one DM-RS port through which the PT-RS is transmitted or received may be unspecified in the configuration message. Each of the radio access node and the radio device may determine the one DM-RS port through which the PT-RS is transmitted or received by applying the predefined rule independently.

Each of the DM-RS ports may be uniquely identified by a port index. The one of the DM-RS ports that is determined according to the predefined rule may be the DM-RS port with the lowest port index.

The PT-RS may comprise a tone on the subcarrier allocated to the PT-RS. The tone may correspond to a tone of the DM-RS transmitted through the corresponding DM-RS port on the same subcarrier. Herein, a tone may comprise a complex (e.g., Fourier) coefficient carried by one subcarrier or one resource elements (e.g., for the duration of one OFDM symbol). Each OFDM symbol may comprise a plurality of tones, each transmitted simultaneously on respective subcarriers. The tone may correspond to a harmonic Fourier component in the time-domain for the duration of the symbol length. Alternatively or in addition, the tone may refer to the modulation on one RE.

The PT-RS may be transmitted or received in multiple PRBs. The same subcarrier relative to the corresponding PRB may be allocated to the PT-RS in each of the PRBs. Furthermore, the same the subset of subcarriers may be allocated to the DM-RS in each of the PRBs.

A waveform of the transmission may include orthogonal frequency-division multiplexing (OFDM), particularly cyclic prefix (CP) OFDM (CP-OFDM). The tone may be an OFDM tone. The transmission may include a plurality of OFDM symbols per PRB, e.g., one slot Each DM-RS port may be mapped to a plurality of antenna ports according to a precoder. Different DM-RS ports may be mapped according to different precoders.

Some or each of the DM-RS ports may be beamformed according to the precoder. For example, for single-layer (Tx) beamforming on the radio channel, one DM-RS port may be used for accessing the radio channel. Alternatively, the DM-RS ports may be mapped to the antenna ports (e.g., in a one-to-one correspondence or a one-to-many correspondence).

The number of the subcarriers in the subset of subcarriers allocated to the DM-RS according to a DM-RS configuration type 1 may be twice the number of the subcarriers in the subset of subcarriers allocated to the DM-RS according to a DM-RS configuration type 2. The same size for the bit field may be used for each of the DM-RS configuration type 1 and the DM-RS configuration type 2. A most significant bit of the bit field may be ignored or set to zero for determining the subcarrier allocated to the PT-RS in the DM-RS configuration type 2.

The other method aspect may further comprise any feature or step disclosed in the context of any one method aspect. Furthermore, the other method aspect may comprise a feature or a step corresponding to any one of those of the one aspect.

The other method aspect may be performed by one or more radio devices, e.g., in the RAN. The radio device or each of the radio devices may be a user equipment (UE).

As to a system aspect, a method of transmitting and receiving a configuration message for a phase tracking reference signal (PT-RS) on a radio channel between a radio access node and a radio device is provided. The radio channel comprises a plurality of subcarriers in a physical resource block (PRB). A subset of the subcarriers in the PRB is allocated to a demodulation reference signal (DM-RS). The method comprises or triggers a step of transmitting the configuration message to the radio device. The configuration message comprises a bit field that is indicative of at least one subcarrier allocated to the PT-RS among the subset of subcarriers allocated to the DM-RS. The method further comprises or triggers a step of receiving the configuration message from the radio access node. The configuration message comprises the bit field that is indicative of at least one subcarrier allocated to the PT-RS among the subset of subcarriers allocated to the DM-RS.

As to another system aspect, a system for transmitting and receiving a configuration message for a phase tracking reference signal (PT-RS) on a radio channel between a radio access node and a radio device is provided. The radio channel comprises a plurality of subcarriers in a physical resource block (PRB). A subset of the subcarriers in the PRB is allocated to a demodulation reference signal (DM-RS). The system is configured to perform or trigger a step of transmitting the configuration message to the radio device. The configuration message comprises a bit field that is indicative of at least one subcarrier allocated to the PT-RS among the subset of subcarriers allocated to the DM-RS. The system is further configured to perform or trigger a step of receiving the configuration message from the radio access node. The configuration message comprises the bit field that is indicative of at least one subcarrier allocated to the PT-RS among the subset of subcarriers allocated to the DM-RS.

The system may be embodied by at least one of a radio access node and a radio device.

In any aspect, the radio device may be configured for peer-to-peer communication (e.g., on a sidelink) and/or for accessing the RAN (e.g. an uplink, UL, and/or a downlink, DL). The radio device may be a user equipment (UE, e.g., a 3GPP UE), a mobile or portable station (STA, e.g. a Wi-Fi STA), a device for machine-type communication (MTC) or a combination thereof. Examples for the UE and the mobile station include a mobile phone and a tablet computer. Examples for the portable station include a laptop computer and a television set. Examples for the MTC device include robots, sensors and/or actuators, e.g., in manufacturing, automotive communication and home automation. The MTC device may be implemented in household appliances and consumer electronics. Examples for the combination include a self-driving vehicle, a door intercommunication system and an automated teller machine.

Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

One device aspect relates to a device configured to perform the one method aspect. Alternatively or in addition, the device may comprise units or modules configured to perform any step of the one method aspect. Another device aspect relates to a device configured to perform the other method aspect. Alternatively or in addition, the device may comprise units or modules configured to perform any step of the other method aspect.

Furthermore, for each of the method aspects, a device may comprise at least one processor and a memory. Said memory comprises instructions executable by said at least one processor whereby the device is operative to perform the corresponding method aspect.

The device (or any node or station for embodying the technique) may further include any feature disclosed in the context of the method aspect. Particularly, any one of the units and modules, or a dedicated unit or module, may be configured to perform or trigger one or more of the steps of any one of the method aspect.

BRIEF DESCRIPTION OF THE DRAWINGS

Further details of embodiments of the technique are described with reference to the enclosed drawings, wherein:

FIGS. 14a and 14b show an example of PTRS fixed and configurable mapping and the available CSI-RS ports.

FIGS. 16a-16b show an example of PTRS collision with SSB with PTRS time density 1/4.

FIGS. 17a-17b show an example of encoding when no rank restriction is used (a) and when rank restriction is used (b).

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
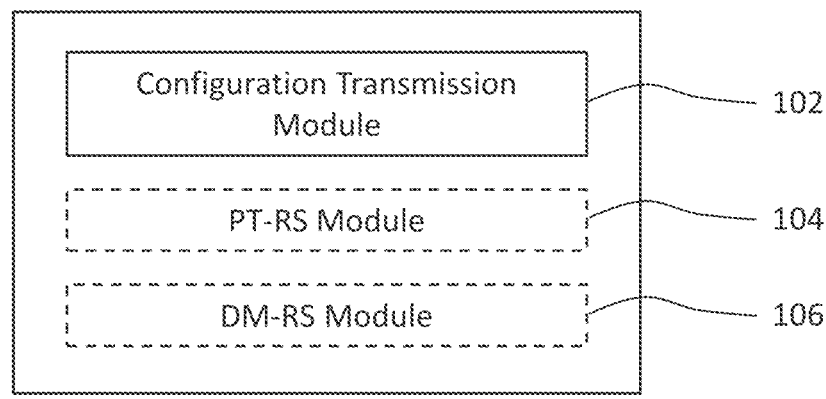
FIG. 1 shows a schematic block diagram of a device for transmitting a configuration message for a phase tracking reference signal.

FIG. 1 schematically illustrates a block diagram of a device for transmitting a configuration message for a phase tracking reference signal (PT-RS) on a radio channel between a radio access node and a radio device. The device is generically referred to by reference sign 100. The radio channel comprises a plurality of subcarriers in a physical resource block (PRB). A subset of the subcarriers in the PRB is allocated to a demodulation reference signal (DM-RS). The device 100 comprises a configuration transmission module 102 that transmits the configuration message to the radio device. The configuration message comprises a bit field that is indicative of at least one subcarrier allocated to the PT-RS among the subset of subcarriers allocated to the DM-RS.

The device 100 may be connected to and/or part of the RAN. The device 100 may be embodied by or at the radio access node (e.g., a base station of the RAN), nodes connected to the RAN for controlling the base station or a combination thereof.

Optionally, the device 100 comprises a PT-RS module 104 for at least one of transmitting, receiving and processing the PT-RS according to the configuration. Alternatively or in addition, the device 100 comprises a DM-RS module 106 for at least one of transmitting, receiving and processing the DM-RS. The PT-RS module 104 may be a function or submodule of the DM-RS module 106.

Any of the modules of the device 100 may be implemented by units configured to provide the corresponding functionality.

Figure 2:
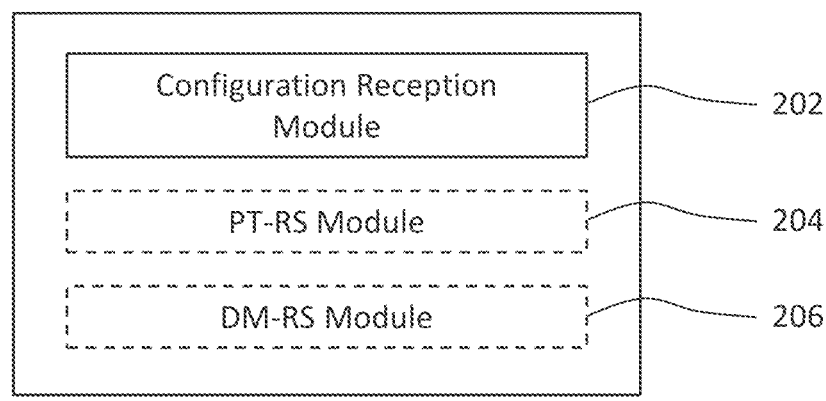
FIG. 2 shows a schematic block diagram of a device for receiving a configuration message for a phase tracking reference signal.

FIG. 2 schematically illustrates a block diagram of a device for receiving a configuration message for a phase tracking reference signal (PT-RS) on a radio channel between a radio access node and a radio device. The device is generically referred to by reference sign 200. The radio channel comprises a plurality of subcarriers in a physical resource block (PRB). A subset of the subcarriers in the PRB is allocated to a demodulation reference signal (DM-RS).

The device 200 comprises a configuration reception module 202 that receives the configuration message from the radio access node. The configuration message comprises a bit field that is indicative of at least one subcarrier allocated to the PT-RS among the subset of subcarriers allocated to the DM-RS.

The device 200 may be embodied by or at the radio device.

Optionally, the device 200 comprises a PT-RS module 204 for at least one of transmitting, receiving and processing the PT-RS according to the configuration. Alternatively or in addition, the device 200 comprises a DM-RS module 206 for at least one of transmitting, receiving and processing the DM-RS. The PT-RS module 204 may be a function or submodule of the DM-RS module 206.

Any of the modules of the device 200 may be implemented by units configured to provide the corresponding functionality.

Herein, the radio access node may encompass a network controller (e.g., a Wi-Fi access point) or a cellular radio access node (e.g. a 3G Node B, a 4G eNodeB or a 5G gNodeB). The radio access node may be configured to provide radio access to the radio device. Alternatively or in addition, the radio device may include a mobile or portable station, a user equipment (UE), particularly a device for machine-type communication (MTC) and a narrowband Internet of Things (NB-IoT) device. Two or more instances of the radio device may be configured to wirelessly connect to each other, e.g., in an ad-hoc radio network or via 3GPP sidelinks.

Figure 3:
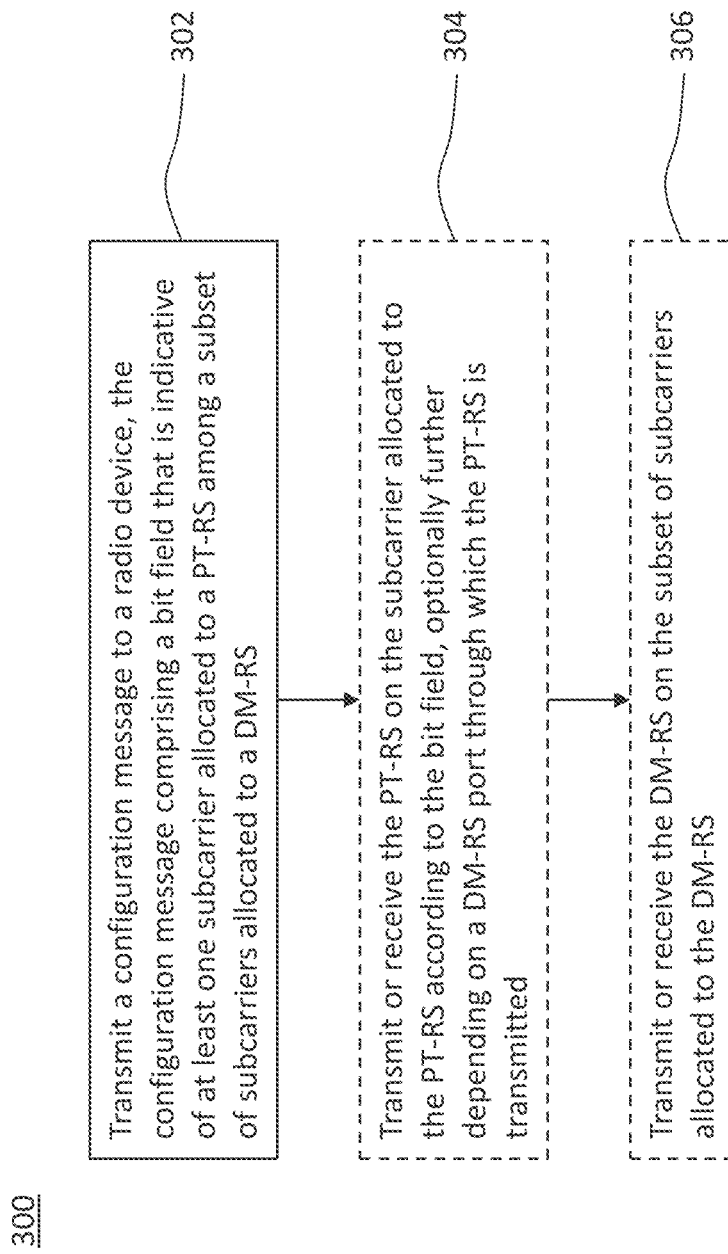
FIG. 3 shows a flowchart for a method of transmitting a configuration message for a phase tracking reference signal, which is implementable by the device of FIG. 1.

FIG. 3 shows a flowchart for a method 300 of transmitting a configuration message for a PT-RS on a radio channel between a radio access node and a radio device. The radio channel comprises a plurality of subcarriers in a (e.g., each) PRB. A subset of the subcarriers in the PRB is allocated to a DM-RS. In a step 302 of the method 300, the configuration message is transmitted to the radio device. The configuration message comprises a bit field that is indicative of at least one subcarrier allocated to the PT-RS among the subset of subcarriers allocated to the DM-RS.

Herein, "a subcarrier allocated to the PT-RS" may encompass a subcarrier that is used for transmitting the PT-RS or is scheduled for transmitting the PT-RS. Furthermore, "a subcarrier allocated to the PT-RS" may encompass two or more candidate subcarriers, one of which is eventually allocated to the PT-RS (e.g., used or scheduled for the PT-RS). For example, "a subcarrier allocated to the PT-RS" may encompass a zero-power PT-RS, i.e., the subcarrier is a PT-RS subcarrier but the radio access node (e.g., a gNB) is not transmitting anything on said PT-RS subcarrier. This PT-RS subcarrier may be used by another radio access node (e.g., another gNB). Thereby, interference can be avoided on said subcarrier.

Optionally, in a step 304, the PT-RS is processed, transmitted and/or received on the subcarrier allocated to the PT-RS according to the bit field.

The allocated subcarrier may further depend on a DM-RS port through which the PT-RS is transmitted. For example, an index of the subcarrier allocated to the PT-RS may be a function of both the bit field and an index of the DM-RS port. In one embodiment, which is compatible with any embodiment disclosed herein, the bit field may uniquely determine the subcarrier allocated to the PT-RS among the subset of subcarriers allocated to the DM-RS. In another embodiment, which is compatible with any embodiment disclosed, the bit field alone does not uniquely indicate, within the subset of subcarriers allocated to the DM-RS, the subcarrier for the PT-RS. A further dependency on the DM-RS port used for transmitting the PT-RS may eliminate latter ambiguity, so that the combination of port index and bit field uniquely determine the subcarrier for the PT-RS.

In a step 306, which may be simultaneous with the step 304, the DM-RS is processed, transmitted and/or received. Alternatively or in addition, the radio access node may signal changes for a configuration of the DM-RS at and/or to the radio device.

The method 300 may be performed by the device 100, e.g., at or using the radio access node (e.g., for the RAN). For example, the modules 102, 104 and 106 may perform the steps 302, 304 and 306, respectively.

Figure 4:
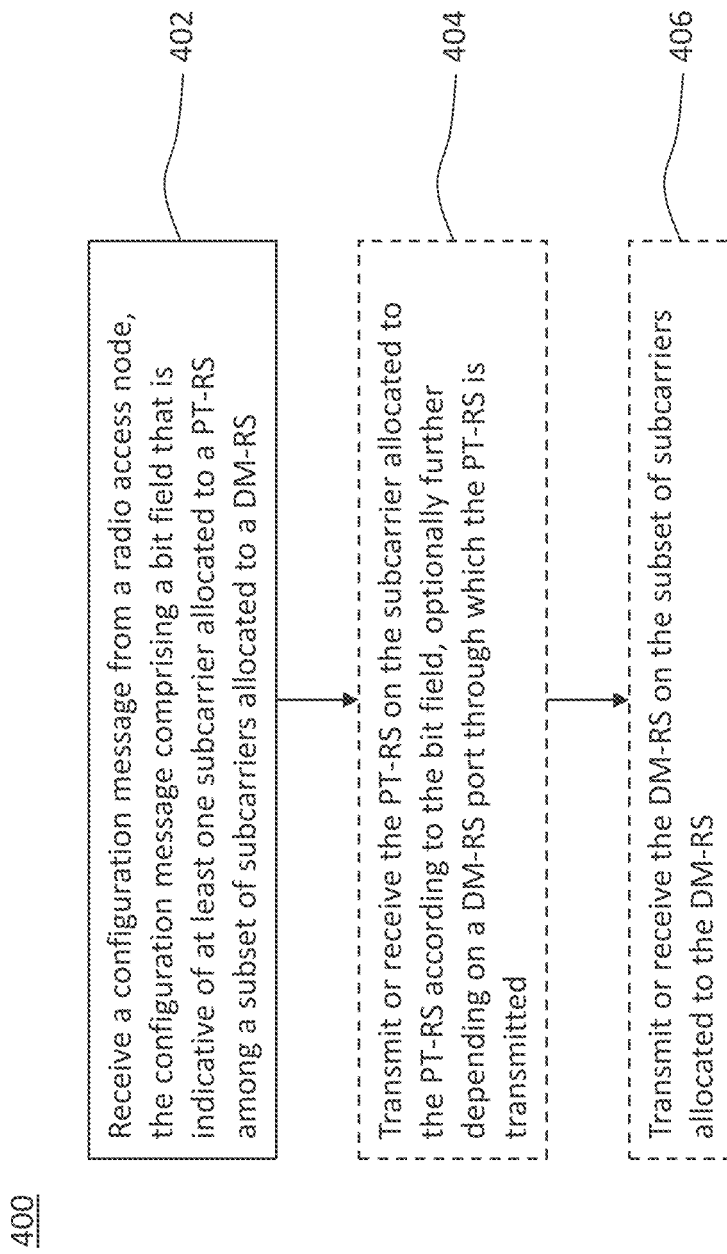
FIG. 4 shows a flowchart for a method of receiving a configuration message for a phase tracking reference signal, which is implementable by the device of FIG. 2.

FIG. 4 shows a flowchart for a method 400 of receiving a configuration message for a PT-RS on a radio channel between a radio access node and a radio device. The radio channel comprises a plurality of subcarriers in a (e.g., in each) PRB. A subset of the subcarriers in the PRB is allocated to a DM-RS. In a step 402 of the method 400, the configuration message is received from the radio access node. The configuration message comprises a bit field that is indicative of at least one subcarrier allocated to the PT-RS among the subset of subcarriers allocated to the DM-RS.

Optionally, in a step 404, the PT-RS is processed, transmitted and/or received on the subcarrier allocated to the PT-RS according to the bit field. For example, the subcarrier allocated to the PT-RS may be determined in the step 404 based on the bit field and, optionally, a DM-RS port on which the PT-RS is transmitted.

The radio device may process, transmit and/or receive the DM-RS according to the configuration message or another configuration received from the access node in a step 406.

The method 400 may be performed by the device 200, e.g., at or using the radio device. For example, the modules 202, 204 and 206 may perform the steps 402, 404 and 406, respectively.

Figure 5:
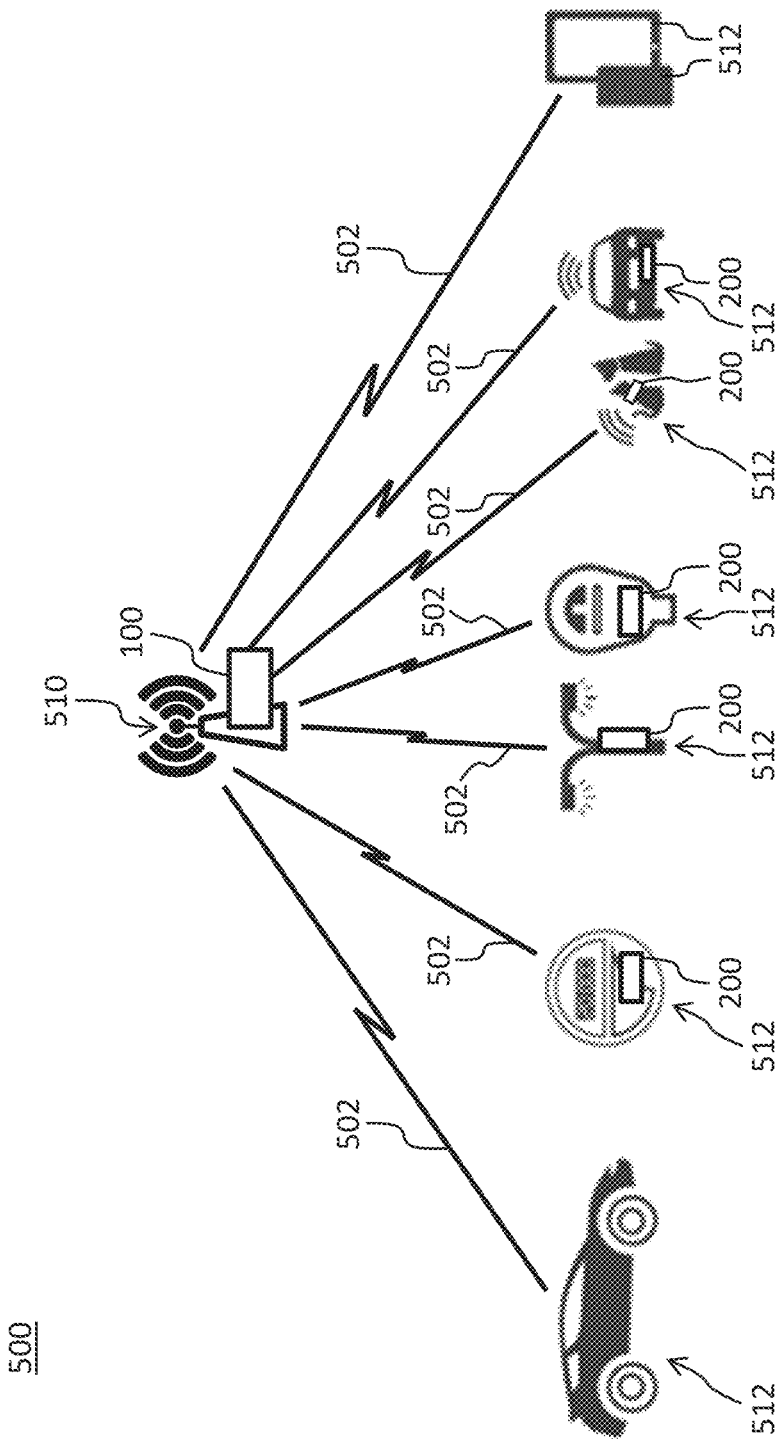
FIG. 5 schematically illustrates an exemplary deployment of embodiments of the devices of FIGS. 1 and 2.

FIG. 5 schematically illustrates an exemplary environment 500, e.g., a stand-alone or cellular radio access network (RAN) for implementing the technique. The environment 500 comprises a plurality of radio channels 502 between embodiments of the devices 100 and 200, respectively. In the environment 500 of FIG. 5, the device 100 is embodied by at least one base station or radio access node 510, which provides radio access or controls radio communications for at least one radio device 512, which embodies the device 200. It is not necessary that all radio devices 512 in radio communication 502 with the radio access node 510 embody the device 200.

In NR, phase tracking reference signal (PT-RS) can be configured for downlink and uplink transmissions in order for the receiver to correct phase noise related errors. The PT-RS configuration is UE-specific and it is agreed that the PT-RS is associated with one of the DM-RS ports used for the transmission, meaning that DM-RS and its associated PT-RS are transmitted using the same precoder and meaning that the modulated symbol used for the PT-RS is taken from the DM-RS, whatever DM-RS sequence is configured. It means that there is no specific configuration of the PT-RS sequence as it borrows from the DM-RS.

The UE shall assume the PDSCH DM-RS being mapped to physical resources according to type 1 or type 2 as given by the higher-layer parameter DL-DM-RS-config-type.

The UE shall assume the sequence r(m) is mapped to physical resource elements according to $$a_{k,l}^{(p,\mu)} = \beta_{DMRS} w_f(k') \cdot w_t(l') \cdot r(2m + k' + n_0)$$

$$k = \begin{cases} 4m + 2k' + \Delta & \text{Configuration type 1} \\ 6m + k' + \Delta & \text{Configuration type 2} \end{cases}$$

$$k' = 0, 1$$

$$l = \{l_0, \overline{l}\} + l'$$

under the condition that the resource elements (REs) are within the resources allocated for PDSCH transmission. The functions $w_f(k')$, $w_t(l')$ and $\Delta$ depend on the DM-RS port p according to Tables 7.4.1.1.2-1 and 7.4.1.1.2-2 in section 7.4 of the document 3GPP TS 38.211 (e.g., version 1.0.0) or below example tables.

A reference point for the subcarrier label is the start of the carrier bandwidth part in which the physical downlink shared channel (PDSCH) is transmitted with corresponding to the lowest-numbered subcarrier in the bandwidth part.

The offset $n_0$ is given by $$n_0 = \begin{cases} N_{BWP,i}^{start} N_{sc}^{RB}/2 & \text{for } DM-RS \text{ configuration type 1} \\ N_{BWP,i}^{start} N_{sc}^{RB}/3 & \text{for } DM-RS \text{ configuration type 2} \end{cases}$$

wherein $N_{BWPi}^{start}$ is the carrier bandwidth part within which the physical uplink shared channel (PUSCH) is transmitted.

In the time domain (TD), the reference point for l and the position $l_0$ of the first DM-RS symbol depends on the mapping type. For PDSCH mapping type A, 1 is defined relative to the start of the slot, and $l_0=3$ if the higher-layer parameter DL-DMRS-typeA-pos equals 3 and $l_0=2$ otherwise. For PDSCH mapping type B, l is defined relative to the start of the scheduled PDSCH resources, and $l_0=0$.

TABLE 7.4.1.1.2-1

Parameters for PDSCH DM-RS configuration type 1.

| p | Δ | $w_f(k')$ k'=0 | $w_f(k')$ k'=1 | $w_t(l')$ l'=0 | $w_t(l')$ l'=1 |
|---|---|---|---|---|---|
| 1000 | 0 | +1 | +1 | +1 | +1 |
| 1001 | 0 | +1 | −1 | +1 | +1 |
| 1002 | 1 | +1 | +1 | +1 | +1 |
| 1003 | 1 | +1 | −1 | +1 | +1 |
| 1004 | 0 | +1 | +1 | +1 | −1 |
| 1005 | 0 | +1 | −1 | +1 | −1 |
| 1006 | 1 | +1 | +1 | +1 | −1 |
| 1007 | 1 | +1 | −1 | +1 | −1 |

TABLE 7.4.1.1.2-2

Parameters for PDSCH DM-RS configuration type 2.

| p | Δ | $w_f(k')$ k'=0 | $w_f(k')$ k'=1 | $w_t(l')$ l'=0 | $w_t(l')$ l'=1 |
|---|---|---|---|---|---|
| 1000 | 0 | +1 | +1 | +1 | +1 |
| 1001 | 0 | +1 | −1 | +1 | +1 |
| 1002 | 2 | +1 | +1 | +1 | +1 |
| 1003 | 2 | +1 | −1 | +1 | +1 |
| 1004 | 4 | +1 | +1 | +1 | +1 |
| 1005 | 4 | +1 | −1 | +1 | +1 |
| 1006 | 0 | +1 | +1 | +1 | −1 |
| 1007 | 0 | +1 | −1 | +1 | −1 |
| 1008 | 2 | +1 | +1 | +1 | −1 |
| 1009 | 2 | +1 | −1 | +1 | −1 |
| 1010 | 4 | +1 | +1 | +1 | −1 |
| 1011 | 4 | +1 | −1 | +1 | −1 |

TABLE 7.4.1.1.2-3

Additional PDSCH DM-RS positions $\bar{l}$ for double-symbol DM-RS.

| Position of last PDSCH symbol | PDSCH mapping type A DL-DMRS-add-pos 0 | 1 | 2 | 3 | PDSCH mapping type B DL-DMRS-add-pos 0 | 1 | 2 | 3 |
|---|---|---|---|---|---|---|---|---|
| ≤7 | — | | | | — | | | |
| 8 | — | 7 | | | | | | |
| 9 | — | 9 | 6, 9 | | | | | |
| 10 | — | 9 | 6, 9 | | | | | |
| 11 | — | 9 | 6, 9 | 5, 8, 11 | — | | | |
| 12 | — | 11 | 7, 11 | 5, 8, 11 | | | | |
| 13 | — | 11 | 7, 11 | 5, 8, 11 | | | | |

The one or more positions of additional DM-RS symbols are given by $\bar{l}$ and the last OFDM symbol used for PDSCH in the slot according to Tables 7.4.1.1.2-3 and 7.4.1.1.2-4 in section 7.4 of the document 3GPP TS 38.211 (e.g., version 1.0.0) or below example tables.

The time-domain index l' and the supported antenna ports P are given by Table 7.4.1.1.2-5 in section 7.4 of the document 3GPP TS 38.211 (e.g., version 1.0.0) or below example table. A single-symbol DM-RS is used, if the higher-layer parameter DL-DMRS-len is equal to 1. Whether the single-symbol DM-RS or a double-symbol DM-RS is used is determined by the associated DCI, if the higher-layer parameter DL-DMRS-len is equal to 2.

TABLE 7.4.1.1.2-4

Additional PDSCH DM-RS positions $\bar{l}$ for double symbol DM-RS.

| Position of last PDSCH symbol | PDSCH mapping type A DL-DMRS-add-pos 0 | 1 | 2 | PDSCH mapping type B DL-DMRS-add-pos 0 | 1 | 2 |
|---|---|---|---|---|---|---|
| ≤7 | — | | | — | | |
| 8 | — | | | — | | |

TABLE 7.4.1.1.2-4-continued

Additional PDSCH DM-RS positions $\bar{l}$ for double symbol DM-RS.

| Position of last PDSCH symbol | Additional DM-RS positions $\bar{l}$ | | | | | |
|---|---|---|---|---|---|---|
| | PDSCH mapping type A DL-DMRS-add-pos | | | PDSCH mapping type B DL-DMRS-add-pos | | |
| | 0 | 1 | 2 | 0 | 1 | 2 |
| 9 | — | 8 | — | | | |
| 10 | — | 8 | — | | | |
| 11 | — | 8 | — | | | |
| 12 | — | 10 | — | | | |
| 13 | — | 10 | — | | | |

TABLE 7.4.1.1.2-5

PDSCH DM-RS time index $l'$ and antenna ports p.

| Single or double symbol DM-RS | $l'$ | Supported antenna ports p | |
|---|---|---|---|
| | | Configuration type 1 | Configuration type 2 |
| single | 0 | 1000-1003 | 1000-1005 |
| double | 0, 1 | 1000-1007 | 1000-1011 |

Figure 6:
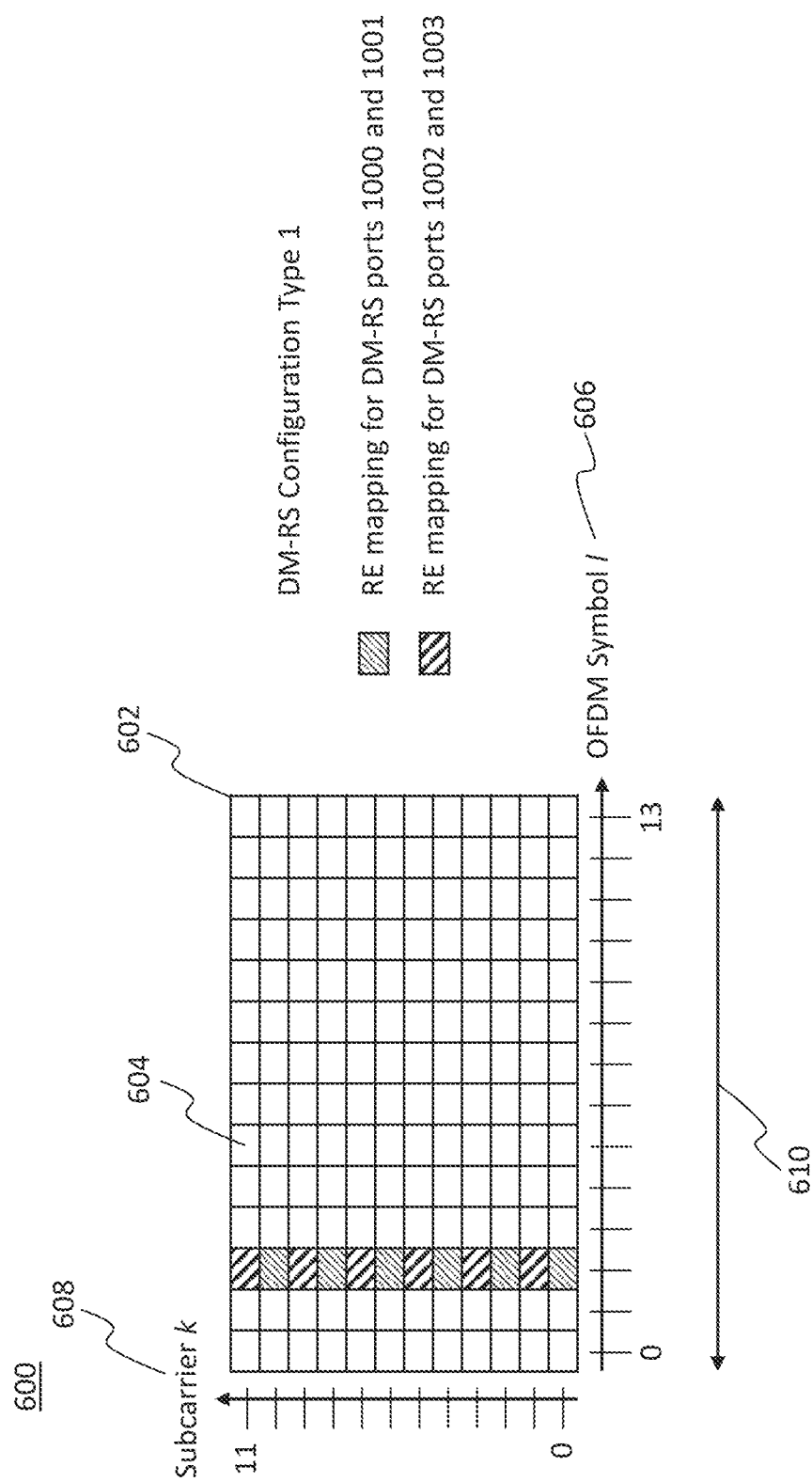
FIG. 6 schematically illustrates a first example for an allocation of resource elements for different demodulation reference signal ports.
Figure 7:
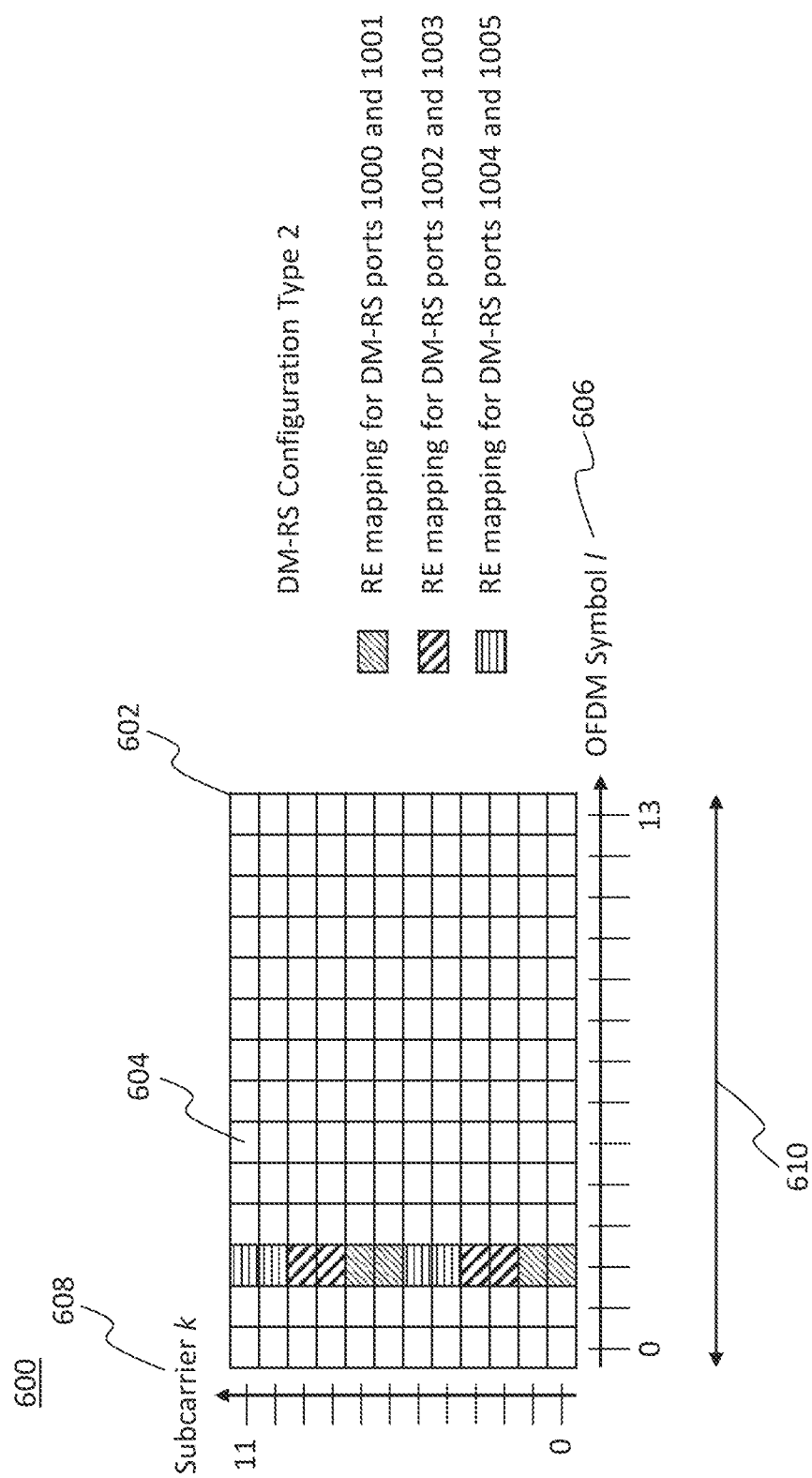
FIG. 7 schematically illustrates a second example for an allocation of resource elements for different demodulation reference signal ports.

In FIG. 6 and FIG. 7, the mapping of the different DM-RS ports for DM-RS configuration types 1 and 2 for single front-loaded cases is shown. In some embodiments the PT-RS is not scheduled when using an orthogonal cover code for the DM-RS in the time domain, i.e., TD-OCC for the DM-RS. In such embodiments, the PT-RS is not transmitted when using DM-RS ports 1004 to 1007 for DM-RS configuration type 1 and ports 1006 to 1011 for DM-RS configuration type 2.

Regarding the mapping of PT-RS in the frequency domain, 3GPP agreed that each PT-RS port is scheduled with at most 1 subcarrier per PRB. Also, it was agreed that the subcarrier used for a PT-RS port must be one of the subcarriers also used for the DM-RS port associated with the PT-RS port.

Figure 8:
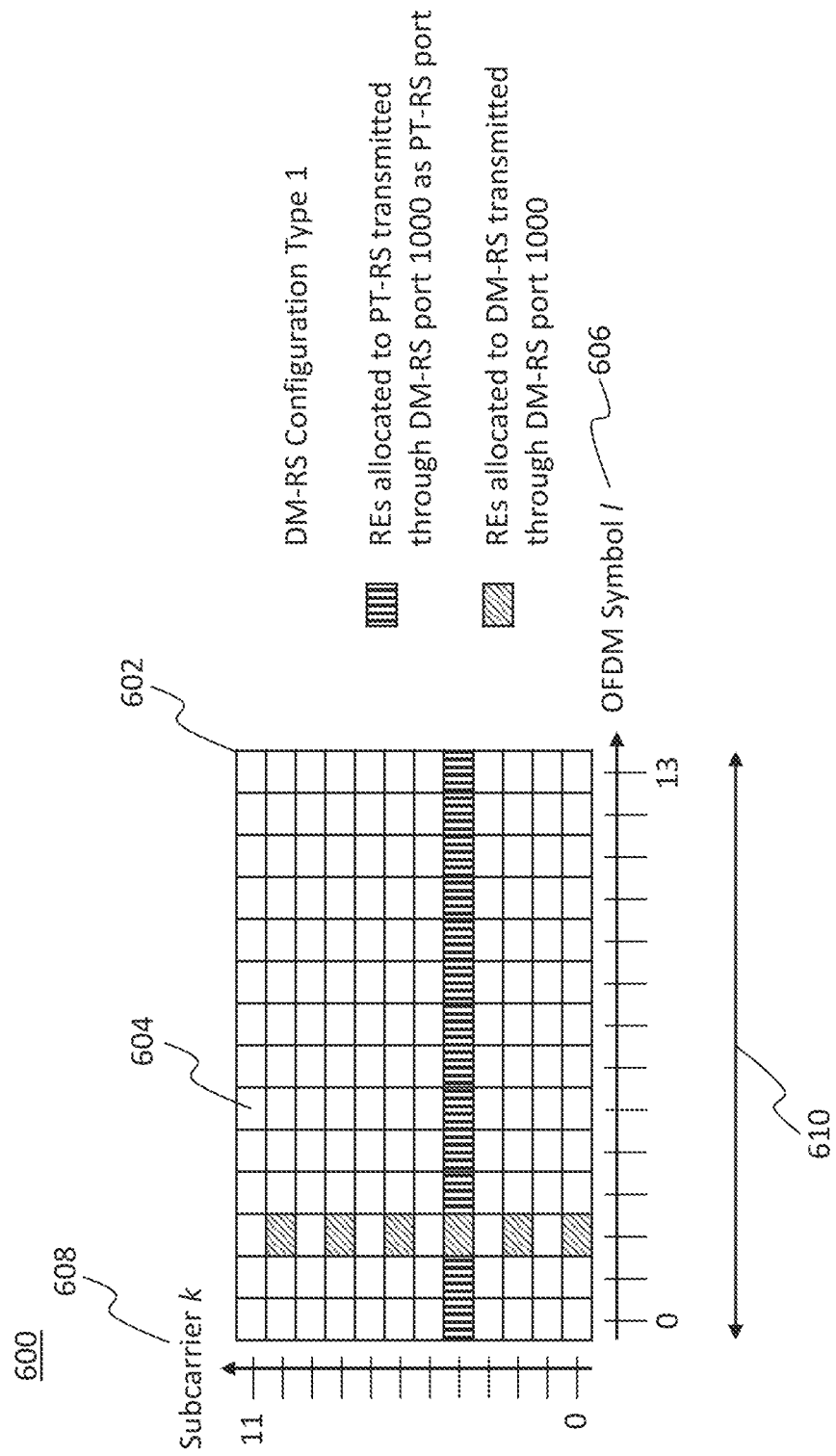
FIG. 8 schematically illustrates an example for a valid allocation of resource elements for a phase tracking reference signal.

FIG. 8 schematically illustrates an example for a radio resource allocation 600 in a PRB 602 comprising a grid of resource elements (RE) 604 in time 606 (e.g., in units of OFDM symbols) and frequency 608 (e.g., in units of subcarriers). While the allocation 600 schematically illustrated in FIG. 8 also includes the time domain (TD) 606 in order to illustrate the different durations and densities of the PT-RSs as compared to the DM-RSs, the technique may be implemented by a configuration mechanism that restricts the allocation 600 in the frequency domain (FD), i.e., in terms of subcarriers k.

A duration of the PRB 602 may correspond to one slot 610.

Figure 9:
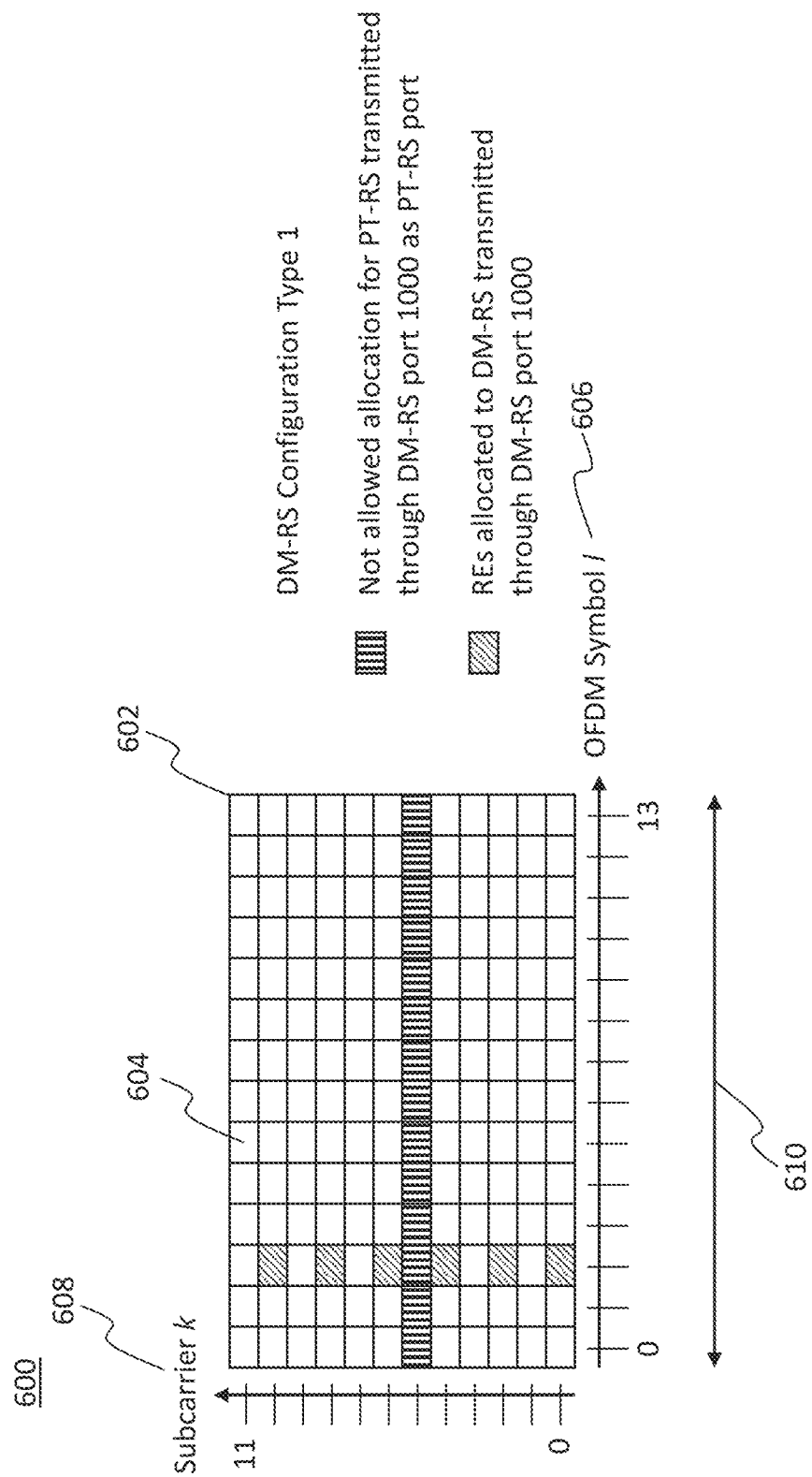
FIG. 9 schematically illustrates an example for an invalid allocation of resource elements for a phase tracking reference signal.

The example allocation 600 of subcarriers to the PT-RS is valid. In other words, the mapping of the PT-RS to REs 604 is allowed, since the subcarrier allocated to the PT-RS is in the subset of subcarriers allocated to the DM-RS. In contrast, the example allocation 600 schematically illustrated in FIG. 9 is not an allowed PT-RS mapping.

Hence, if a comb-based structure is used for DM-RS with repetition factor (RPF) R=2 (as in DM-RS configuration type 1), the DM-RS is mapped to every second subcarrier, i.e., the subset of subcarriers allocated to the DM-RS encompasses only every second subcarrier in the PRB 602. Consequently, the technique ensures that PT-RS is mapped only to one of the six DM-RS subcarriers in the subset out of the 12 subcarriers in this exemplary PRB 602.

In NR, a PRB has 12 subcarriers. Hence, the set of subcarriers of a PRB 602 is {0, 1, 2, 3, 4, 5, 6, 7, 8, 9, 10, 11}. In the existing solutions, "PTRS-RE-offset" can be set to any value of the set. However, this solution could lead to not supported cases, where a PT-RS port is not mapped to a subcarrier of the subset of subcarriers used by the DM-RS port associated with the PT-RS port. For example, for DM-RS configuration type 1 with PT-RS associated with DM-RS port 1000, and port 1000 maps to subcarriers {0,2,4,8,10,12} or {0,2,4,6,8,10} or all even subcarriers, then "PTRS-RE-offset" configured by RRC to be equal to any of 1,3,5,7,9, or 11 will lead to a non-supported case which implies a scheduling restriction.

If the conventional "PTRS-RE-offset" configured by the RRC layer is equal to any of 1, 3, 5, 7, 9 or 11, only DM-RS ports {1002, 1003, 1006, 1007} for DM-RS configuration type 1 can be used for PDSCH or PUSCH (since these DM-RS ports have the subcarrier offset α=1 according to the Table 7.4.1.1.2-1 above), which is a scheduling restriction.

Below Table 1 and Table 2 represent the existing encoding of the conventional parameter "PTRS-RE-offset" for DM-RS configuration types 1 and 2, respectively. Furthermore, the last column indicates the group of DM-RS ports for which the corresponding value of conventional "PTRS-RE-offset" leads to a supported case.

The existing encoding requires 4 bits to represent the conventional "PTRS-RE-offset" . The below Table 1 outlines a bitmap for the existing encoding of the conventional "PTRS-RE-offset" for DM-RS configuration type 1.

| PTRS-RE-offset value | Subcarrier used for PT-RS | Compatible DM-RS ports |
|---|---|---|
| 0000 | 0 | 1000/1001/1004/1005 |
| 0001 | 1 | 1002/1003/1006/1007 |
| 0010 | 2 | 1000/1001/1004/1005 |
| 0011 | 3 | 1002/1003/1006/1007 |
| 0100 | 4 | 1000/1001/1004/1005 |
| 0101 | 5 | 1002/1003/1006/1007 |
| 0110 | 6 | 1000/1001/1004/1005 |
| 0111 | 7 | 1002/1003/1006/1007 |
| 1000 | 8 | 1000/1001/1004/1005 |
| 1001 | 9 | 1002/1003/1006/1007 |
| 1010 | 10 | 1000/1001/1004/1005 |
| 1011 | 11 | 1002/1003/1006/1007 |

Similarly, the below Table 2 outlines a bitmap for the existing encoding of the conventional "PTRS-RE-offset" for DM-RS configuration type 2.

| PTRS-RE-offset value | Subcarrier used for PT-RS | Compatible DM-RS ports |
|---|---|---|
| 0000 | 0 | 1000/1001/1006/1007 |
| 0001 | 1 | 1000/1001/1006/1007 |
| 0010 | 2 | 1002/1003/1008/1009 |
| 0011 | 3 | 1002/1003/1008/1009 |
| 0100 | 4 | 1004/1005/1010/1011 |
| 0101 | 5 | 1004/1005/1010/1011 |
| 0110 | 6 | 1000/1001/1006/1007 |
| 0111 | 7 | 1000/1001/1006/1007 |
| 1000 | 8 | 1002/1003/1008/1009 |
| 1001 | 9 | 1002/1003/1008/1009 |
| 1010 | 10 | 1004/1005/1010/1011 |
| 1011 | 11 | 1004/1005/1010/1011 |

The technique may reduce the signaling overhead (e.g., as compared to the existing encoding of the convention parameter) by transmitting a parameter "PTRS-RE-offset" (i.e., the bit field) that is used or usable to generate a relative index to one of the elements in the subset of subcarriers used by or allocated to the DM-RS port associated with the PT-RS.

Any embodiment described herein may implement at least one of the following features. A subset S p of subcarriers used by (or allocated to) the DM-RS port p within a PRB 602 is defined. A relative index to one of the elements of S p is denoted as I Re l. The relative index is defined (e.g., generated or derived) as a function of the bit field PTRS-RE-offset and, optionally, the port number p in accordance with:

$$I_{Rel} = f(\text{PTRS-RE-offset}, p).$$

The PT-RS subcarrier is determined by $S_p(I_{Rel})$, wherein S p(·) denotes the ordered subset $S_p$, e.g., an array.

The subsets, $S_p$, of subcarriers for DM-RS ports are shown in below Table 3 and Table 4 for DM-RS configuration types 1 and 2, respectively, for the case of a single-symbol DM-RS.

Below Table 3 lists the subsets of subcarriers for the DM-RS configuration type 1 assuming a single-symbol DM-RS. The subsets depend on the DM-RS port p.

| DM-RS port, p | Subset of DM-RS subcarriers in the PRB, $S_p$ |
|---|---|
| 1000 | {0, 2, 4, 6, 8, 10} |
| 1001 | {0, 2, 4, 6, 8, 10} |
| 1002 | {1, 3, 5, 7, 9, 11} |
| 1003 | {1, 3, 5, 7, 9, 11} |

Below Table 4 lists the subsets of subcarriers for DM-RS configuration type 2 assuming a single-symbol DM-RS. The subsets depend on the DM-RS port p.

| DM-RS port, p | Subset of DM-RS subcarriers in the PRB, $S_p$ |
|---|---|
| 1000 | $S_p$ = {0, 1, 6, 7} |
| 1001 | $S_p$ = {0, 1, 6, 7} |
| 1002 | $S_p$ = {2, 3, 8, 9} |
| 1003 | $S_p$ = {2, 3, 8, 9} |
| 1004 | $S_p$ = {4, 5, 10, 11} |
| 1005 | $S_p$ = {4, 5, 10, 11} |

In a first variant, which may be implemented in any embodiment described herein, the bit field is indicative of the relative index. The first variant may provide full flexibility for the base station or network when configuring the subcarrier to be used by the PT-RS.

For the full indication flexibility, the relative index may be used as the bit field, that is, the function may be $$f(\text{PTRS-RE-offset}, p) = \text{PTRS-RE-offset}. \quad \text{(Eq. 1)}$$

Hence, the relative index is fixed and equal to the RRC configured parameter PTRS-RE-offset. The relative index does not depend dynamically on the associated DM-RS port.

The relative index selects a subcarrier among the subcarriers used by the DM-RS ports used for the particular PDSCH or PUSCH scheduling. If more than one DM-RS port is used for data scheduling, then a predefined rule is used, such as that the PT-RS port is associated with the DM-RS port with lowest index.

Based on the subsets defined in Table 3 and Table 4 for the respective DM-RS configuration types, the bit field value, i.e. the relative index PTRS-RE-offset may be indicative of the subcarrier for the PT-RS in the PRB. Since the subsets are complete for a given DM-RS port, the encoding according to the first variant provides full flexibility when configuring the corresponding PT-RS subcarrier for the DM-RS ports. Without limitation, the encoding according to the technique is shown in Table 5 and 6 for the DM-RS configuration types 1 and 2, respectively.

An example for implementing the first variant follows. If a PT-RS port that is associated with DM-RS port 1000 (with $S_{1000}$={0,2,4,6,8,10}) and PTRS-RE-offset=2 (i.e. 010 in binary representation) has been configured to the UE using RRC signaling, then the PT-RS is mapped to subcarrier $S_{1000}(2)$=4. If a MIMO transmission is used, where DM-RS ports 1000,1001,1002 and 1003 are used, then a predefined rule applies that the lowest indexed DM-RS port (1000 in this case) is used to determine the subcarrier for the PT-RS port according to the described rule (i.e., Table 3 or 4).

In case multiple DM-RS groups are configured, then the procedure is applied per DM-RS group, hence one PT-RS subcarrier is selected per DM-RS group.

When receiving PDSCH, the UE should assume the PT-RS is present on this subcarrier and when transmitting PUSCH, the UE should transmit PT-RS on this subcarrier in the PRBs assigned for PT-RS transmission.

Embodiments of the first variant can reduce the RRC signaling overhead to 3 bits. Moreover, a common indication of "PTRS-RE-offset" for downlink (DL) and uplink (UL) can be used, because any value of the parameter "PTRS-RE-offset" can be used with any DM-RS port. Therefore, a common indication of "PTRS-RE-offset" may be applied for DL and UL. The signaling overhead is reduced with respect to the existing encoding and/or further reduced with respect to an implementation of the technique separately for UL and DL.

Moreover, the first variant may be implemented to avoid the DC subcarrier, since the RRC signaling can control which subcarriers the PT-RS may be mapped to (depending on the used DM-RS port).

In order to have a harmonized signaling for DM-RS configuration types 1 and 2, for DM-RS configuration type 2 just the 2 LSB (e.g., the 2 least significant bits) of PTRS-RE-offset are used for generating the relative index. As a result, a value and/or a common size (or signal format) for the PTRS-RE-offset, i.e., for the bit field, can be used together with both DM-RS configuration types 1 and 2. Furthermore, the configuration message, i.e., the PTRS-RE-offset parameter, does not have to be transmitted or signaled again (e.g., to comply with a configuration type-dependent format for the bit field) when changing the used DM-RS configuration type in the transmission.

However, for the SU-MIMO case with more than 1 scheduled PT-RS port, an independent indication of PTRS-RE-offset is required for every PT-RS port. The main reason is that if the PT-RS ports are associated with DM-RS ports with the same subset of subcarriers, with common PTRS-RE-offset indication the PT-RS ports would be mapped to the same subcarrier (meaning a high level of interference between PT-RS ports). So independent indication is required.

Below Table 5 represents the subcarrier index (i.e., actual index in the PRB and not the relative index in the subset) as derived from the bit field, i.e., the parameter "PTRS-RE-offset" in the first column, as an implementation of the technique. The Table 5 may be implemented as an encoding mechanism for full flexibility based on the parameter "PTRS-RE-offset".

Without limitation, the below Table 5 assumes the DM-RS configuration type 1 and a single-symbol DM-RS.

| PTRS-RE- | Subcarrier index for PT-RS mapping in the PRB | | | |
|---|---|---|---|---|
| offset, e.g., signaled by RRC | DM-RS port 1000 | DM-RS port 1001 | DM-RS port 1002 | DM-RS port 1003 |
| 000 | 0 | 0 | 1 | 1 |
| 001 | 2 | 2 | 3 | 3 |
| 010 | 4 | 4 | 5 | 5 |
| 011 | 6 | 6 | 7 | 7 |
| 100 | 8 | 8 | 9 | 9 |
| 101 | 10 | 10 | 11 | 11 |

Below Table 6 represents the subcarrier index as derived from the bit field, i.e., the parameter "PTRS-RE-offset" in the first column, as an implementation of the technique. The Table 6 may be implemented as an encoding mechanism for full flexibility based on the parameter "PTRS-RE-offset".

The below Table 6 relates to a DM-RS configuration type with a smaller subset, so that the MSB (e.g., most significant bit) in the parameter "PTRS-RE-offset" is ignored. Without limitation, the Table 6 assumes the DM-RS configuration type 2 and a single-symbol DM-RS.

| PTRS-RE-offset, e.g., | Subcarrier index for PT-RS | | | | | |
|---|---|---|---|---|---|---|
| signaled by RRC | DM-RS port 1000 | DM-RS port 1001 | DM-RS port 1002 | DM-RS port 1003 | DM-RS port 1004 | DM-RS port 1005 |
| y00 | 0 | 0 | 2 | 4 | 4 | 4 |
| y01 | 1 | 1 | 3 | 3 | 5 | 5 |
| y10 | 6 | 6 | 8 | 8 | 10 | 10 |
| y11 | 7 | 7 | 9 | 9 | 11 | 11 |

In a second variant, which may be implemented in any embodiment described herein, the bit field is indicative of a relative index with reduced flexibility.

In order to further reduce the signaling overhead and be able to use common indication of "PTRS-RE-offset" for all the PT-RS ports scheduled for SU-MIMO, an alternative function (i.e., a function applied in the second variant) for generating the relative index may be defined.

An example for the function according to the second variant is $$f(\text{PTRS-RE-offset}, p) = 2 \cdot \text{PTRS-RE-offset} + \text{offset}_p, \quad \text{(Eq. 2)}$$

wherein $\text{offset}_p$ is a parameter related to the OCC values used by DM-RS port p. Hence, the relative index also depends dynamically on the one or more selected DM-RS ports for scheduling.

The value of $\text{offset}_p$ for DM-RS port p can be obtained as $\text{offset}_p = p \mod 2$. The function in Eq. 2 reduces the flexibility of the indication, because not all the PT-RS ports can be mapped to any subcarrier. However, this reduction of the flexibility does not have an impact on the performance, e.g., because the base station 510 or RAN is still enabled to avoid the DC subcarrier for any PT-RS port.

The $\text{offset}_p$ parameter ensures that two PT-RS ports associated with DM-RS ports with the same comb but different OCC are mapped to different subcarriers for the same value of PTRS-RE-offset. Hence, a common indication of PTRS-RE-offset for SU-MIMO (i.e., for the number of PT-RS ports being higher than 1) is enabled. Alternatively or in addition, in case two or more UEs 512 have been configured with the same PTRS-RE-offset parameter (e.g., by RRC), the two or more UEs 512 can still be scheduled with a single layer each in MU-MIMO scheduling (e.g., DM-RS ports 1000 and 1001, respectively), since it is ensured that each DM-RS port maps PT-RS to a unique subcarrier.

In below Table 7 and Table 8, the value of offset p for different DM-RS ports for DM-RS configuration types 1 and 2, respectively, are shown. Based on the previous tables and on the function in Eq. 2 to generate the relative index. An implementation of the second variant is shown in below Table 9 and Table 10, which outline the encoding of PTRS-RE-offset and the corresponding PT-RS subcarrier for the DM-RS ports in DM-RS configuration types 1 and 2, respectively.

An example for implementing the second variant follows. If the PT-RS port is associated with the DM-RS port 1000 (with $S_{1000} = \{0, 2, 4, 6, 8, 10\}$ and $\text{offset}_{1000} = 0$) and PTRS-RE-offset=2, the PT-RS is mapped to the subcarrier $S_{1000}$ (2·2+0)=8.

The below Table 7 indicates the offset p as a function of the DM-RS port p. Without limitation, the DM-RS configuration type 1 is assumed in Table 7.

| DM-RS port, p | $\text{offset}_p$ |
|---|---|
| 1000 | 0 |
| 1001 | 1 |
| 1002 | 0 |
| 1003 | 1 |

The below Table 8 indicates the offset p as a function of the DM-RS port p. Without limitation, the DM-RS configuration type 2 is assumed in Table 8.

| DM-RS port, p | $\text{offset}_p$ |
|---|---|
| 1000 | 0 |
| 1001 | 1 |
| 1002 | 0 |
| 1003 | 1 |
| 1004 | 0 |
| 1005 | 1 |

An implementation of the second variant is shown in below Table 9. The subcarrier for the PT-RS is derived from a combination of the indication in the bit field and the DM-RS port p, namely the $\text{offset}_p$. The Table 9 may be implemented as a mechanism for encoding and decoding the "PTRS-RE-offset". Without limitation, below Table 9 assumes the DM-RS configuration type 1 and a single-symbol DM-RS. Inspection of the Table 9 shows that each DM-RS port maps the PT-RS to a unique subcarrier.

| PTRS-RE-offset, e.g., as signaled by RRC | Subcarrier index for PT-RS | | | |
|---|---|---|---|---|
| | DM-RS port 1000 | DM-RS port 1001 | DM-RS port 1002 | DM-RS port 1003 |
| 00 | 0 | 2 | 1 | 3 |
| 01 | 4 | 6 | 5 | 7 |
| 10 | 8 | 10 | 9 | 11 |

A further implementation of the second variant, which is combinable with the previous implementation, is shown in below Table 10. The subcarrier for the PT-RS is derived from a combination of the indication in the bit field and the DM-RS port p, namely the offset$_p$. Below Table 10 applies to the DM-RS configuration type with the smaller subsets. Hence, the MSB in the bit field is ignored.

The below Table 10 may be implemented as a mechanism for encoding and decoding the "PTRS-RE-offset". Without limitation, Table 10 assumes the DM-RS configuration type 2 and a single-symbol DM-RS. Inspection of the Table 10 shows that each DM-RS port maps the PT-RS to a unique subcarrier.

| PTRS-RE-offset, e.g., signaled by RRC | Subcarrier index for PT-RS | | | | | |
|---|---|---|---|---|---|---|
| | DM-RS port 1000 | DM-RS port 1001 | DM-RS port 1002 | DM-RS port 1003 | DM-RS port 1004 | DM-RS port 1005 |
| y0 | 0 | 1 | 2 | 3 | 4 | 5 |
| y1 | 6 | 7 | 8 | 9 | 10 | 11 |

Implementation of the second variant can reduce the required overhead to 2 bits. Moreover, a common indication for DL and UL can be used, since the second variant enables using any value of the parameter "PTRS-RE-offset" with any DM-RS port. Also, for the case of SU-MIMO with more than one PT-RS being scheduled, a single indication of PTRS-RE-offset (e.g., a single transmission of the bit field) can provide different subcarriers for PT-RS ports associated with different DM-RS ports, thus reducing the overhead with respect to the existing usage of the offset.

In order to have a harmonized signaling for DM-RS configuration types 1 and 2, for DM-RS configuration type 2 just the 1 LSB (e.g., the 1 least significant bit) of PTRS-RE-offset is used for generating the relative index. As a result, a value for the parameter PTRS-RE-offset (i.e., the bit field) may be used in or applied to both DM-RS configuration types 1 and 2, e.g., without the need of newly signaling the PTRS-RE-offset when changing the used DM-RS configuration type in the transmission.

For clarity and without limitation, above embodiments and variants have been described for DM-RS ports that do not apply a coding in the time domain. The following implementation provides the relative index with reduced flexibility with DM-RS ports that apply such a temporal coding, e.g., an orthogonal cover code in the time domain (TD-OCC). The following implementation is combinable with any other embodiment or variant described herein.

In order to make the PTRS-RE-offset signaling compatible with the cases where TD-OCC applied to the DM-RS together with PT-RS is used (i.e., ports 1004-1007 for DM-RS type 1 and ports 1006-1011 for DM-RS type 2 for sub-6 scenarios), a further function f for determining the relative index is provided. The function may be implemented to generate the relative index as described in the second variant for the DM-RS ports without TD-OCC. That is, the following implementation may be compatible with the above second variant for the appropriate DM-RS ports.

An exemplary function for DM-RS type 1 is $$f(\text{PTRS-RE-offset}, p) = \text{PTRS-RE-offset} + \text{FD\_offset}_p + 2 \cdot \text{TD\_offset}_p \bmod 6, \quad \text{(Eq. 3-1)}$$

wherein FD_offset$_p$ is a parameter related to the values of the frequency domain OCC (FD-OCC) used by the DM-RS port p. The parameter TD offset p is related to the TD-OCC values used by DM-RS port p. Hence, the relative index also depends dynamically on the selected DM-RS port(s) for scheduling.

More specifically, and without limitation:

$$\text{FD\_offset}_p = p \bmod 2, \text{ and}$$

$$\text{TD\_offset}_p = \left\lfloor \frac{p - 1000}{4} \right\rfloor.$$

In below Tables 11 and 12, an encoding of PTRS-RE-offset, i.e., the bit field, using the presented scheme is shown.

An exemplary function for DM-RS type 2 is $$f(\text{PTRS-RE-offset}, p) = \text{PTRS-RE-offset} + \text{FD\_offset}_p + 2 \cdot \text{TD offset}_p \bmod 4, \quad \text{(Eq. 3-2)}$$

wherein FD_offset$_p$ is a parameter related to the FD-OCC values used by DM-RS port p, and TD_offset$_p$ is a parameter related to the TD-OCC values used by DM-RS port p. A similar definition of FD offset p and TD offset p may be applied, e.g., $$\text{FD\_offset}_p = p \bmod 2, \text{ and}$$

$$\text{TD\_offset}_p = \left\lfloor \frac{p - 1000}{6} \right\rfloor.$$

Hence, the relative index, as generated by the function f, also depends dynamically on the one or more selected DM-RS ports for scheduling. In below Tables 13 and 14, the encoding of the bit field, i.e. PTRS-RE-offset, using the presented scheme is shown.

The schemes for DM-RS types 1 and 2 offer different PT-RS subcarriers for different DM-RS ports.

Below Table 11 outlines an encoding of the "PTRS-RE-offset" for DM-RS configuration type 1 assuming a 2 DM-RS symbols for ports 1000 to 1003. It can be seen that each DM-RS port maps PT-RS to a unique subcarrier.

| PTRS-RE- | Sub-carrier index for PT-RS | | | |
|---|---|---|---|---|
| offset by RRC | DMRS port 1000 | DMRS port 1001 | DMRS port 1002 | DMRS port 1003 |
| 00 | 0 | 2 | 1 | 3 |
| 01 | 2 | 4 | 3 | 5 |
| 10 | 4 | 6 | 5 | 7 |
| 11 | 6 | 8 | 7 | 9 |

Below Table 12 outlines an encoding of "PTRS-RE-offset" for DM-RS configuration type 1 assuming a 2 DM-RS symbol for ports 1004 to 1008. It can be seen that each DM-RS port maps PT-RS to a unique subcarrier.

| PTRS-RE- | Sub-carrier index for PT-RS | | | |
|---|---|---|---|---|
| offset by RRC | DMRS port 1004 | DMRS port 1005 | DMRS port 1006 | DMRS port 1007 |
| 00 | 4 | 6 | 5 | 7 |
| 01 | 6 | 8 | 7 | 9 |
| 10 | 8 | 10 | 9 | 11 |
| 11 | 10 | 0 | 11 | 1 |

Below Table 13 outlines an encoding of "PTRS-RE-offset" for DM-RS type 2 assuming a 2 DM-RS symbol for ports 1000 to 1005. It can be seen that each DM-RS port maps PT-RS to a unique subcarrier.

| PTRS-RE- | Sub-carrier index for PT-RS | | | | | |
|---|---|---|---|---|---|---|
| offset by RRC | DMRS port 1000 | DMRS port 1001 | DMRS port 1002 | DMRS port 1003 | DMRS port 1004 | DMRS port 1005 |
| 00 | 0 | 1 | 2 | 3 | 4 | 5 |
| 01 | 1 | 6 | 3 | 8 | 5 | 10 |
| 10 | 6 | 7 | 8 | 9 | 10 | 11 |
| 11 | 7 | 0 | 9 | 2 | 11 | 4 |

Below Table 14 outlines an encoding of "PTRS-RE-offset" for DM-RS type 2 assuming a 2 DM-RS symbol for ports 1006 to 1011. It can be seen that each DM-RS port maps PT-RS to a unique subcarrier.

| PTRS-RE- | Sub-carrier index for PT-RS | | | | | |
|---|---|---|---|---|---|---|
| offset by RRC | DMRS port 1006 | DMRS port 1007 | DMRS port 1008 | DMRS port 1009 | DMRS port 1010 | DMRS port 1011 |
| 00 | 6 | 7 | 8 | 9 | 10 | 11 |
| 01 | 7 | 0 | 9 | 2 | 11 | 4 |
| 10 | 0 | 1 | 2 | 3 | 4 | 5 |
| 11 | 1 | 6 | 3 | 8 | 5 | 10 |

Figure 10:
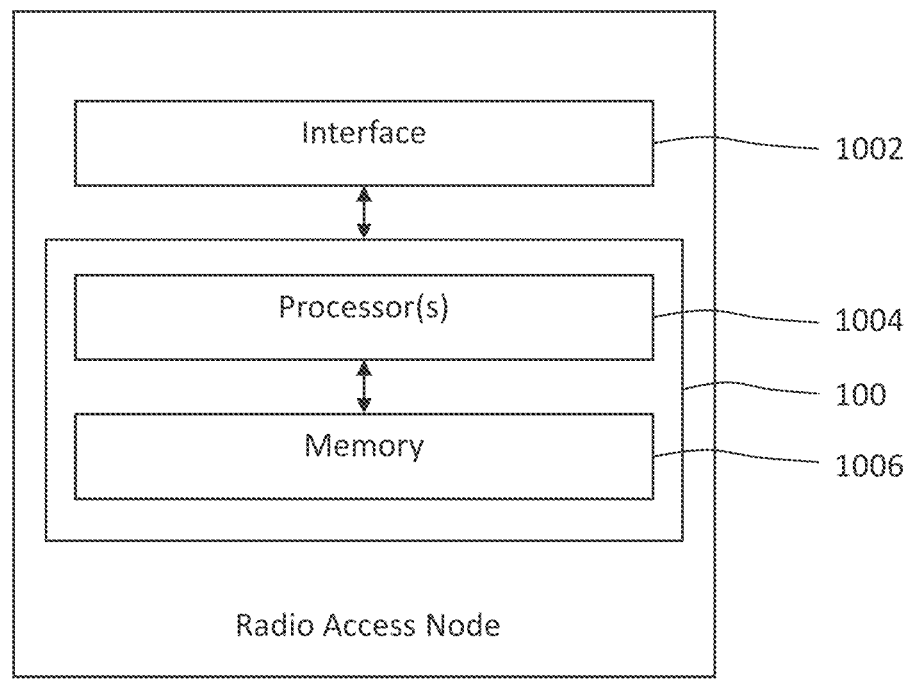
FIG. 10 shows a schematic block diagram of a first embodiment of the device of FIG. 1.

FIG. 10 shows a schematic block diagram for an embodiment of the device 100. The device 100 comprises one or more processors 1004 for performing the method 300 and memory 1006 coupled to the processors 1004. For example, the memory 1006 may be encoded with instructions that implement at least the module 102.

The one or more processors 1004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1006, base station and/or radio access functionality. For example, the one or more processors 1004 may execute instructions stored in the memory 1006. Such functionality may include providing various features and steps discussed herein, including any of the benefits disclosed herein. The expression "the device being operative to perform an action" may denote the device 100 being configured to perform the action.

As schematically illustrated in FIG. 10, the device 100 may be embodied by a base station 510, e.g., of a RAN. The base station 510 comprises a radio interface 1002 coupled or connected to the device 100 for a radio channel with one or more radio devices. The base station 510 or the device 100 may communicate via the radio interface 1002 with the one or more radio devices.

Figure 11:
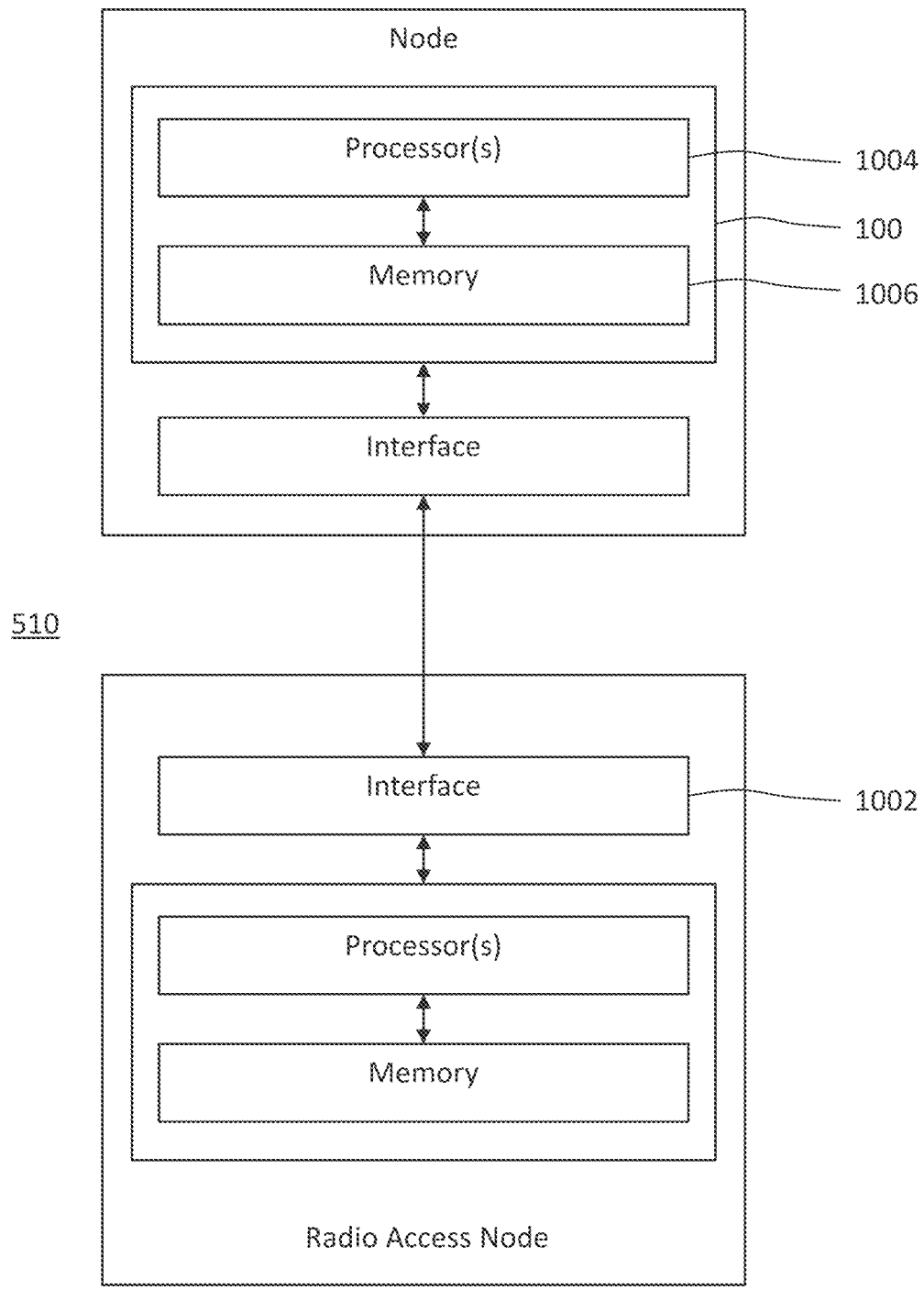
FIG. 11 shows a schematic block diagram of a second embodiment of the device of FIG. 1.

In a variant, e.g., as schematically illustrated in FIG. 11, the functionality of the device 100 is provided by another node (e.g., in the RAN or a core network linked to the RAN). That is, the node performs the method 300. The functionality of the device 100 is provided by the node to the base station 510, e.g., via the interface 1002 or a dedicated wired or wireless interface.

Figure 12:
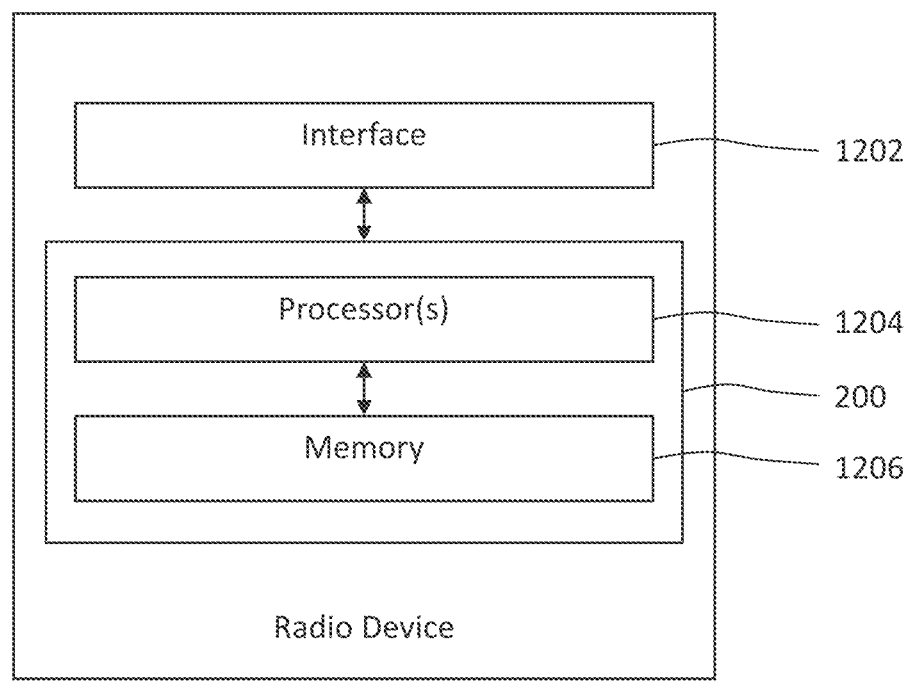
FIG. 12 shows a schematic block diagram of a first embodiment of the device of FIG. 2.

FIG. 12 shows a schematic block diagram for an embodiment of the device 200. The device 200 comprises one or more processors 1204 for performing the method 400 and memory 1206 coupled to the processors 1204. For example, the memory 1206 may be encoded with instructions that implement at least the module 202.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1206, radio device and/or terminal functionality. For example, the one or more processors 1204 may execute instructions stored in the memory 1206. Such functionality may include providing various features and steps discussed herein, including any of the benefits disclosed herein. The expression "the device being operative to perform an action" may denote the device 200 being configured to perform the action.

As schematically illustrated in FIG. 12, the device 200 may be embodied by a radio device 512, e.g., of a RAN. The radio device 512 comprises a radio interface 1202 coupled or connected to the device 200 for a radio channel with one or more radio access nodes. The radio device 512 or the device 200 may communicate via the radio interface 1202 with the one or more radio access nodes.

Figure 13:
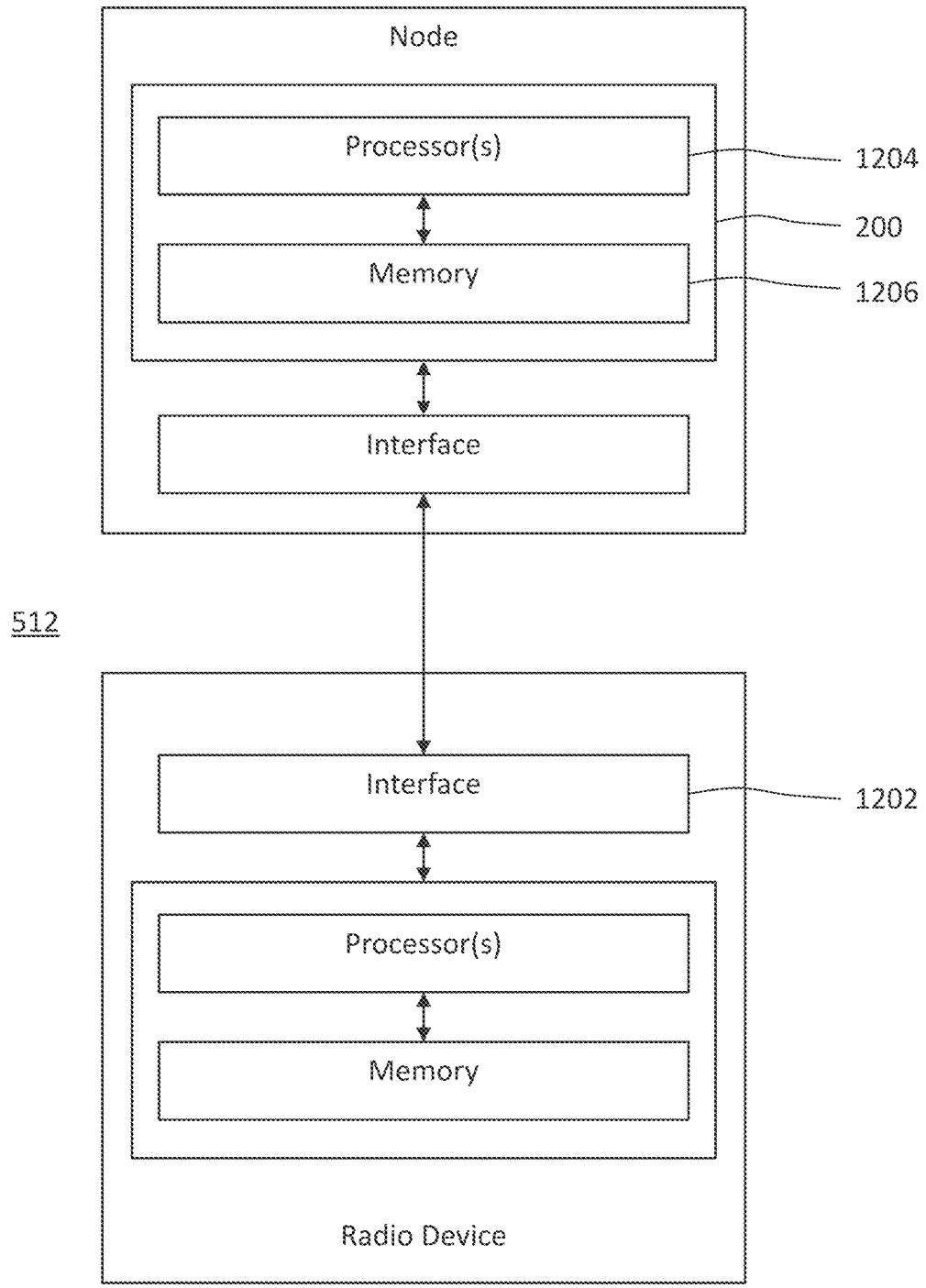
FIG. 13 shows a schematic block diagram of a second embodiment of the device of FIG. 2.

In a variant, e.g., as schematically illustrated in FIG. 13, the functionality of the device 200 is provided by another node (e.g., in the RAN or a core network linked to the RAN). That is, the node performs the method 200. The functionality of the device 200 is provided by the node to the radio device 512, e.g., via the interface 1202 or a dedicated wired or wireless interface.

As has become apparent from above description, embodiments of the technique enable lower signaling overhead of the control signaling. It does not require independent indication of "PTRS-RE-offset" for DL and UL. Alternatively or in combination, it does not require independent indication of "PTRS-RE-offset" for all the scheduled PT-RS ports in SU-MIMO.

Same or further embodiments can avoid scheduling restrictions, e.g. incompatibilities between PTRS-RE-offset and the scheduled DM-RS port.

In addition, orthogonality between PT-RS ports (i.e. PT-RS transmitted through different DM-RS ports) by means of frequency division multiplexing (FDM) can be achieved even if only one value for the offset parameter (i.e., the bit field) is transmitted for a plurality of PT-RS ports.

The configuration message may enable configuring the PT-RS depending on a quality of oscillators, a carrier frequency, an OFDM subcarrier spacing and a modulation and coding scheme (MCS) used for transmission.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

Moreover, the technique may be implemented, independently or in combination with any aforementioned embodiment, implementation or variant, according to the following description of further embodiments (wherein the port index "p" may be denoted by "x"), including those described as "proposals."

Remaining Details on PTRS Design

1 Introduction

In RAN1-90bis, the following agreements were made:
If DL-PTRS-present/UL-PTRS-present is enabled,
 a. When PTRS is present, one PTRS port is present in every OFDM symbol and every 2 nd RB unless DL/UL density tables are configured by RRC. Note: This can in specification be achieved by specifying ptrsthMCS1=ptrsthMCS2=ptrsthMCS3 and ptrsthRB2=ptrsthRB4=Inf for these pre-defined values respectively
 b. PTRS is not present in DL if MCS <$ptrsthMCS_1^{DL}$ or BW <$ptrsthRB_0^{DL}$, where default values of $ptrsthMCS_1^{DL}$ and $ptrsthRB_0^{DL}$ are to be decided at RAN1#90b or RAN1#91 the latest
 c. PTRS is not present in UL if MCS <$ptrsthMCS_1^{UL}$ or BW <$ptrsthRB_0^{UL}$, where default values of $ptrsthMCS_1^{UL}$ and $ptrsthRB_0^{UL}$ are to be decided at RAN1#90b or RAN1#91 the latest For CP-OFDM, antenna port (AP) configuration: Same as DL, support at least up to 2 UL PTRS ports in Rel-15

For CP-OFDM, support UE to report the desired maximum number of UL PTRS ports as UE capability and report the preferred DL layer, in case of 2 CW, report the preferred DL layer within the CW with higher CQI in UCI For UL codebook-based transmission, when one PTRS port is configured, support gNB to indicate to UE in the UL grant which DMRS port is associated with the PTRS port UE is not expected to be configured/scheduled with DMRS with TD-OCC and PTRS in the same slot in case of above 6 GHz.

Support a RB-level offset for selecting RBs among the scheduled RBs for mapping PTRS, and the offset is implicitly determined by UE-ID (i.e., C-RNTI).

Support implicit derivation the RE-level offset for selecting subcarrier for mapping PTRS within a RB from one or more parameters (e.g. associated DMRS port index, SCID, Cell ID, to be decided in RAN1#91)

In addition, an RRC parameter "PTRS-RE-offset" is also supported that explicitly indicates the RE-level offset and replaces the implicit offset, at least for avoiding collision with DC tone For UL, the transmission power for the symbols with and without PTRS should be kept the same when more than 1 PTRS port is configured Support power borrowing for PTRS from muted REs when more than 1 PTRS port is configured At least for DL SU-MIMO scheduling, the EPRE ratio between PTRS and PDSCH is by default implicitly indicated by the number of scheduled PTRS ports for the UE The default EPRE ratio is 0 dB for 1 PTRS port case and 3 dB for 2 PTRS port case Other combinations including EPRE up to 6 dB are allowed by RRC configuration of association between number of DL PTRS ports and EPRE ratios For chunk-based pre-DFT PTRS insertion for DFT-sOFDM with X chunks of size K={2,4}, support the following: (i) For K=2, the samples in DFT domain are divided in X intervals, and the chunks are located in each interval in samples n to n+K−1 where the n is FFS; (ii) For K=4, the samples in DFT domain are divided in X intervals, where in the first interval the chunk is placed in the Head (first K samples), in the last interval the chunk is placed in the Tail (last K samples), and in the rest of intervals the chunk is placed in the middle of each of the two intervals For PTRS for DFT-s-OFDM, support a RRC parameter «UL-PTRS-frequency-density-transform-precoding» indicating a set of thresholds T={$N_{RBn}$=0,1,2,3,4}, per BWP that indicates the values of X and K the UE should use depending on the scheduled BW according to the table below Possible PTRS presence/absence is configured through an RRC parameter «UL-PTRS-present-transform-precoding»

Time-domain PTRS density is configured by an RRC parameter «UL-PTRS-time-density-transform-precoding» where supported time densities are L_{PT-RS}={1,2}

Note: Time-domain pattern depends on DM-RS positions using the same principle as agreed for CP-OFDM PTRS mapping FFS: Whether to introduce (K=1, X=16) and the impacts on existing design. If supported, K={1,2,4} is supported and the following applies The samples in DFT domain are divided in X intervals, and the chunks (K=1) are located in the middle of each interval (K=1, X=16) applies when $N_{RB4}<N_{RB}\leq N_{RB5}$, and Yx4 applies for $N_{RB}>N_{RB5}$ Note: No further modifications are bought with the respect to the design for K={2,4}

This contribution discusses different aspects related with the design of the Phase Tracking Reference Signal (PTRS), used to estimate, and compensate for phase noise related errors and to support frequency offset estimation.

2 Discussion

This contribution is divided in two main sections, one focused on the open issues of the PTRS design for the CP-OFDM waveform (both for DL and UL) and the second one focused on the open issues of the PTRS designed for DFT-S-OFDM waveform.

2.1 PTRS Design for CP-OFDM 2.1.1 Association Tables for PTRS time/freq. Densities In previous RAN1 meetings it was agreed to support time densities of PTRS every, every 2nd and every 4th OFDM symbol, and frequency densities of 1 PTRS subcarrier every 2nd and every 4th PRB. In transmissions with small scheduled BW, denser PTRS in frequency domain is required to obtain accurate phase noise estimation (as shown in [1]), and specially to obtain accurate frequency offset estimation (as shown in [2]). Therefore, we think it is important to also support the frequency density of 1 PTRS subcarrier in every PRB.

Add support for frequency density of 1 PTRS subcarrier in every PRB in the density tables that can be configured by RRC for UL and DL, respectively.

Also, it was agreed that the selected PTRS configuration should be selected using Table 1 and Table 2 (i.e., time density associated with the scheduled MCS and frequency density associated with the scheduled BW). However, we showed in the evaluations results presented in [3] that PTRS time density can be selected independently of the coding rate, i.e. it is sufficient if the PTRS time density is associated with the modulation schemes (QPSK, 16QAM, 64QAM and 256QAM) only.

To achieve this, we propose to simplify Table 2, where the MSC association is done using only the Modulation Schemes since we don't need the granularity of code rate. Hence, MCS can only select modulation constellation where MCS=1 is QPSK, MCS=2 is 16 QAM and so on.

One important advantage of this approach is that single association table can be used with different MCS tables as there will be multiple MCS tables defined (so far it has been agreed to use two different MCS tables for NR [4]). Also, the proposal does not require special handling of the reserved MCS entries, simplifying the design.

The MCS thresholds in the PTRS time density table have the granularity of modulation constellation size only, excluding the code rate.

TABLE 1

Association table between PTRS frequency density and scheduled BW.

| Scheduled BW | Frequency density |
|---|---|
| $N_{RB} <$ ptrsthRB$_0$ | No PT-RS |
| ptrsthRB$_0 \leq N_{RB} <$ ptrsthRB$_1$ | 1 |
| ptrsthRB$_1 \leq N_{RB} <$ ptrsthRB$_2$ | ½ |
| ptrsthRB$_2 \leq N_{RB}$ | ¼ |

TABLE 2

Association table between PTRS time density and MCS.

| Scheduled MCS | Time density |
|---|---|
| MCS < ptrsthMCS$_1$ | No PT-RS |
| ptrsthMCS$_1 \leq$ MCS < ptrsthMCS$_2$ | ¼ |
| ptrsthMCS$_2 \leq$ MCS < ptrsthMCS$_3$ | ½ |
| ptrsthMCS$_3 \leq$ MCS | 1 |

2.1.2 PTRS Default Configuration in time/freq. Domain

It was agreed that as default configuration, PTRS is mapped to every OFDM symbol and to every other PRB. It was FFS to decide if this default configuration should be used for all scheduled BW and MCS or not, i.e., if PTRS is always ON. From the evaluations presented in [5] it can be seen how PTRS is not needed to compensate the phase noise effects for low MCS and small scheduled BW. However, PTRS could be used in some cases to perform frequency offset estimation, e.g., in UL transmissions with front-loaded DMRS as shown in [7] (either sub-6 or mmWave) and in DL transmissions for mmWave (where TRS could require too high overhead).

For these cases PTRS should be ON even for low MCS and small scheduled BW, due to the requirements of the frequency offset estimation. Therefore, to fulfil both the phase noise and frequency offset compensation requirements, we propose to use a default association table where PTRS is always ON, both for DL and UL. The proposed default thresholds for DL and UL are shown in Table 3 and Table 4, respectively.

As the largest number of RB per carrier is 275 in NR, we can use the value 276 to indicate the unobtainable threshold of a scheduled BW.

Support ptrsthRB$_0^{DL}$=ptrsthRB$_1^{DL}$32 0, ptrsthRB$_2^{DL}$32 276 and ptrsthMS$_1^{DL}$=ptrsthMS$_2^{DL}$=ptrsthMS$_3^{DL}$=0 as default thresholds for DL. Support ptrsthRB$_0^{UL}$=ptrsthRB$_1^{UL}$=0, ptrsthRB$_2^{UL}$32 276 and ptrsthMS$_1^{UL}$=ptrsthMS$_2^{UL}$=ptrsthMS$_3^{UL}$=0 as default thresholds for UL.

TABLE 1

Proposed default thresholds for DL.

| RB thresholds | ptrsthRB$_0^{DL}$ = ptrsthRB$_1^{DL}$ = 0, ptrsthRB$_2^{DL}$ = 276 |
|---|---|
| MS thresholds | ptrsthMS$_1^{DL}$ = ptrsthMS$_2^{DL}$ = ptrsthMS$_3^{DL}$ = 0 |

TABLE 2

Proposed default thresholds for UL.

| | |
|---|---|
| RB thresholds | ptrsthRB$_0^{DL}$ = ptrsthRB$_1^{DL}$ = 0, ptrsthRB$_2^{DL}$ = 276 |
| MS thresholds | ptrsthMS$_1^{DL}$ = ptrsthMS$_2^{DL}$ = ptrsthMS$_3^{DL}$ = 0 |

It is important to clarify that PTRS always ON as default configuration does not mean that PTRS is always transmitted, RRC signalling can be used to activate or de-activate the PTRS transmission when needed. An important detail related with the PTRS presence is that it should be independent for DL and UL, because each case has different requirements. For example, for sub-6 scenarios PTRS is not required in DL because the effects of phase noise are not significant and the tracking of frequency offset is done by TRS. However, PTRS is required in sub-6 for UL to perform frequency offset compensation. Therefore, we propose to have independent indication by RRC of the PTRS presence for DL and UL.

Higher layer configuration indicate the possible presence of PTRS for DL and UL independently, i.e. UL-PTRS-present and DL-PTRS-present are the RRC parameters.

2.1.3 RRC Signalling of Thresholds

It was previously agreed that UE can suggest by RRC signalling values for the thresholds in the association tables to override the default ones. Regarding the signalling of the thresholds two important aspects should be studied: which values are allowed for the thresholds (e.g. do we need the flexibility of 275 possible threshold values for scheduled BW?) and how to encode these allowed thresholds in an efficient way.

2.1.3.1 Association Table for freq. Density

Firstly, we are going to focus on the thresholds for the association table between scheduled BW and PTRS frequency density (Table 1). For this table, each threshold is set to a specific number of PRBs. In NR, the maximum scheduled BW is X=275 PRB [6], then with full flexibility selection each threshold in the table can take any value from the vector S=[0,1,2,3,4, ... , X, Inf], where "276" can also be used instead of "Inf". Selection with full flexibility requires 9 bits to encode each threshold when X=275, which means that 27 bits are required to encode 3 thresholds. However, such flexible selection does not provide any advantage as the values that the thresholds take is usually limited, as seen in the evaluations presented in [1]. To reduce the complexity and the signalling overhead we propose a reduced flexibility selection where the number of allowed values for the thresholds is restricted.

The preferred option is to restrict the values of the thresholds to the number of PRBs multiples of the RBG size, i.e., the thresholds can take any value from the vector vector S=[0, RBG, 2 * RBG, 3 * RBG ... , Y * RBG, Inf], where $$Y = \left\lfloor \frac{X}{RBG} \right\rfloor. \text{ If } RBG = 4, S = [0, 4, 8, 16, \ldots, 272, Inf],$$

which contains 70 elements (requiring 7 bits to encode one threshold and 21 bits to encode 3 the thresholds).

Restrict the values of the thresholds ptrsthRBx to the set of elements which are multiple of the RBG size, i.e., [0,RBG,2*RBG,3*RBG ... ,Y*RBG,276] with Y=[X/RBG] and X is the maximum scheduled BW in NR.

Further reduction in the signalling overhead can be achieved if efficient encoding is used instead of bitmap encoding. This is used for EPDCCH configuration in LTE where a limited set of RBs are selected from the set of all available RBs.

With bitmap encoding each threshold can take any value of S, so the required number of bits to encode each threshold is [log$_2$N], where N is the length of vector S. However, to improve the encoding we can take advantage of the relative relation between the thresholds, i.e., ptrsthRB$_0$≤ptrsthRB$_1$≤ptrsthRB$_2$.

Thus, considering the previous relation we propose in Algorithm 1 an efficient encoding scheme for the set of thresholds in the association table.

Algorithm 1

Define the vector S=[s$_1$, s$_2$, S$_N$] which contains the N allowed values for the thresholds (in increasing order). For example, for the reduced flexibility solution presented previously S=[0,4,8,16, ... , 276] with N=70 elements.

Denote the M thresholds to encode as th$_0$, th$_1$, ... , th$_{M-1}$, which are defined as th$_i$=x$_{k_i}$. Where k 1 is the index that represents which value from S has been selected for th$_i$. One important property is that th$_{i+1}$≥th$_i$ and k$_{i+1}$≥k$_i$.

For each combination of thresholds th$_0$, th$_1$, ... , th$_{M-1}$, we can generate a unique index r as follows:

$$r = \sum_{i=0}^{M-1} \binom{N - k_i}{M - i}$$

where $\binom{x}{y} = \begin{cases} \binom{x+y-1}{y} & x \geq y \\ 0 & x < y \end{cases}$ and $\binom{a}{b} = \frac{a!}{b!(a-b)!}$ is the binomial coefficient.

Finally, the unique index r is encoded using $\lceil \log_2(\Sigma_{i=0}^{M-1} \binom{N-1}{m-1}) \rceil$ bits.

In Table 5 we show a comparison of the overhead to encode the set of thresholds for the frequency density association table using full and reduced flexibility selection, and bitmap and efficient encoding. We can see how using the proposed encoding the overhead is reduced 5 bits for both full flexibility and reduced flexibility selection and combining the two methods we reduce the signaling overhead from 27 to 16 bits.

Therefore, the proposed encoding should be adopted for efficiently encode the thresholds of the association table similar to what was done for EPDCCH in LTE.

Use the encoding scheme described in Algorithm 1 to encode the set of thresholds of the frequency density association table.

TABLE 3

Overhead comparison for two types of selection and
2 types of encoding for 3 thresholds signalling.

|  | Bit map | Encoding in Algorithm 1 |
|---|---|---|
| Full flexibility | 27 bits | 22 bits (18.5% overhead reduction) |
| Reduced flexibility with RBG = 4 | 21 bits | 16 bits (22.7% overhead reduction) |

2.1.3.2 Association Table for Time Density

As proposed in 2.2.1, Table 2 should be used for association of PTRS time density and modulation schemes. As NR using CP-OFDM supports the modulation schemes QPSK, 16QAM, 64QAM and 256QAM, the thresholds in such a table are set to one of the values in the vector S=[0, 1, 2, 3, 4, Int].

Restrict the values of ptrsthMCS$_x$ to [0,1,2,3,4, Inf].

To efficiently encode the 3 thresholds for the association table we can use the same encoding scheme proposed for the association table for frequency density. In Table 4 we show the overhead required to signal the set of thresholds using bitmap encoding and the proposed encoding scheme. The overhead reduction achieved with the proposed encoding is significant, so it should be adopted for NR.

Use the encoding scheme described in Algorithm 1 to encode the set of thresholds of the time density association table.

TABLE 4

Overhead comparison for 2 types of encoding for 3 thresholds signalling.

| Bit map | Encoding in Algorithm 1 |
|---|---|
| 9 bits | 6 bits (33.3% overhead reduction) |

2.1.4 RB-level Offset for PTRS

RAN1 agreed to support RB-level offset for selecting RBs among the scheduled RBs for mapping PTRS. It was also agreed to implicitly derive the offset from the C-RNTI, but not exactly how to do it. To design an implicit association rule between C-RNTI and RB-level offset we should consider that for different densities the maximum offset is different. Thus, for a frequency density of 1 PTRS subcarrier every 4 th PRB the maximum value for the RB-offset is 3, for every $2^{nd}$ PRB is 1 and for every PRB is 0. Hence, we propose the following equation to implicitly derive the RB-level offset from the C-RNTI (considering the frequency density used):

$$RB_{offset} = \text{C-RNTI} \mod n_{PTRs\_step}$$

where $n_{PTRs\_step}=1$ for freq. density 1, $n_{PTRs\_step}=2$ for freq. density ½, and $n_{PTRs\_step}=4$ for freq. density ¼.

The association between RB-level offset and C-RNTI is not valid when it comes to broadcast transmissions with PTRS. In this case the RB-level offset must be implicitly derived from a different parameter, as for example the SI-RNTI. Like in the previous case, the association rule for the broadcast case can be set to $RB_{offset} = \text{SI-RNTI} \mod n_{PTRs\_step}$.

For broadcast transmissions RB-level offset for PTRS is associated with SI-RNTI.

The implicit relation between RB-level offset for PTRS and RNTI depends on the frequency density and is given by the equation $RB_{offset} = \text{C-RNTI} \mod n_{PTRS\_step}$, where $n_{PTRs\_step}=1/(\text{freq density})$.

2.1.5 RE-Level Offset for PTRS

The RE-level offset indicates to which subcarrier within a PRB the PTRS is mapped. In the last RAN1 meeting it was discussed to associate the RE-level offset to one of the following parameters:

Index of the DMRS port associated with the PTRS port

SCID

Cell ID

Some companies claim that if the RE-level were associated with the DMRS port index the effect of PTRS to PTRS inter-cell interferences could cause several degradations in the performance. It was suggested to avoid this degradation by randomization of the PTRS mapping between cells by associating the RE-level offset to the SCID or Cell ID.

However, in [1] we presented evaluation results showing that PTRS to PTRS interference for neighbouring cells offers better performance than PDSCH to PTRS interference (when using the agreed constant modulation symbol sequence for PTRS in CP-OFDM). Also, in Appendix 5.1 in [3] we presented the derivations that support this argument.

Figure 14A:
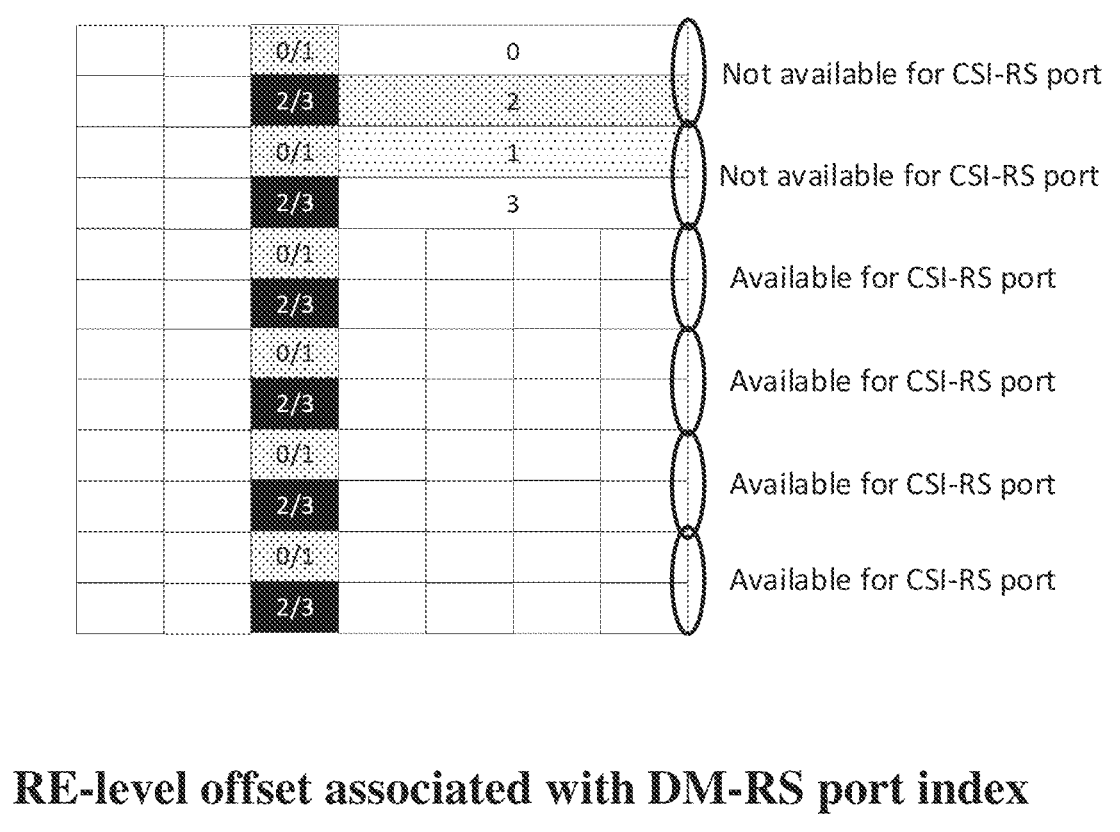
Figure 14B:
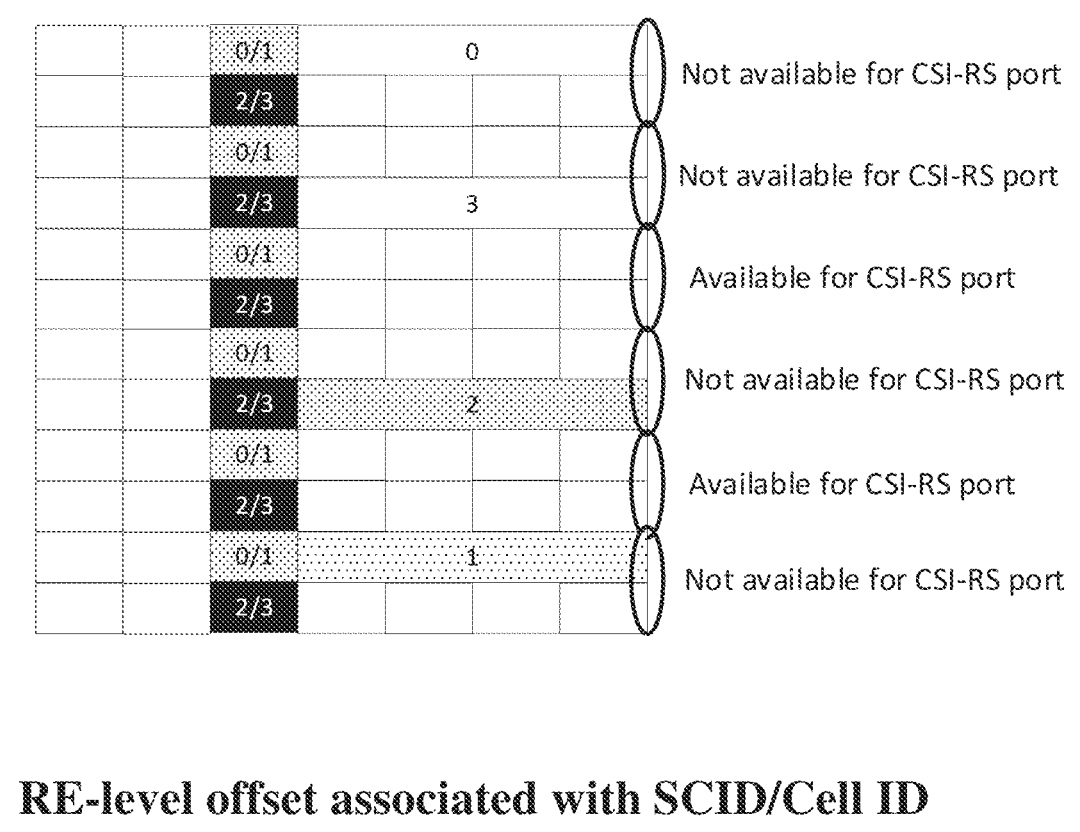

Moreover, PTRS mapping is closely related with the multiplexing of PTRS and CSI-RS. In the cases in which CSI-RS and PTRS are FDMed, CSI-RS resources can't be mapped to subcarriers in which PTRS is mapped. It has been already agreed that CSI-RS resources with more than 1 port use in all cases FD2, and so each CSI-RS port includes 2 adjacent CSI-RS RE in the frequency domain. This fact produces that a RE-level offset associated with SCID or Cell ID could lead to a low number of available RE for CSI-RS resources in some cases, as shown in FIGS. 14a and 14b, which illustrate an example of PTRS fixed and configurable mapping and the available CSI-RS ports.

In conclusion, we believe that the best option for PTRS mapping is to associate the RE-level offset with the index of the DMRS port associated with the PTRS port, because of its lower degradation due to inter-cell interference and its good properties for FDM with CSI-RS. In Table 5 and Table 6 we show the proposed RE-level offset associated to each DMRS port index for DMRS type 1 and 2.

Support implicit association of the RE-level offset with the index of the DMRS port that is associated with the PTRS port.

Adopt Table 5 and Table 6 for deriving the RE-level offset for one PTRS port based in its associated DMRS port index (for DMRS type 1 and 2).

TABLE 5

Implicit association of RE-level offset
and DMRS port index for DMRS type 1.

| DMRS port | 1000 | 1001 | 1002 | 1003 | 1004 | 1005 | 1006 | 1007 |
|---|---|---|---|---|---|---|---|---|
| RE-level offset | 0 | 2 | 1 | 3 | 4 | 6 | 5 | 7 |

TABLE 6

Implicit association of RE-level offset and DMRS port index for DMRS type 2.

| DMRS port | 1000 | 1001 | 1002 | 1003 | 1004 | 1005 | 1006 | 1007 | 1008 | 1009 | 1010 | 1011 |
|---|---|---|---|---|---|---|---|---|---|---|---|---|
| RE-level offset | 0 | 1 | 2 | 3 | 4 | 5 | 6 | 7 | 8 | 9 | 10 | 11 |

2.1.6 RRC "RE-Level-Offset" Signalling

In addition to the implicit association of RE-level offset, in RAN1 90b is it was agreed to support a RRC parameter "PTRS-RE-offset" which explicitly indicates the RE-level offset and replaces the RE-level offset obtained with the default association rule. The main motivation for introducing this parameter in the RRC signaling is to avoid to map PTRS to the DC subcarrier. The agreements regarding this parameter suggest that "PTRS-RE-offset" can take any value from 0 to 11. However, this has several drawbacks that are considered next.

Firstly, if "PTRS-RE-offset" can be set to any value from 0 to 11, it implies a gNB scheduling restriction since the DMRS used for PDSCH or PUSCH transmission must use the subcarrier indicated by "PTRS-RE-offset" (because it was agreed that PTRS is mapped to one of the subcarriers to which its associated DMRS port is mapped). For example, if "PTRS-RE-offset"=0, then if DMRS type 1 is configured the DMRS ports mapped to comb using subcarriers {1,3,5, 7,9,11} cannot be used when scheduling UE. In Table 9 we show the mentioned restriction for DMRS type 1.

TABLE 7

Bitmap encoding of "PTRS-RE-offset" with DM-RS type 1.

| PTRS-RE-offset value | Subcarrier used for PT-RS | Compatible DM-RS ports |
|---|---|---|
| 0000 | 0 | 1000/1001/1004/1005 |
| 0001 | 1 | 1002/1003/1006/1007 |
| 0010 | 2 | 1000/1001/1004/1005 |
| 0011 | 3 | 1002/1003/1006/1007 |
| 0100 | 4 | 1000/1001/1004/1005 |
| 0101 | 5 | 1002/1003/1006/1007 |
| 0110 | 6 | 1000/1001/1004/1005 |
| 0111 | 7 | 1002/1003/1006/1007 |
| 1000 | 8 | 1000/1001/1004/1005 |
| 1001 | 9 | 1002/1003/1006/1007 |
| 1010 | 10 | 1000/1001/1004/1005 |
| 1011 | 11 | 1002/1003/1006/1007 |

Another problem is related with the signalling overhead. If "PTRS-RE-offset" can be set to any value from 0 to 11, 4 bits are required per "PTRS-RE-offset" indication. Moreover, as PTRS ports for DL and UL can be associated with different DMRS ports, independent indication of "PTRS-RE-offset" for UL and DL is needed, increasing the overhead. Similarly, independent indication of "PTRS-RE-offset" per PTRS port in SU-MIMO is required (further increasing the overhead).

Thus, more efficient signalling that avoids scheduling restrictions and reduces the overhead is needed. We propose a different approach where "PTRS-RE-offset" is used to generate a relative index to one of the elements in the subset of subcarriers used by the DMRS port associated with the PTRS port. Hence, the relative index selects a subcarrier among the subcarriers used by the DMRS ports used for the particular PDSCH or PUSCH scheduling (without introducing any scheduling restriction). The proposed solution is summarized in Algorithm 2.

Algorithm 2

Encode PTRS-RE-offset using bitmap encoding with 2 bits, i.e. PTRS-RE-offset E [0,1,2,3]
Denote the vector containing the subcarriers used by DMRS port x within a PRB as $S_x$, being DMRS port x the one associated with the PTRS port.
Define N as the length of vector $S_x$.
Define the parameter FD offset$_x$=x mod 2, which is related with the FD-OCC used for DMRS port x.
Define the parameter TD offset$_x$, which is related with the TD-OCC used for DMRS port x.
If x is a DMRS port of the DMRS type 1, $$\text{TD\_offset}_x = \left\lfloor \frac{x - 1000}{4} \right\rfloor$$

If x is a DMRS port of the DMRS type 2, $$\text{TD\_offset}_x = \left\lfloor \frac{x - 1000}{6} \right\rfloor.$$

Define $\Delta$=(PTRS-RE-offset+FD_offset$_x$+2*TD_offset$_x$) mod N, which is a relative index to one of the elements of $S_x$.
Obtain the index of the subcarrier scheduled for PTRS within a PRB as $S_x(\Delta)$ Based on the presented approach, we show in Table 8 and Table 9 the encoding of "PTRS-RE-offset" and the selected PTRS subcarrier for the DMRS ports in DMRS type 1 and 2 (based on Algorithm 2). The proposed solution avoids restrictions in the scheduling while reduces the required overhead. Just 2 bits are required to encode "PTRS-RE-offset". Moreover, common indication of "PTRS-RE-offset" for DL and UL can be used because with the proposed solution any value of "PTRS-RE-offset" can be used with any DMRS port. Also, for the SU-MIMO case with more than 1 PT-RS port, single indication of "PTRS-RE-offset" can be used, because it will provide different subcarriers for PTRS ports associated with different DMRS ports.

Encode "PTRS-RE-offset" in RRC using bitmap encoding of 2 bits, where "PTRS-RE-offset" can take the values {0,1,2,3}.
Use Algorithm 2 to determine to which subcarrier the PTRS port is mapped based on the value of "PTRS-RE-offset".

TABLE 8

Proposed encoding of "PTRS-RE-offset" for DM-RS type 1.

| PTRS-RE- offset by RRC | Sub-carrier index for PT-RS | | | | | | | |
|---|---|---|---|---|---|---|---|---|
| | port 1000 | port 1001 | port 1002 | port 1003 | port 1004 | port 1005 | port 1006 | port 1007 |
| 00 | 0 | 2 | 1 | 3 | 4 | 6 | 5 | 7 |
| 01 | 2 | 4 | 3 | 5 | 6 | 8 | 7 | 9 |

TABLE 8-continued

Proposed encoding of "PTRS-RE-offset" for DM-RS type 1.

| PTRS-RE-offset by RRC | Sub-carrier index for PT-RS | | | | | | | |
|---|---|---|---|---|---|---|---|---|
| | port 1000 | port 1001 | port 1002 | port 1003 | port 1004 | port 1005 | port 1006 | port 1007 |
| 10 | 4 | 6 | 5 | 7 | 8 | 10 | 9 | 11 |
| 11 | 6 | 8 | 7 | 9 | 10 | 0 | 11 | 1 |

TABLE 9

Proposed encoding of "PTRS-RE-offset" for DM-RS type 2.

| PTRS-RE-offset by RRC | Sub-carrier index for PT-RS | | | | | | | | | | | |
|---|---|---|---|---|---|---|---|---|---|---|---|---|
| | port 1000 | port 1001 | port 1002 | port 1003 | port 1004 | port 1005 | port 1006 | port 1007 | port 1008 | port 1009 | port 1010 | port 1011 |
| 00 | 0 | 1 | 2 | 3 | 4 | 5 | 6 | 7 | 8 | 9 | 10 | 11 |
| 01 | 1 | 6 | 3 | 8 | 5 | 10 | 7 | 0 | 9 | 2 | 11 | 4 |
| 10 | 6 | 7 | 8 | 9 | 10 | 11 | 0 | 1 | 2 | 1 | 4 | 5 |
| 11 | 7 | 0 | 9 | 2 | 11 | 4 | 1 | 6 | 3 | 8 | 5 | 10 |

2.1.7 PTRS Port Signalling for DL in UCI

It was agreed in the last RAN1 meeting that UE should report information about the preferred DL transmission layer within the CW with higher CQI in UCI. With this information, gNB can perform permutation of the columns of the precoder to transmit the DMRS port with lowest index in the DMRS group and its associated PTRS port in the best transmission port. Here we define the concept of Column Permutation Indicator (CPI), which indicates which of the columns of the selected precoder must be permutated in the gNB. For example, if CPI=0 no permutation is done and if CPI=2 the first and third columns of the precoder are permutated. By including the CPI in the CSI-feedback we are signalling information about the best transmission port.

RAN1 agreed in supporting transmission ranks from 1 to 8, where the RI is part of the CSI-feedback with 3 bits overhead. It is important that the number of possible CPI is related with the rank and with the maximum number of ports per CW that can be used for each rank (as it was agreed to signal just information about the best transmission port associated with the CW with higher CQI). For example, for rank 5 a maximum of 3 ports can be associated with 1 CW, so 3 different CPI values can be selected. Therefore, 1 CPI value is allowed for rank 1, 2 for rank 2, 3 for rank 3, 4 for rank 4, 3 for rank 5 and 6, and 4 for rank 7 and 8. Then a total of 1+2+3+4+3+3+4+4=24 states are needed to jointly encode the RI and the CPI, so 5 bits are required for jointly encoding RI and CPI (with full flexibility in the CPI selection). In previous contributions as [8], we proposed reduced flexibility CPI selection where for ranks higher than 4 only 2 out of 4 CPI values can be selected. For this case we need a total of 1+2+3+2*5=16 states, i.e. 4 bits required to jointly encode RI and CPI.

An important aspect to consider is that RAN1 agreed to have the possibility to limit the ranks that can be used and signalled in the CSI-feedback by means of the rank restriction indicator. Therefore, when rank restriction is used some of the 16 states proposed in the previous solution are not used due to the restriction and can be used to increase the flexibility of the CPI selection. Next in Algorithm 3 we propose the steps to efficiently encode and reduce DCI payload for signalling the RI and CPI considering the rank restriction.

Algorithm 3

Generate all the 24 possible combinations of RI and CPI in increasing order.
Remove all the combinations that cannot be used because of the rank restriction.
Assign one of the following priorities to each of the RI and CPI combinations left.
  Priority 1: combinations with RI≤3
  Priority 2: combinations with RI>3 and CPI=0 or CPI=2
  Priority 3: combinations with RI>3 and CPI=1 or CPI=3
Encode each combination of RI and CPI using 4 bits, starting by the combinations with Priority 1, and then the combinations with priority 2 (starting with the combinations with lowest RI). 16 states are required at most for encode combinations with Priority 1 and 2, so using 4 bits we can always encode the combinations with these Priorities.
If there are free states left from the total of 16 states, assign the free states to the combinations with Priority 3 (starting with the combinations with lowest RI) until all the 16 states are used In Table 12, illustrated in FIG. 17a-17b, we show an example of the previous encoding when no rank restriction is used (a) and when rank restriction is used (b). We can see how the previously proposed encoding for the case without rank restriction is the same as the one proposed in [8]. Also, we can see that when rank restriction is used we can increase the flexibility on the selection of the CPI for ranks>3, while still using 4 bits overhead. Therefore, the proposed joint encoding offers high flexibility on the CPI selection while reducing the CSI-feedback overhead in 1 bit. It is important to mention that as we use joint encoding of RI and CPI, CPI information will be signalled even when no PTRS transmissions are present. That is because static UCI payload is preferred.

Use Algorithm 3 to jointly encode RI and the CPI with 4 bits.

2.1.8 Power Boosting of PTRS

PTRS power boosting is beneficial as it increases the accuracy of the estimation. However, the power boosting principles of PTRS are different from the ones used in other reference signals as DMRS. In DMRS, we power boost certain RE for one DMRS port using the non-used power of the blanked RE in that port (i.e. the power transfer is between RE in the same port, and power transfer between ports is not allowed). However, for PTRS we have two different power boosting types. Power boosting type 1, which follows the same principle used by DMRS power boosting, i.e. the power transfer is between RE in the same port. Power boosting type 2 where the power transfer is between different ports for the same RE.

Figure 15A:
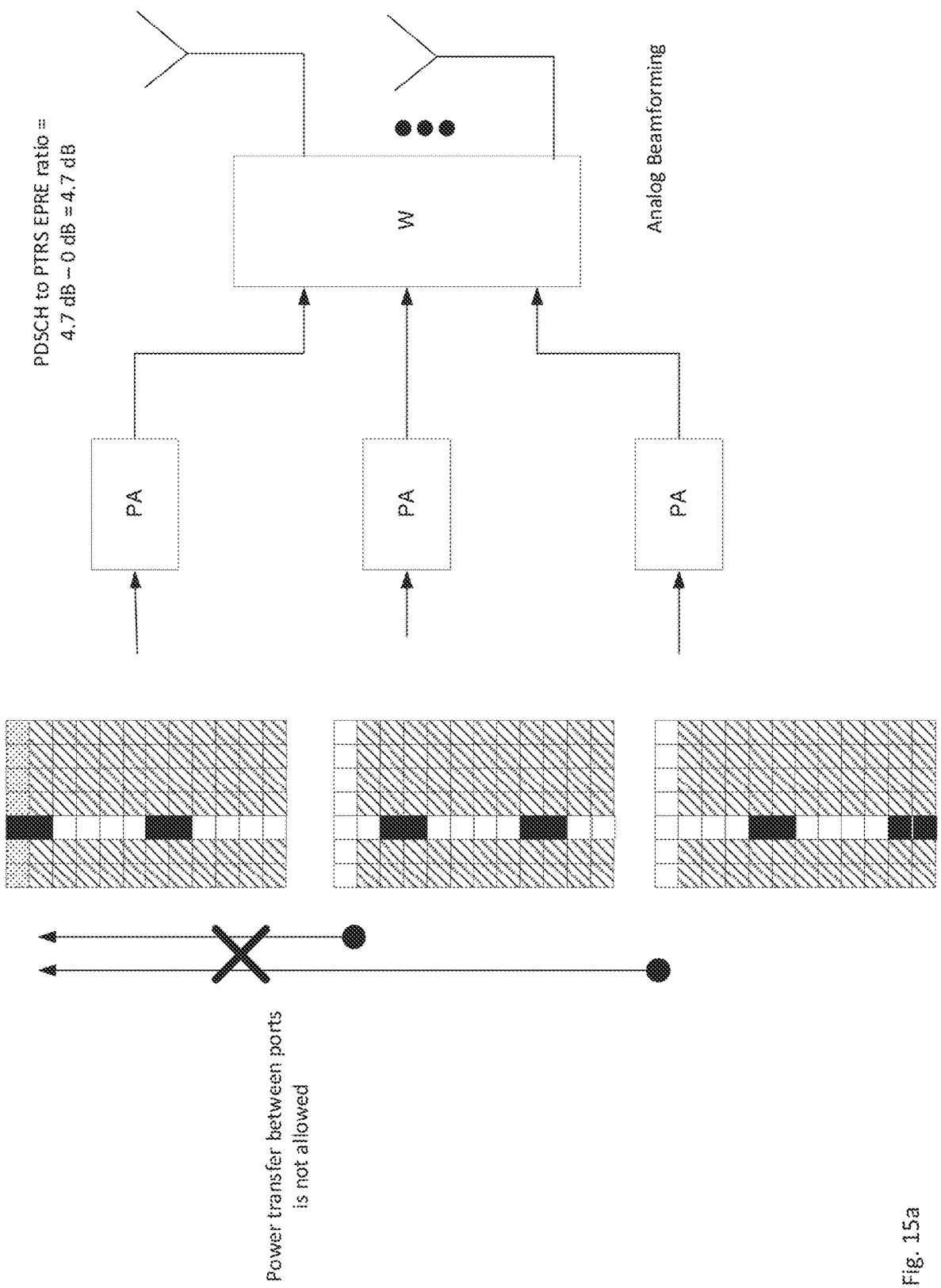
FIGS. 15a-15b show examples of power boosting of type 1 and 2 for a transmission with 1 PTRS port, 3 DMRS ports, and 3 PDSCH layers.
Figure 15B:
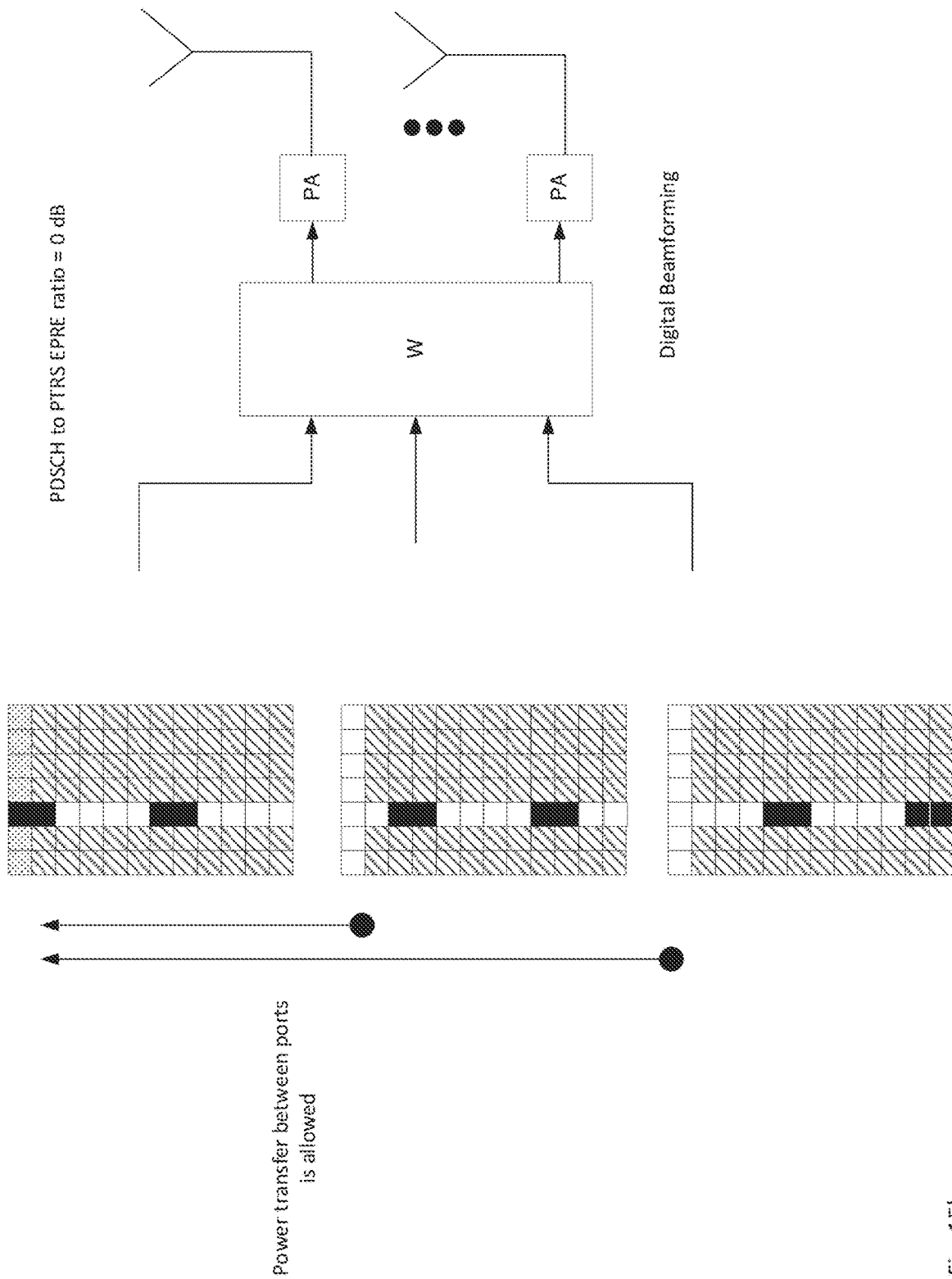
Figure 15C:
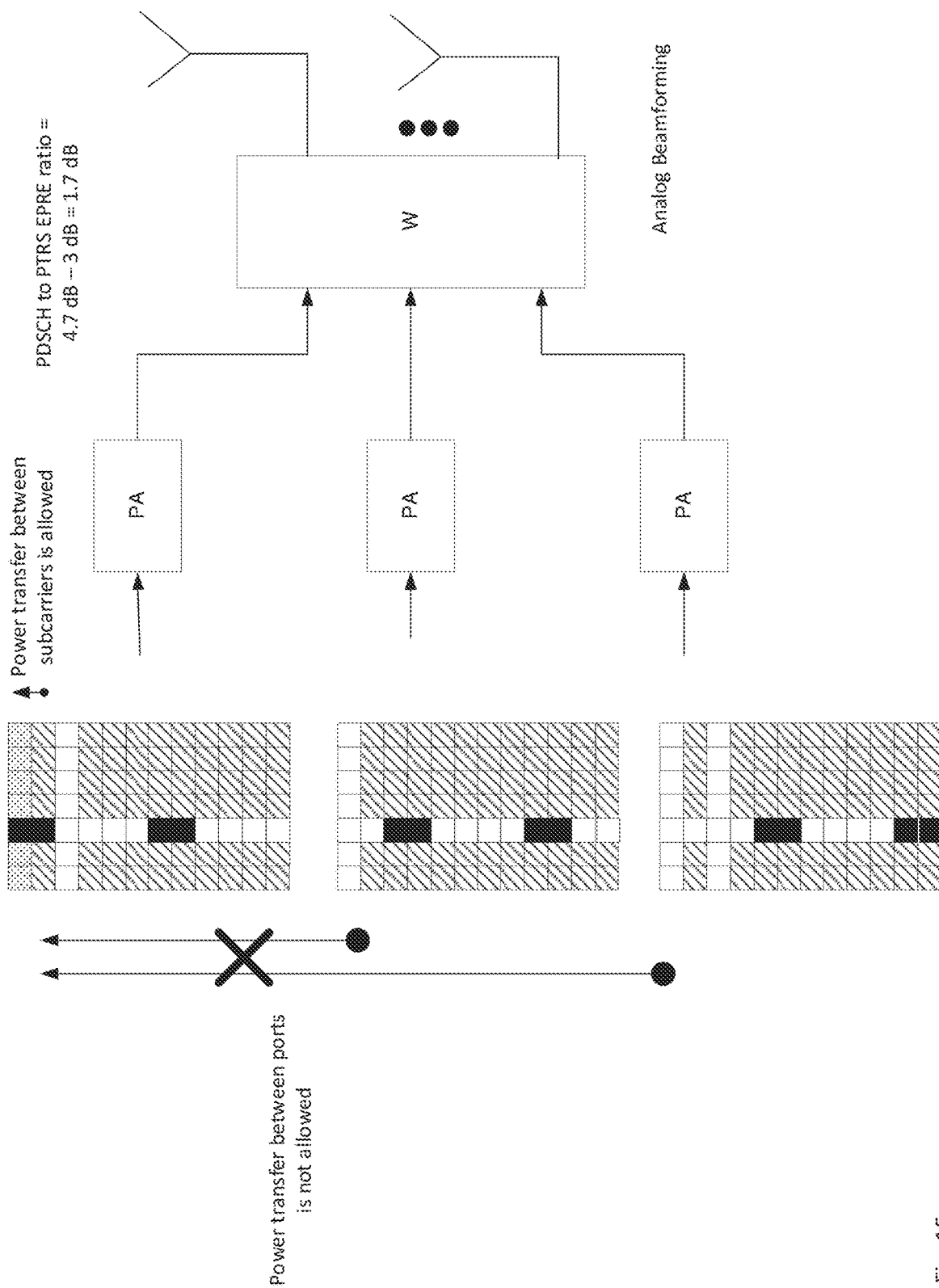
FIGS. 15c-15d show examples of power boosting of type 1 and 2 for a transmission with 2 PTRS ports, 3 DMRS ports, and 3 PDSCH layers.
Figure 15D:
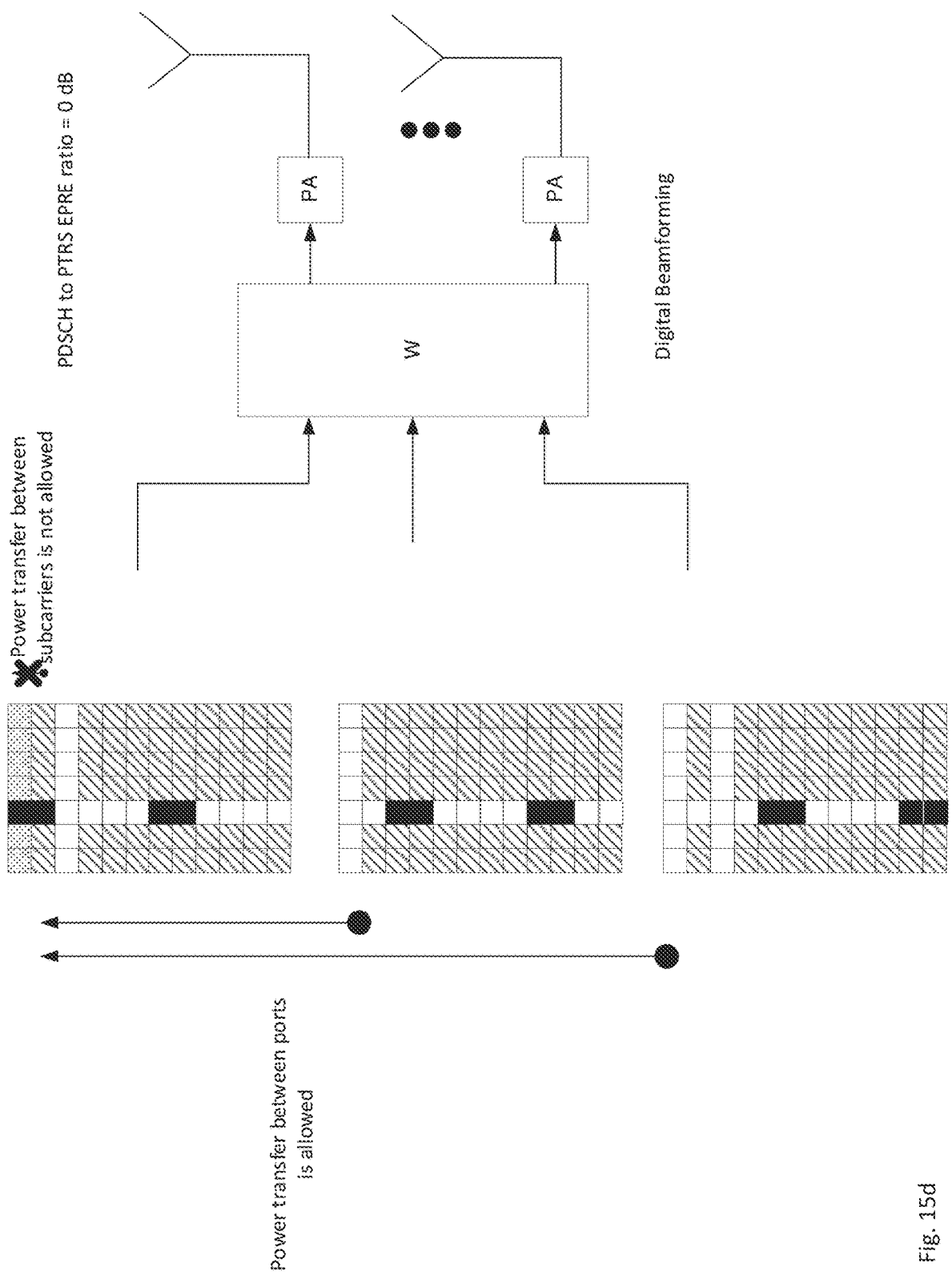

Which power boosting type should be used is related with the transmitter architecture. For analog beamforming transmitters power boosting type 1 should be used, as each port is directly mapped to a power amplifier (so power transfer between ports can't be done). For digital and hybrid beamforming, both type 1 and type 2 can be used. With type 1 the power scaling for the PTRS ports is related with the number of PTRS ports in the SU-MIMO transmission (maximum 2 PTRS ports) while with type 2 the power scaling for PTRS ports is related with the number of PDSCH/PUSCH layers in the DMRS group in SU-MIMO (maximum 8 PDSCH layers and 4 PUSCH layers [6]). Therefore, for digital and hybrid beamforming transmitters power boosting type 2 offers better power utilization, so it is preferred. In FIG. 15a-d we show examples of power boosting for digital and analog beamforming with 1 and 2 PTRS ports in a SU-MIMO transmission with 3 DMRS ports and 3 PDSCH layers. In particular, FIG. 15a shows analog beamforming with power boosting type 1, FIG. 15b shows Digital beamforming with power boosting type 2, FIG. 15c shows Analog beamforming with power boosting type 1, and FIG. 15d shows Digital beamforming with power boosting type 2.

Support power boosting type 1, which uses power transfers between RE in the same port. It should be used for transmitters with analog beamforming.

Support power boosting type 2, which uses power transfers between ports for the same RE. It should be used for transmitters with digital and hybrid beamforming.

Power boosting type 2 should be used as default for DL and UL.

Support RRC signalling parameters "PTRS boosting type$^{DL}$" and "PTRS boosting type$^{UL}$" to indicate the power boosting type used for DL and UL independently.

2.1.8.1 DL Power Boosting

For DL, the PDSCH to PTRS EPRE ratio is used as metric to indicate the power boosting level (where the EPRE refers to the power of all the ports in the transmission in one RE, it is not EPRE per port). The EPRE is implicitly derived from different parameters for power boosting types 1 and 2.

For power boosting type 1, power transfers between ports are not allowed. Therefore, in this case the PDSCH to PTRS EPRE ratio is related with the number of PTRS ports in the transmission (NPTRS) and the number of PDSCH layers (NPDSCH) in the DMRS group. The EPRE level is computed as:

$$EPRE_{PDSCH\_to\_PTRS}=10*\log_{10}(NPDSCH)-10*\log_{10}(N_{PTRS}) [dB]$$

For power boosting type 2, power transfers between ports are allowed. Therefore, for this type of power boosting $EPRE_{PDSCH\_to\_PTRS}=0$ dB for any $N_{PTRS}$ and $N_{PDSCH}$.

For power boosting type 1, PDSCH to PTRS EPRE ratio is implicitly calculated as $EPRE_{PDSCH\_to\_PTRS}=+10*\log_{10}(N_{PDSCH})-10*\log_{10}(N_{PTRS})$ [dB], where NPTRS is the number of PTRS ports in the transmission and NPDSCH is the number of PDSCH layers in the DMRS group.

For power boosting type 2 the EPRE ratio of PDSCH to PTRS is always 0 dB for any number of PTRS ports in the transmission and PDSCH layers in the DMRS group.

It was also agreed in the last RAN1 meeting to support RRC signalling of the PDSCH to PTRS EPRE. However, this indication offers some problems that are discussed next. For power boosting type 1, the EPRE ratio is implicitly derived from NPTRS and NPDSCH (parameters derived from the DCI that can change dynamically). So, the EPRE level indicated by RRC can be outdated with respect to the values of NPTRS and NPDSCH in DCI (producing incorrect power scaling). For power boosting type 2, the EPRE ratio is equal to 0 dB for all the cases, so a RRC indication of a different EPRE level would lead to an incorrect power scaling. Therefore, we think that the EPRE indication by RRC must be precluded to avoid the pointed problems.

Do not include explicit EPRE indication in the RRC signalling, instead use RRC to configure the boosting type.

2.1.8.2 UL Power Boosting

For UL, the power of the PTRS port is used as metric to indicate the power boosting level.

For power boosting type 1, the power of the PTRS port is related with the power of a PUSCH RE in one layer (PPUSCH) and the number of PTRS ports (NPTRS). The PTRS power is given by $$P_{PTRS}=10*\log_{10}(N_{PTRS})+P_{PUSCH}$$

For power boosting type 2, the power of the PTRS port is related with the number of PUSCH layers in the DMRS group (NPUSCH) and the power of a PUSCH RE in one layer (PPUSCH). Hence, the power of the PTRS port is given by $$P_{PTRS}=10*\log_{10}(N_{PUSCH})+P_{PUSCH}$$

If power boosting type 1 is used in UL the power of the PTRS port is implicitly given by $P_{PTRS}=10*\log_{10}(N_{PTRS})+P_{PUSCH}$, where $N_{PTRS}$ is the number of PTRS ports and $P_{PUSCH}$ is the power of a PUSCH RE in one layer.

If power boosting type 2 is used in UL the power of the PTRS port is implicitly given by $P_{PTRS}=10*\log_{10}(N_{PUSCH})+P_{PUSCH}$, where $N_{PUSCH}$ is the number of PUSCH layers in the DMRS group and $P_{PUSCH}$ is the power of a PUSCH RE in one layer.

2.1.9 Mapping in Time Domain

It was previously agreed how to map PTRS within a slot, but there are still no agreements related with the collision of PTRS and SSB in a slot. Two different options can be used in this case, either the PTRS RE that collides with the SSB is punctured or it is shifted to the first OFDM symbol after the SSB. In some cases, puncturing could lead to cases in which extrapolation of the phase estimation does not offer good accuracy because of big distance between the last PTRS symbol and the PDSCH symbol. For example, in FIGS. 16a-16b we show an example of PTRS collision with SSB with PTRS time density ¼, i.e., with low PTRS time density (1 PTRS every fourth OFDM symbol). There, we can see that when puncturing there are 7 symbols between the last PDSCH symbol and the last PTRS RE in the slot, while with shifting this distance is reduced to 1 symbol (improving the phase estimation). Therefore, we prefer PTRS shifting when PTRS collides with SSB.

When PTRS collides with SSB, PTRS should be shifted to the first OFDM symbol after the SSB and restart the mapping algorithm.

2.1.10 PTRS Design for Mini-Slot

The same PTRS configuration should be used for slot based and non-slot based transmissions.

The PTRS configuration by RRC applies for both slot based and non-slot based scheduling for Rel.15.

2.2 PTRS Design for DFT-S-OFDM

2.2.1 Association Table

RAN1 agreed that the configuration of chunk-based PTRS must be associated with the scheduled BW. The following issues regarding the association table are still open:
- If the configuration is also associated with the scheduled MCS.
- If chunk size K=1 is supported.
- If configuration with K=4 and X>4 is supported.
- The default values for the thresholds in the table.

In [9] we show that the configuration of PTRS in DFT domain is independent of the scheduled MCS, so the association table should only be dependent on the scheduled BW. Also, in [9] we show that configuration with K=1 does not provide any performance gain for large scheduled BWs, so it should not be supported. Thus, the overhead to signal the thresholds in the association table is reduced (as 1 threshold less is used). Moreover, we show in [9] that in some cases a configuration with X=8 and K=4 offers performance gains (specially for large BWs and UEs with low quality oscillators), so Y=8 needs to be supported. Therefore, Table 10 must be used for selecting the configuration of PTRS in the DFT domain.
- Preclude configuration with K=1.
- Support Y=8 for large scheduled BW.
- PTRS configuration in the DFT domain is not associated with the scheduled MCS.

TABLE 10

Association table between scheduled BW and chunk-based configuration.

| Scheduled BW | X × K |
|---|---|
| $N_{RB} \leq N_{RB0}$ | No PT-RS |
| $N_{RB0} < N_{RB} \leq N_{RB1}$ | 2 × 2 |
| $N_{RB1} < N_{RB} \leq N_{RB2}$ | 2 × 4 |
| $N_{RB2} < N_{RB} \leq N_{RB3}$ | 4 × 2 |
| $N_{RB3} < N_{RB} \leq N_{RB4}$ | 4 × 4 |
| $N_{RB4} < N_{RB}$ | 8 × 4 |

As previously stated, an important open issue is the default value for the thresholds in the association table. In [9] we present evaluations results that show that the best selection for the default thresholds in Table 10 are $N_{RB0}=0$, $N_{RB1}=8$, $N_{RB2}=N_{RB3}=32$, and $N_{RB4}=108$. One important aspect of the proposed default thresholds is that they offer a configuration with PTRS always ON for DFT-S-OFDM, allowing frequency offset estimation.

Adopt $N_{RB0}=0$, $N_{RB1}=8$, $N_{RB2}=N_{RB3}=32$, and $N_{RB4}=108$ as default values for the thresholds in the association table between scheduled BW and chunk-based configuration.

2.2.2 RRC Signalling of Thresholds

As in the CP-OFDM case, UE can suggest new thresholds by RRC signalling to override the default values in association Table 10. The same principles presented in Section 2.1.3 for signalling the thresholds of the association table for the frequency density of PTRS for CP-OFDM can be applied for the signalling of the thresholds of the association table for the DFT configuration. In Table 11 we show the required overhead to signal the 5 thresholds of the association table using full and reduced flexibility selection, and bitmap and the efficient encoding. In this case, the benefits of the reduced flexibility selection and the proposed efficient encoding are even larger than in the case of the thresholds for the PTRS frequency density table (as the number of thresholds to encode is larger).

Restrict the values of $N_{RBx}$ to the set of elements which are multiple of the RBG size, i.e., [0, RBG, 2 * RBG, 3 * RBG . . . , Y * RBG, 276] with $$Y = \left\lfloor \frac{X}{RBG} \right\rfloor$$

and X the maximum scheduled BW in NR.

Use the encoding scheme described in *Algorithm 1 to efficiently* encode the thresholds of the PTRS chunk-based configuration association table

TABLE 11

Overhead comparison for 2 types of selection and 2 types of encoding for 5 thresholds signalling.

|  | Bit map | Encoding in Algorithm 1 |
|---|---|---|
| Full flexibility | 45 bits | 34 bits (24.4% overhead reduction) |
| Reduced flexibility with PRG = 4 | 35 bits | 24 bits (28.5% overhead reduction) |

2.2.3 Placement of Chunks for K=2

In the last RAN1 meeting it was agreed to place the chunks from sample n to sample n+K−1 within the interval dedicated for each chunk for the case with K=2. In we showed evaluation results with different chunk placements for K=2 and X=2 that showed very little performance differences for different chunk placements. Therefore, to have a harmonized design between the case K=4 and K=2 case, we think that the best option for K=2 is to place the chunks in the centre of the intervals.

For K=2, the PTRS chunks are mapped in the middle of each interval, i.e., $$n = \left\lceil \frac{N}{2} \right\rceil - \left\lceil \frac{K}{2} \right\rceil$$

where N is number of samples in the interval.

The following additional proposals are:

Proposal 1 Add support for frequency density of 1 PTRS subcarrier in every PRB in the density tables that can be configured by RRC for UL and DL, respectively.

Proposal 2 The MCS thresholds in the PTRS time density table have the granularity of modulation constellation size only, excluding the code rate.

Proposal 3 Support $ptrsthRB_0{}^{DL}=ptrsthRB_1{}^{DL}=0$, $ptrsthRB_2{}^{DL}=176$ and $ptrsthMS_1{}^{DL}=ptrsthMS_2{}^{DL}=ptrsthMS_3{}^{DL}=0$ as default thresholds for DL.

Proposal 4 Support $ptrsthRB_0{}^{UL}=ptrsthRB_1{}^{UL}=0$, $ptrsthRB_2{}^{UL}=276$ and $ptrsthMS_1{}^{UL}=ptrsthMS_2{}^{UL}=ptrsthMS_3{}^{UL}=0$ as default thresholds for UL.

Proposal 5 Higher layer configuration indicate the possible presence of PTRS for DL and UL independently, i.e. UL-PTRS-present and DL-PTRS-present are the RRC parameters.

Proposal 6 Restrict the values of the thresholds ptrsthRB$_x$ to the set of elements which are multiple of the RBG size, i.e., [0, RBG, 2 * RBG, 3 * RBG . . . , Y * RBG, 276] with Y=XRBG and X is the maximum scheduled BW in NR.

Proposal 7 Use the encoding scheme described in Algorithm 1 to encode the set of thresholds of the frequency density association table.

Proposal 8 Restrict the values of ptrsthMCS$_x$ to [0,1,2,3,4, Inf].

Proposal 9 Use the encoding scheme described in Algorithm 1 to encode the set of thresholds of the time density association table.

Proposal 10 For broadcast transmissions RB-level offset for PTRS is associated with SI-RNTI.

Proposal 11 The implicit relation between RB-level offset for PTRS and RNTI depends on the frequency density and is given by the equation RB$_{offset}$=C-RNTI mod n$_{PTRS\_step}$, where n$_{PTRS\_step}$=1/(freq_density).

Proposal 12 Support implicit association of the RE-level offset with the index of the DMRS port that is associated with the PTRS port.

Proposal 13 Adopt Table 7 and Table 8 for deriving the RE-level offset for one PTRS port based in its associated DMRS port index (for DMRS type 1 and 2).

Proposal 14 Encode "PTRS-RE-offset" in RRC using bitmap encoding of 2 bits, where "PTRS-RE-offset" can take the values {0,1,2,3} .

Proposal 15 Use Algorithm 2 to determine to which subcarrier the PTRS port is mapped based on the value of "PTRS-RE-offset.

Proposal 16 Use Algorithm 3 to jointly encode RI and the CPI with 4 bits.

Proposal 17 Support power boosting type 1, which uses power transfers between RE in the same port. It should be used for transmitters with analog beamforming.

Proposal 18 Support power boosting type 2, which uses power transfers between ports for the same RE. It should be used for transmitters with digital and hybrid beamforming.

Proposal 19 Power boosting type 2 should be used as default for DL and UL.

Proposal 20 Support RRC signalling parameters "PTRS_boosting_type$^{DL}$" and "PTRS_boosting_type$^{UL}$" to indicate the power type used for DL and UL independently.

Proposal 21 For power boosting type 1, PDSCH to PTRS EPRE ratio is implicitly
calculated as EPRE$_{PDSCH\_to\_PTRS}$=+10*log$_{10}$(N$_{PDSCH}$)−10*log$_{10}$(N$_{PTRS}$) [dB], where NpTRS is the number of PTRS ports in the transmission and NPDSCH is the number of PDSCH layers in the DMRS group.

Proposal 22 For power boosting type 2 the EPRE ratio of PDSCH to PTRS is always 0 dB for any number of PTRS ports in the transmission and PDSCH layers in the DMRS group.

Proposal 23 Do not include explicit EPRE indication in the RRC signalling, instead use RRC to configure the boosting type.

Proposal 24 If power boosting type 1 is used in UL the power of the PTRS port is implicitly given by P$_{PTRS}$=10*log$_{10}$(N$_{PTRS}$)+P$_{PUSCH}$, where N$_{PTRS}$ is the number of PTRS ports and P$_{PUSCH}$ is the power of a PUSCH RE in one layer.

Proposal 25 If power boosting type 2 is used in UL the power of the PTRS port is implicitly given by P$_{PTRS}$=10*log$_{10}$(N$_{PUSCH}$)+P$_{PUSCH}$, where N$_{PUSCH}$ is the number of PUSCH layers in the DMRS group and P$_{PUSCH}$ is the power of a PUSCH RE in one layer.

Proposal 26 When PTRS collides with SSB, PTRS should be shifted to the first OFDM symbol after the SSB and restart the mapping algorithm.

Proposal 27 The PTRS configuration by RRC applies for both slot based and non-slot based scheduling for Rel.15.

Proposal 28 Preclude configuration with K=1.

Proposal 29 Support Y=8 for large scheduled BW.

Proposal 30 PTRS configuration in the DFT domain is not associated with the scheduled MCS.

Proposal 31 Adopt N$_{RB0}$=0, N$_{RB1}$=8, N$_{RB2}$=N$_{RB3}$=32, and N$_{RB4}$=108 as default values for the thresholds in the association table between scheduled BW and chunk-based configuration.

Proposal 32 Restrict the values of NRsx to the set of elements which are multiple of the RBG size, i.e., [0, RBG, 2 * RBG, 3 * RBG . . . , Y * RBG, 276] with Y=XRBG and X the maximum scheduled BW in NR.

Proposal 33 Use the encoding scheme described in Algorithm 1 to efficiently encode the thresholds of the PTRS chunk-based configuration association table Proposal 34 For K=2, the PTRS chunks are mapped in the middle of each interval, i.e., n=N2−K2 where N is number of samples in the interval.

REFERENCES

[1] R1-1718750, "Further evaluations on PTRS for CP-OFDM", Ericsson
[2] R1-1720981, "TRS above-6 GHz evaluations", Ericsson
[3] R1-1716373, "Details on PTRS design", Ericsson
[4] Chairman's Notes RAN1 90bis
[5] R1-1714314, "On DL PTRS design", Ericsson
[6] 3GPP TS 38.211 v1.1.2
[7] R1-1718749, "Further evaluations on DMRS", Ericsson
[8] R1-1718449, "Remaining details on PTRS design", Ericsson
[9] R1-1720725, "Further evaluations on PTRS", Ericsson
[10] R1-1718751, "Further evaluations on PTRS for DFT-S-OFDM", Ericsson

The invention claimed is:

1. A method in a radio access node, the method comprising:
transmitting, to a user equipment, a configuration message for configuring a phase tracking reference signal (PT-RS) on a radio channel, wherein the radio channel comprises a plurality of subcarriers in a physical resource block (PRB), wherein a subset of the subcarriers in the PRB is allocated for reception of a demodulation reference signal (DM-RS) transmitted through a DM-RS port of the user equipment, wherein the configuration message comprises a bit field, wherein the bit field is indicative of at least one subcarrier allocated for reception of the PT-RS transmitted through the DM-RS port among the subset of subcarriers allocated for reception of a DM-RS transmitted through the DM-RS port, wherein the at least one subcarrier allocated for reception of the PT-RS among the subset of subcarriers allocated for reception of the DM-RS transmitted through the DM-RS port is uniquely associated with a combination of the bit field in the configuration message and the DM-RS port of the user equipment for which the PT-RS is allocated; and receiving, from the user equipment, the PT-RS on the at least one subcarrier that is allocated for reception of the PT-RS according to the bit field among the subset of subcarriers allocated for reception of the DM-RS transmitted through the DM-RS port.

2. The method of claim 1, wherein the bit field comprises n bits, and wherein a number of the plurality of subcarriers in the PRB is greater than $2^n$.

3. The method of claim 1, wherein the bit field comprises 2 bits that are indicative of the at least one subcarrier allocated for reception of the PT-RS among the subset of subcarriers allocated for reception of the DM-RS transmitted through the DM-RS port, the number of the plurality of subcarriers in the PRB being 12.

4. The method of claim 1, wherein the bit field comprises 3 bits that are indicative of the at least one subcarrier allocated for reception of the PT-RS among the subset of subcarriers allocated for reception of the DM-RS transmitted through the DM-RS port, the number of the plurality of subcarriers in the PRB being 12.

5. The method of claim 1, wherein the configuration message is a Radio Resource Control (RRC) message.

6. The method of claim 1, wherein the radio channel is accessible by the user equipment through one or more DM-RS ports, a DM-RS being transmitted through each DM-RS port.

7. A radio access node comprising:
at least one processor and a memory, said memory comprising instructions executable by said at least one processor, whereby the radio access node is configured to:
transmit, to a user equipment, a configuration message for configuring a phase tracking reference signal (PT-RS) on a radio channel, wherein the radio channel comprises a plurality of subcarriers in a physical resource block (PRB), wherein a subset of the subcarriers in the PRB is allocated for reception of a demodulation reference signal (DM-RS) transmitted through a DM-RS port of the user equipment, wherein the configuration message comprises a bit field, wherein the bit field is indicative of at least one subcarrier allocated for reception of the PT-RS transmitted through the DM-RS port among the subset of subcarriers allocated for reception of a DM-RS transmitted through the DM-RS port, wherein the at least one subcarrier allocated for reception of the PT-RS among the subset of subcarriers allocated for reception of the DM-RS transmitted through the DM-RS port is uniquely associated with a combination of the bit field in the configuration message and the DM-RS port of the user equipment for which the PT-RS is allocated; and
receive, from the user equipment, the PT-RS on the at least one subcarrier that is allocated for reception of the PT-RS according to the bit field among the subset of subcarriers allocated for reception of the DM-RS transmitted through the DM-RS port.

8. A method in an user equipment, the method comprising:
receiving, from a radio access node, a configuration message for configuring a phase tracking reference signal (PT-RS) on a radio channel, the radio channel comprising a plurality of subcarriers in a physical resource block (PRB), wherein a subset of the subcarriers in the PRB is allocated for transmission of a demodulation reference signal (DM-RS) through a DM-RS port of the user equipment, wherein the configuration message comprises a bit field that is indicative of at least one subcarrier allocated for transmission of the PT-RS through the DM-RS port among the subset of subcarriers allocated for transmission of the DM-RS through the DM-RS port, and wherein the at least one subcarrier allocated for transmission of the PT-RS is uniquely determined from among the subset of subcarriers allocated for transmission of the DM-RS based on a combination of the bit field in the configuration message and the DM-RS port through which the PT-RS is to be transmitted, and transmitting, to the radio access node, the PT-RS on the at least one subcarrier that is allocated for transmission of the PT-RS according to the configuration message from among the subset of subcarriers allocated for transmission of the DM-RS for the DM-RS port.

9. The method of claim 8, wherein the subset of subcarriers allocated for transmission of the DM-RS through the DM-RS port includes fewer subcarriers than a number of subcarriers in the PRB.

10. The method of claim 8, wherein the bit field comprises n bits, and wherein a number of the plurality of subcarriers in the PRB is greater than $2^n$.

11. The method of claim 8, wherein the bit field comprises 2 bits that are indicative of the at least one subcarrier allocated for transmission of the PT-RS from among the subset of subcarriers allocated for transmission of the DM-RS, the number of the plurality of subcarriers in the PRB being 12.

12. The method of claim 8, wherein the bit field comprises 3 bits that are indicative of the at least one subcarrier allocated for transmission of the PT-RS from among the subset of subcarriers allocated for transmission of the DM-RS, the number of the plurality of subcarriers in the PRB being 12.

13. The method of claim 8, wherein the configuration message is a Radio Resource Control (RRC) message.

14. The method of claim 8, wherein the radio channel is accessible by the user equipment through one or more DM-RS ports, a DM-RS being transmitted through each DM-RS port.

15. A user equipment comprising:
at least one processor and a memory, said memory comprising instructions executable by said at least one processor, whereby the user equipment is configured to:
receive, from a radio access node, a configuration message for configuring a phase tracking reference signal (PT-RS) on a radio channel, the radio channel comprising a plurality of subcarriers in a physical resource block (PRB), wherein a subset of the subcarriers in the PRB is allocated for transmission of a demodulation reference signal (DM-RS) through a DM-RS port of the user equipment, wherein the configuration message comprises a bit field that is indicative of at least one subcarrier allocated for transmission of the PT-RS through the DM-RS port among the subset of subcarriers allocated for transmission of the DM-RS through the DM- RS port, and wherein the at least one subcarrier allocated for transmission of the PT-RS is uniquely determined from among the subset of subcarriers allocated for transmission of the DM-RS based on a combination of the bit field in the configuration message and the DM-RS port through which the PT-RS is to be transmitted, and transmit, to the radio access node, the PT-RS on the at least one subcarrier that is allocated for transmission of the PT-RS according to the configuration message from among the subset of subcarriers allocated for transmission of the DM-RS for the DM-RS port.

16. A method in a system comprising a radio access node and a user equipment, the method comprising:

transmitting, from the radio access node to the user equipment, a configuration message for configuring a phase tracking reference signal (PT-RS) on a radio channel, wherein the radio channel comprises a plurality of subcarriers in a physical resource block (PRB), wherein a subset of the subcarriers in the PRB is allocated for reception of a demodulation reference signal (DM-RS) transmitted through a DM-RS port of the user equipment, wherein the configuration message comprises a bit field that is indicative of at least one subcarrier allocated for transmission of the PT-RS through the DM-RS port among the subset of subcarriers allocated for transmission of the DM-RS through the DM-RS port, and wherein the at least one subcarrier allocated for transmission of the PT-RS is uniquely determined from among the subset of subcarriers allocated for transmission of the DM-RS based on a combination of the bit field in the configuration message and the DM-RS port through which the PT-RS is to be transmitted;

receiving the configuration message at the user equipment;

transmitting, from the user equipment to the radio access node, the PT-RS on the at least one subcarrier that, according to the configuration message, is allocated for transmission of the PT-RS from among the subset of subcarriers allocated for transmission of the DM-RS for the DM-RS port; and receiving, at the radio access node, the PT-RS on the at least one subcarrier that, according to the bit field, is allocated for reception of the PT-RS among the subset of subcarriers allocated for reception of the DM-RS transmitted through the DM-RS port.

\* \* \* \* \*